United States Patent
Taniguchi et al.

(10) Patent No.: US 8,167,499 B2
(45) Date of Patent: May 1, 2012

(54) ROLLING BEARING DEVICE WITH SENSOR

(75) Inventors: Manabu Taniguchi, Kashihara (JP); Hirochika Ueyama, Hirakata (JP); Nobutsuna Motohashi, Katsuragi (JP); Tadashi Fukao, Kashiba (JP); Yasutaka Miyagawa, Habikino (JP); Kenji Ooiso, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 998 days.

(21) Appl. No.: 12/149,353

(22) Filed: Apr. 30, 2008

(65) Prior Publication Data
US 2008/0273823 A1    Nov. 6, 2008

(30) Foreign Application Priority Data

| May 1, 2007 | (JP) | 2007-120984 |
| May 1, 2007 | (JP) | 2007-120985 |
| May 1, 2007 | (JP) | 2007-120986 |
| May 1, 2007 | (JP) | 2007-120989 |

(51) Int. Cl.
  *F16C 32/04* (2006.01)
  *F16C 41/04* (2006.01)
  *G01B 7/14* (2006.01)

(52) U.S. Cl. .... 384/448; 384/544; 384/613; 324/207.25

(58) Field of Classification Search .................. 384/448, 384/488, 544; 324/173–174, 207.25, 261; 73/593, 597, 862.321, 862.322, 862.325
See application file for complete search history.

(56) References Cited

U.S. PATENT DOCUMENTS

| 6,471,407 B1 * | 10/2002 | Katano ..................... 384/448 |
| 7,686,516 B2 | 3/2010 | Shibasaki et al. |
| 2002/0157470 A1 * | 10/2002 | Noetzel et al. ................ 384/488 |
| 2007/0058892 A1 * | 3/2007 | Motohashi et al. ........... 384/448 |

FOREIGN PATENT DOCUMENTS

| JP | 55070720 A | * | 5/1980 |
| JP | 5-87822 (A) | | 4/1993 |
| JP | 2001-21577 | | 1/2001 |
| JP | 2004-3918 (A) | | 1/2004 |
| JP | 2005-99003 | | 4/2005 |
| JP | 2006-308577 (A) | | 11/2006 |
| JP | 2006-317420 (A) | | 11/2006 |
| JP | 2006-322928 (A) | | 11/2006 |
| JP | 2007163247 A | * | 6/2007 |
| WO | WO 2006100880 A1 | * | 9/2006 |

OTHER PUBLICATIONS

European Search Report dated Nov. 12, 2010. Notification of Reason for Refusal dated Dec. 20, 2011, in Japanese Patent Application No. 2007-120986 with English translation.
Notification of Reason for Refusal dated Dec. 20, 2011, in Japanese Patent Application No. 2007-120985 with English translation.

* cited by examiner

*Primary Examiner* — Marcus Charles
(74) *Attorney, Agent, or Firm* — McGinn IP Law Group, PLLC

(57) ABSTRACT

A first spacer, a second tubular member, and a second spacer are externally fitted and fixed to an outer peripheral surface of a nut. The second tubular member is formed by stacking a plurality of silicon steel plates without any gap, and is arranged between the first spacer and the second spacer axially. The outer diameter of an outer peripheral surface of the second tubular member is made larger than the outer diameter of an outer peripheral surface of the first spacer and the outer diameter of an outer peripheral surface of the second spacer. A detection surface of a first displacement detector is made to radially face a contact portion between the second spacer and the second tubular member, while a detection surface of a second displacement detector is made to radially face a contact portion between the first spacer and the second tubular member.

4 Claims, 37 Drawing Sheets

FIG. 12
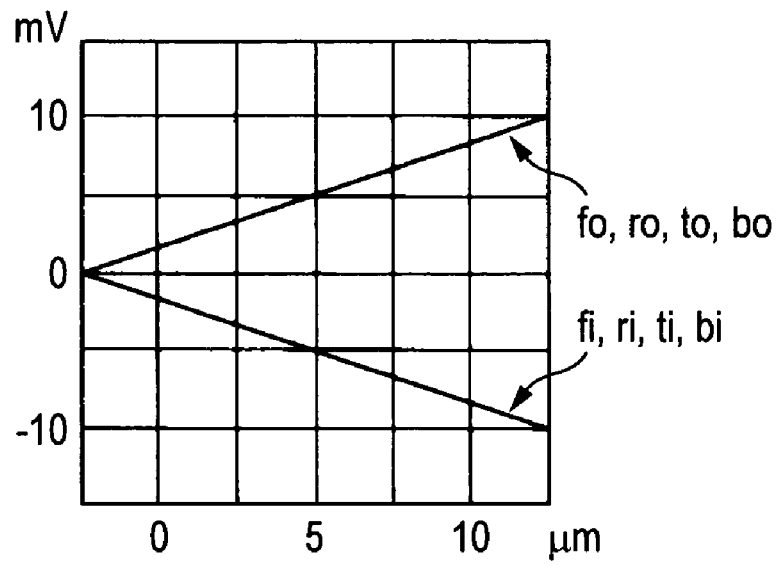
· sFy = (fo + ro + to + bo) - (fi + ri + ti + bi)
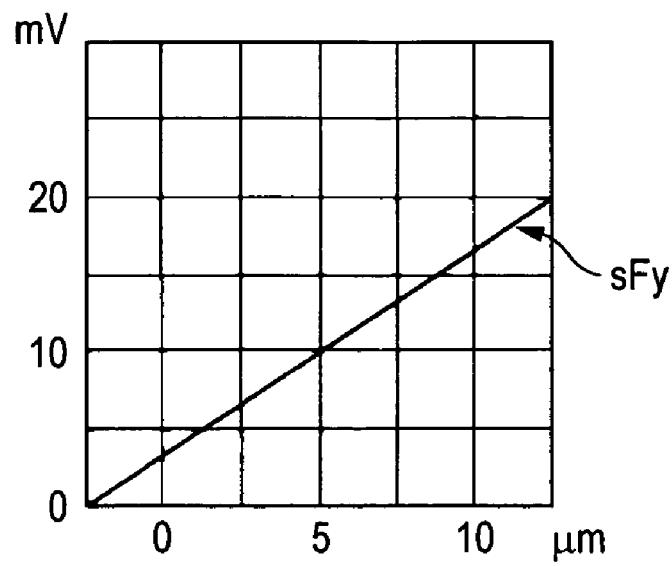

FIG. 14
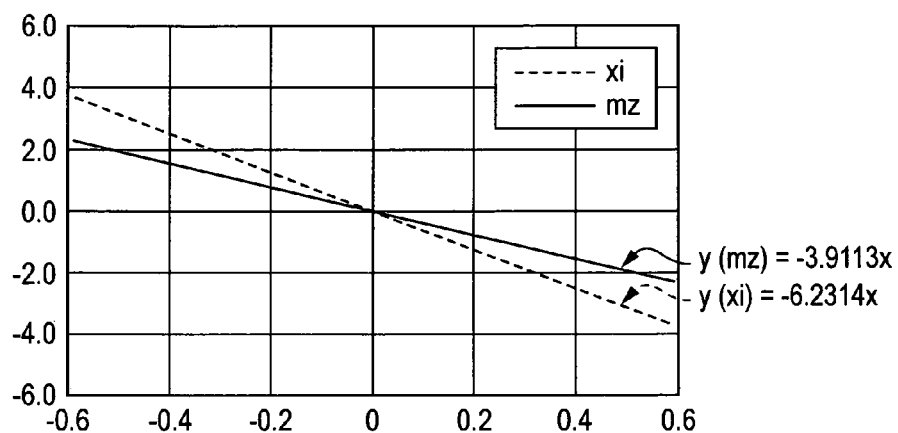
FIG. 15
$$\begin{cases} kz = y_{(xi)}/y_{(mz)} \\ kx = y_{(zi)}/y_{(mx)} \end{cases}$$
FIG. 16
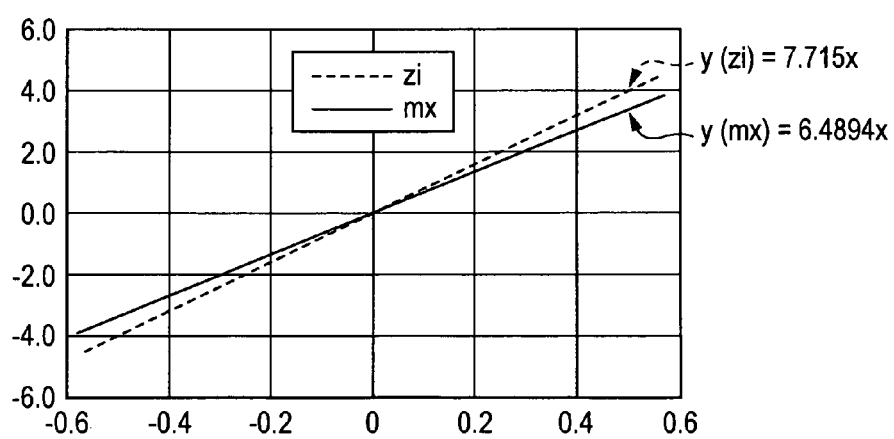

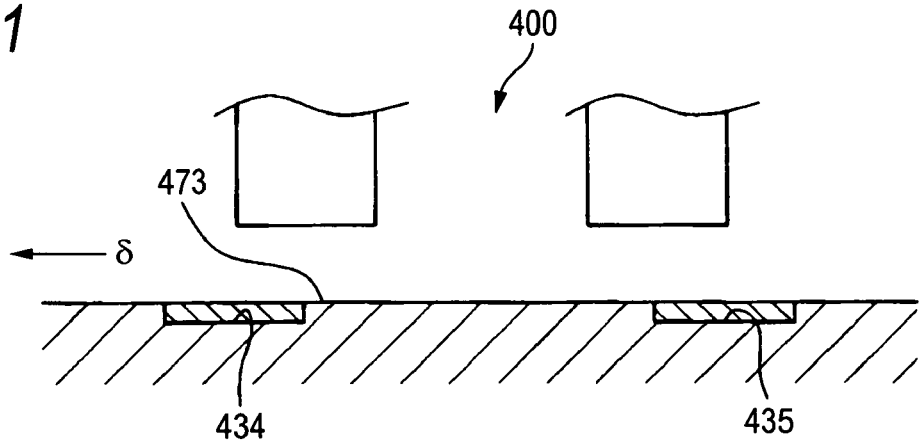
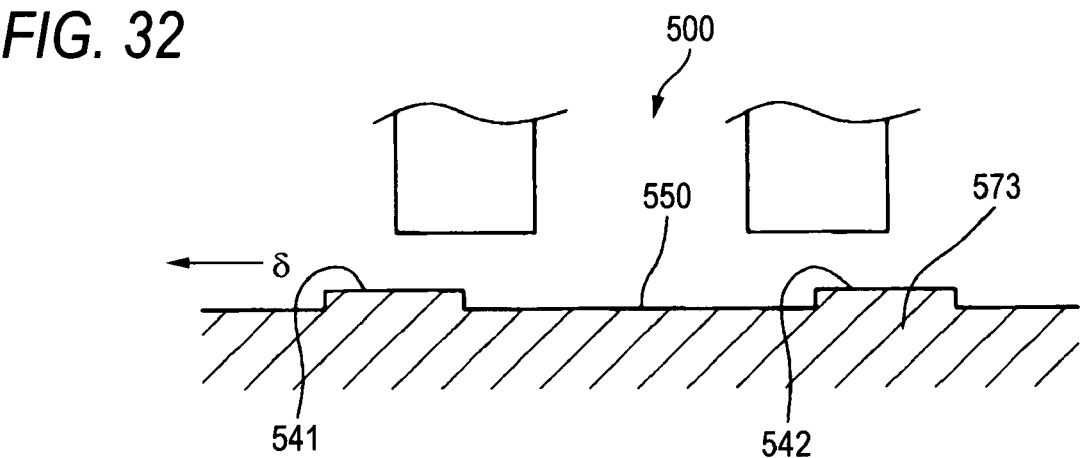
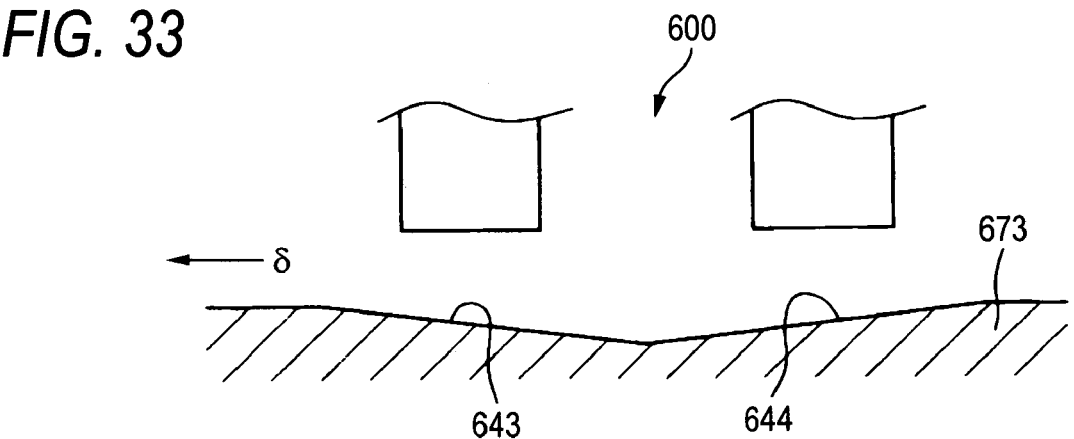

ROLLING BEARING DEVICE WITH SENSOR

BACKGROUND OF THE INVENTION

Field of the Invention

The invention relates to a rolling bearing device with a sensor having raceway members, rolling elements, and a sensor unit, and particularly, to a hub unit having a sensor unit.

Conventionally, as a rolling bearing device with a sensor, there is a hub unit described in Japanese Unexamined Patent Application Publication No. 2001-21577.

This hub unit includes a rotating raceway ring, a fixed raceway ring, and one displacement sensor, and the displacement sensor is provided in the fixed raceway ring. Specifically, an outer peripheral surface of the fixed raceway ring has a hole that extends radially, and the displacement sensor is inserted into the hole. A detection surface of the displacement sensor is directed to an outer peripheral surface of the rotating raceway ring.

The displacement sensor detects a gap between the rotating raceway ring and the fixed raceway ring that changes depending on any displacement of the outer peripheral surface of the rotating raceway ring to be generated when a load acts on a wheel of a vehicle (specifically, an electric signal that changes in response to this gap). The hub unit calculates a vertical load that acts on the wheel on the basis of a gap detected by the displacement sensor.

In the conventional rolling bearing device with a sensor, the conventional displacement sensor is one, and the detection surface of the displacement sensor is directed to the outer peripheral surface of the rotating raceway ring. Therefore, there is a problem in that it is possible to find a translational load that vertically acts on the wheel on the basis of a detection value of a displacement sensor, whereas it is impossible to find a moment load in a front-back direction of the vehicle, a moment load in an up-and-down direction of the vehicle, and a translational load in an axial direction of the wheel, which are generated with a centrifugal force at the time of the turning driving or the like of the vehicle.

Further, in the above conventional rolling bearing device with a sensor, in a case where the rotational speed of the rotating raceway ring (wheel) is desired to detect, an ABS sensor independent from the displacement sensor is separately required. As a result, there is a problem in that rolling bearing device with a sensor is made large, and the manufacturing cost of the rolling bearing device with a sensor becomes high.

Further, the request for improve the sensitivity of the sensor unit to precisely measure the load applied to a rolling bearing exists in the rolling bearing device with a sensor.

SUMMARY OF THE INVENTION

Thus, the object of the invention is to provide a rolling bearing device with a sensor capable of finding moment loads and axial translational loads that act on a raceway member with high sensitivity.

In order to achieve the above object, the present invention provides the following arrangements.

An exemplary embodiment of the invention includes a rolling bearing device with a sensor having a first raceway member including an inner peripheral surface having a raceway surface, a second raceway member including an outer peripheral surface having a raceway surface, an annular displacement-detected portion provided separately from the second raceway member and disposed on the outer periphery surface of the second raceway member, rolling elements arranged between the raceway surfaces of the first and second raceway members and a sensor unit that detects radial displacement and axial displacement of the displacement-detected portion. An exemplary embodiment of the sensor unit includes a first displacement detector having a detection surface that radially faces the displacement-detected portion, a second displacement detector located at a distance axially from the first displacement detector, and has a detection surface that radially faces the displacement-detected portion, a rotation signal detector that detects a signal associated with rotation of the annular portion relative to at least one of the first displacement detector and the second displacement detector, based on an output of at least one of the first displacement detector and the second displacement detector, and a displacement signal detector that detects a signal associated with the displacement of the displacement-detected portion based on an output of the first displacement detector, and detects a signal associated with the displacement of the displacement-detected portion based on an output of the second displacement detector.

In an exemplary embodiment of the invention the displacement-detected portion includes an annular portion having a plurality of grooves that are arranged at intervals from each other in a circumferential direction of the displacement-detected portion and extend axially.

In an exemplary embodiment of the invention the displacement-detected portion includes a first cylindrical surface portion connected to the annular portion via a stepped portion, and a second cylindrical surface portion connected to the annular portion opposite to the first cylindrical surface portion via a stepped portion, and located on substantially the same cylindrical surface as the first cylindrical surface portion. An exemplary aspect of the invention may include where each of the grooves axially extends from one axial end of the annular portion to the other axial end of the annular portion. An exemplary aspect of the invention may include where the first displacement detector and the second displacement detector substantially axially overlap each other. An exemplary aspect of the invention may include where the detection surface of the first displacement detector radially overlaps an end of the first cylindrical surface portion on the side of the annular portion, and radially overlaps an end of the annular portion on the side of the first cylindrical surface portion. An exemplary aspect of the invention may include where the detection surface of the second displacement detector radially overlaps an end of the second cylindrical surface portion on the side of the annular portion, and radially overlaps an end of the annular portion on the side the second cylindrical surface portion.

In an exemplary embodiment of the invention a surface of the annular portion is formed by axially stacking a plurality of steel plates.

In an exemplary embodiment of the invention the plurality of grooves have substantially the same width, and are arranged at equal intervals in the circumferential direction, the first displacement detector and the second displacement detector substantially axially overlap each other, each of the first displacement detector and the second displacement detector includes four displacement sensors arranged at equal intervals in the circumferential direction, and A<B, C<A+B, and B<C are satisfied, where in a radial sectional view passing through the annular portion and the first displacement detector, when the two adjacent grooves in the circumferential direction are defined as a first groove and a second groove, a convex located between the first groove and the second groove is defined as an intermediate convex, a straight line passing through a circumferential midpoint of the intermediate convex and a center of the annular portion is defined as a convex center passing line, a distance between a straight line parallel to the convex center passing line and passing through one circumferential end of the first groove, and a straight line parallel to the convex center passing line and passing through the other circumferential end of the first groove is represented by A, a distance between a straight line parallel to the convex center passing line and passing through one circumferential end of the intermediate convex, and a straight line parallel to the convex center passing line and passing through the other circumferential end of the intermediate convex is represented by B, and a quarter of a circumferential length of the detection surface of the first displacement detector is represented by C.

In an exemplary embodiment of the invention the second raceway member includes a rotor-attaching flange for attaching a rotor, and the first raceway member includes a body-attaching flange for attaching a vehicle body, the plurality of grooves are arranged at equal intervals in the circumferential direction, the first displacement detector and the second displacement detector substantially axially overlap each other, each of the first displacement detector and the second displacement detector includes four displacement sensors arranged at equal intervals in the circumferential direction, the displacement signal detector detects, in each of the displacement sensors, signals associated with the displacement of the displacement-detected portion based on signals output from each of the displacement sensors, the displacement sensors of the second displacement detector substantially axially overlap the displacement sensors of the first displacement detector, and the sensor unit has a moment load calculating section that receives signals from the displacement signal detector, calculates, in each of the displacement sensors of the first displacement detector, differences between signals associated with the displacement of the displacement-detected portion with respect to the displacement sensors of the first displacement detector and signals associated with the displacement of the displacement-detected portion with respect to the displacement sensors of the second displacement detector, and calculates a plurality of moment loads that act on the rolling bearing device on the basis of the calculated differences.

In an exemplary embodiment of the invention the displacement-detected portion includes a cylindrical magnet externally fitted to the outer peripheral surface of the second raceway member. In an exemplary aspect of the invention the sensor unit includes a first displacement detector having one first hall element or a plurality of first hall elements whose axial existence positions are substantially the same, and a second displacement detector having one second hall element or a plurality of second hall elements whose axial existence positions are substantially the same, and located at a distance axially from the first displacement detector. N poles and S poles are alternately located in a circumferential direction of the magnet in an outer peripheral surface of the magnet, while S poles and N poles are alternately located in the circumferential direction in an inner peripheral surface of the magnet so that the N poles of the outer peripheral surface of the magnet face the S poles of the inner peripheral surface of the magnet in a radial direction of the magnet and the S poles of the outer peripheral surface of the magnet face the N poles of the inner peripheral surface of the magnet in the radial direction of the magnet, and at least a portion of the first hall element radially faces one axial end of the magnet, and at least a portion of the second hall element radially faces the other axial end of the magnet.

In an exemplary embodiment of the invention the first displacement detector and the second displacement detector substantially axially overlap each other, the first displacement detector includes the four first hall elements, and the second displacement detector includes the four second hall elements, and the four first hall elements are arranged at regular intervals in the circumferential direction.

In an exemplary embodiment of the invention the second raceway member includes a rotor-attaching flange for attaching a rotor, and the first raceway member includes a body-attaching flange for attaching a vehicle body, the displacement signal detector detects, in each of the four first hall elements and the four second hall elements, signals associated with the displacement of the magnet based on signals output by the first or second hall elements, and the sensor unit has a moment load calculating section receives signals from the displacement signal detectors, calculates, in each of the first hall elements, differences between signals associated with the displacement of the magnet with respect to the first hall elements and signals associated with the displacement of the magnet with respect to the second hall elements, and calculates moment loads that act on the rolling bearing device based on the calculated differences.

In an exemplary embodiment of the invention the second raceway member includes an inner shaft, a first tubular member is screwed to one axial end of an outer peripheral surface of the inner shaft, a second tubular member is fixed to an outer peripheral surface of the first tubular member and formed by axially stacking a plurality of silicon steel plates, and a pair of third tubular members are fixed to the outer peripheral surface of the first tubular member, located on opposite sides of the second tubular member, and made of a nonmagnetic material. The displacement-detected portion is constituted by an outer peripheral surface of the second tubular member and outer peripheral surfaces of the pair of third tubular members, an open end of an inner peripheral surface of the first tubular member is provided with an engaging hole, and an outer diameter of the outer peripheral surface of the second tubular member is greater than an outer diameter of the pair of third tubular members.

In an exemplary embodiment of the invention the second tubular member axially abuts on the pair of third tubular members on opposite sides of the second tubular member, an outer diameter of the outer peripheral surfaces of the pair of third tubular members is substantially constant, the first displacement detector and the second displacement detector substantially axially overlap each other, the detection surface of the first displacement detector radially overlaps one axial end of the second tubular member on the side of one of the third tubular members, and radially overlaps one axial end of the one of the third tubular members on the side of the second tubular member, and the detection surface of the second displacement detector radially overlaps the other axial end of the second tubular member on the side of the other third tubular member, and radially overlaps the other axial end of the other third tubular member on the side of the second tubular member.

BRIEF DESCRIPTION OF THE DRAWINGS

FIG. 12 is a matrix diagram showing the correspondence relationship between independent variables calculated from outputs of the respective displacement sensors, and actual loads that act on the wheel.

FIG. 14 is a view showing the relationship between Mz, and displacement detection values of mz and xi in a case where only the moment load Mz around the z-axis is made to act.

FIG. 15 is a view for explaining a correction coefficient.

FIG. 16 is a view showing the relationship between Mx, and displacement detection values of mx and zi in a case where only the moment load Mx around the x-axis is made to act.

FIG. 31 is a view schematically showing a modified example of the sensor unit.

FIG. 32 is a view schematically showing a modified example of the sensor unit.

FIG. 33 is a view schematically showing a modified example of the sensor unit.

DETAILED DESCRIPTION OF PREFERRED EMBODIMENTS

Hereinafter, the invention will be explained in detail according to illustrated embodiments.

First Embodiment

Figure 1:
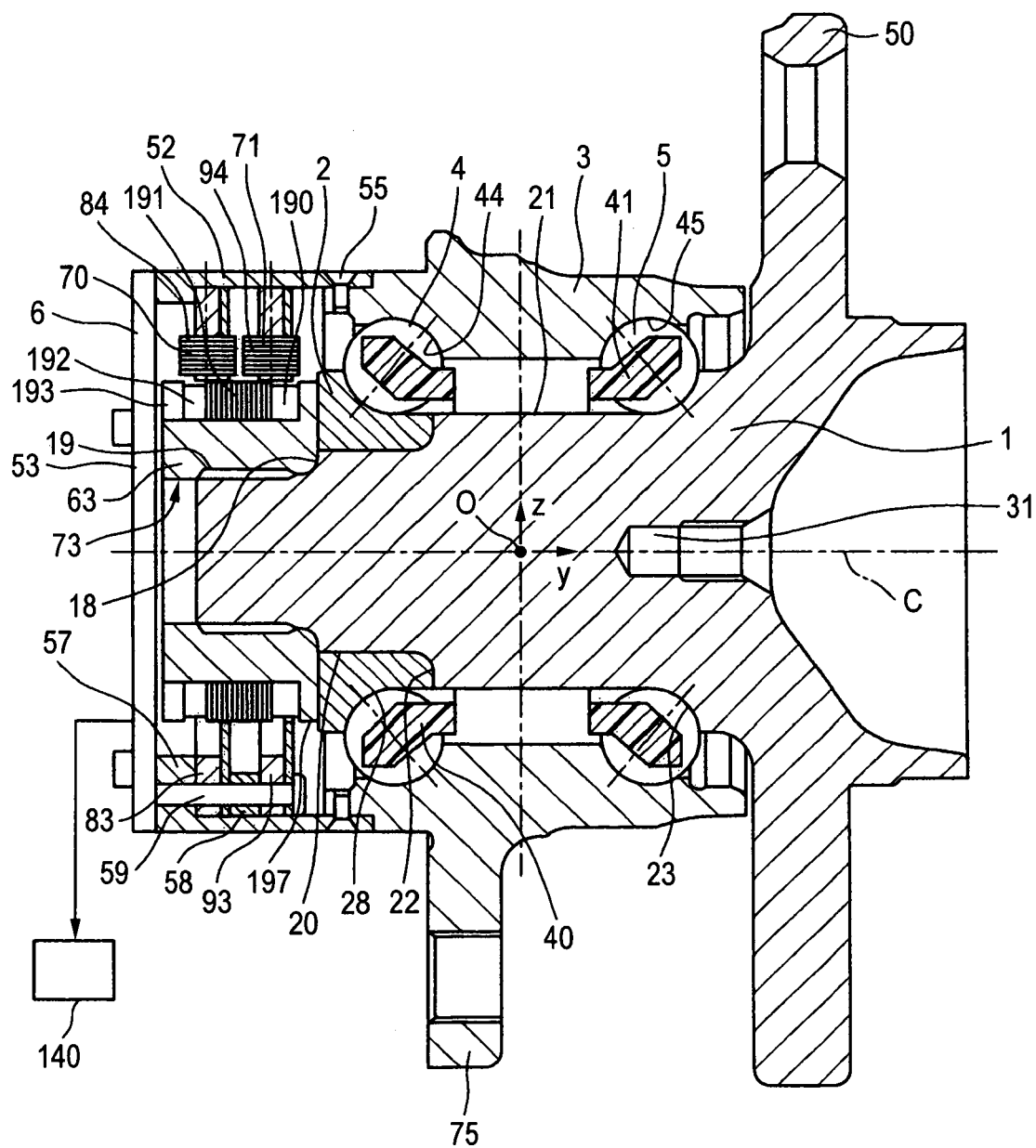
FIG. 1 is an axial sectional view of a hub unit of a rolling bearing device with a sensor according to a first embodiment of the invention.

FIG. 1 is an axial sectional view of a hub unit that is a first embodiment of a rolling bearing device with a sensor of the invention.

The hub unit includes an inner shaft 1, an inner ring 2, an outer ring 3 serving as a first raceway member, a plurality of first balls 4 serving as rolling elements, a plurality of second balls 5 serving as rolling elements, a case member 6, and a sensor unit 10.

The inner shaft 1 has a small-diameter shaft portion 19, a middle-diameter shaft portion 20, and a large-diameter shaft portion 21. An outer peripheral surface of the small-diameter shaft portion 19 is formed with a thread. The middle-diameter shaft portion 20 is connected to the small-diameter shaft portion 19 via a stepped portion 18, and has a larger outer diameter than the outer diameter of the small-diameter shaft portion 19. The large-diameter shaft portion 21 is located on the side of the middle-diameter shaft portion 20 opposite the small-diameter shaft portion 19. The large-diameter shaft portion 21 is connected to the middle-diameter shaft portion 20 via a stepped portion 22, and has a larger outer diameter than the outer diameter of the middle-diameter shaft portion 20. An outer peripheral surface of the large-diameter shaft portion 21 has an angular raceway groove 23 serving as a raceway surface. The outer diameter of the raceway groove 23 becomes large as being separated from the middle-diameter shaft portion 20.

The inner shaft 1 has a center hole 31. The center hole 31 is formed in a radial central portion of an axial end surface of the inner shaft 1 on the side of the large-diameter shaft portion 21. The center hole 31 has a cylindrical portion, and extends by a predetermined distance axially. Further, the inner shaft 1 has a rotor-attaching flange 50 (or wheel-attaching flange) for attaching a rotor (or a wheel) to an axial end thereof on the side of the large-diameter shaft portion 21.

The inner ring 2 is externally fitted and fixed to an outer peripheral surface of the middle-diameter shaft portion 20 of the inner shaft 1. An axial end surface of the inner ring 2 on the side of the large-diameter shaft portion 21 abuts on the stepped portion 22. The inner ring 2 has an angular raceway groove 28 serving as a raceway surface in its outer peripheral surface. The outer diameter of the raceway groove 28 becomes large as being separated from the large-diameter shaft portion 21.

The axial end surface of the inner ring 2 on the side of the large-diameter shaft portion 21 abuts on the stepped portion 22. A nut 63 serving as a first tubular portion is screwed to the thread of the small-diameter shaft portion 19. An axial end surface of the inner ring 2 opposite the large-diameter shaft portion 21 abuts on an axial end surface of the nut 63 on the side of the large-diameter shaft portion 21. Although explained below in detail, the inner ring 2 is firmly fixed to the inner shaft 1 by screwing the nut 63 toward the large-diameter shaft portion 21 in the axial direction by a predetermined distance, using a hexagonal wrench as an example of a fastening tool.

The outer ring 3 is located radially outside the large-diameter shaft portion 21. An inner peripheral surface of the outer ring 3 has an angular first raceway groove 44 serving as a raceway surface, and an angular second raceway groove 45 serving as a raceway surface. The outer ring 3 has a body-attaching flange 75 for fixation to a vehicle body. The plurality of first balls 4 are arranged at intervals from each other in a circumferential direction in a state where they are held by a first cage 40 between the raceway groove 28 of the inner ring 2, and the first raceway groove 44 of the outer ring 3, and the plurality of second balls 5 are arranged at intervals from each other in a state they are held by a second cage 41 between the raceway groove 23 of the inner shaft 1, and the second raceway groove 45 of the outer ring 3.

The case member 6 is constituted by a tubular member 52 and a disk-like lid member 53. An end of an inner peripheral surface of the tubular member 52 on the side of the outer ring 3 is fixed to an end of an outer peripheral surface of the outer ring 3 on the side of the small-diameter shaft portion 19 by locking screws 55. Meanwhile, the lid member 53 blocks an opening of the tubular member 52 opposite the outer ring. The lid member 53 prevents foreign matters from entering the rolling bearing device.

The sensor unit 10 has a first displacement detector 70, a second displacement detector 71, and a target member 73. The first and second displacement detectors 70 and 71 are fixed to an inner peripheral surface of the tubular member 52. Meanwhile, the target member 73 is composed of a nut 63 serving as a first tubular member, a first spacer 190 serving as a third tubular member, a second tubular member 191, a second spacer 192 serving as the third tubular member, and a fixing nut 193.

An axial end of the inner ring 2 on the side of the nut 63 is a flange 197. The first spacer 190 is made of a nonmagnetic material, such as plastics. The first spacer 190 is externally fitted and fixed to an outer peripheral surface of the nut 63 by press fitting. The first spacer 190 is pressed toward the inner ring 2 axially until it abuts on an axial inner end surface of the flange 197.

The second tubular member 191 is formed by axially stacking a plurality of silicon steel plates without any gap. The second tubular member 191 is externally fitted and fixed to the outer peripheral surface of the nut 63 by press fitting. An axial end surface of the second tubular member 191 on the side of the inner ring 2 abuts on an axial end surface of the first spacer 190 opposite the inner ring 2.

The second spacer 192 is made of a nonmagnetic material, such as plastics. The second spacer 192 is externally fitted and fixed to the outer peripheral surface of the nut 63 by press fitting. An axial end surface of the second spacer 190 on the side of the inner ring 2 abuts on an axial end surface of the second tubular member 191 opposite the inner ring 2. The outer diameter of an outer peripheral surface of the first spacer 190 is made approximately equal to the outer diameter of an outer peripheral surface of the second spacer 192, while the outer diameter of the outer peripheral surface of the first spacer 190 is madder smaller than the outer diameter of an outer peripheral surface of the second tubular member 191. The outer peripheral surface of the first spacer 190 is connected to the outer peripheral surface of the second tubular member 191 via a stepped portion, and the outer peripheral surface of the second tubular member 191 is connected to the outer peripheral surface of the second spacer 192 via a stepped portion.

The fixing nut 193 is located on the side of the second spacer 192 axially opposite the second tubular member 191. By fastening the fixing nut 193 toward the inner ring 2 axially, the first spacer 190, the second tubular member 191, and the second spacer 192 are sandwiched by the flange 197 and the fixing nut 193 so that that the first spacer 190, the second tubular member 191, and the second spacer 192 may be fixed to the nut 63, and the first spacer 190, the second tubular member 191, and the second spacer 192 may be firmly positioned with respect to the nut 63.

The inner shaft 1, the inner ring 2, and the target member 73 constitute the second raceway member, while the outer peripheral surface of the first spacer 190, the outer peripheral surface of the second tubular member 191, and the outer peripheral surface of the second spacer 192 constitute a displacement-detected portion.

Figure 2:
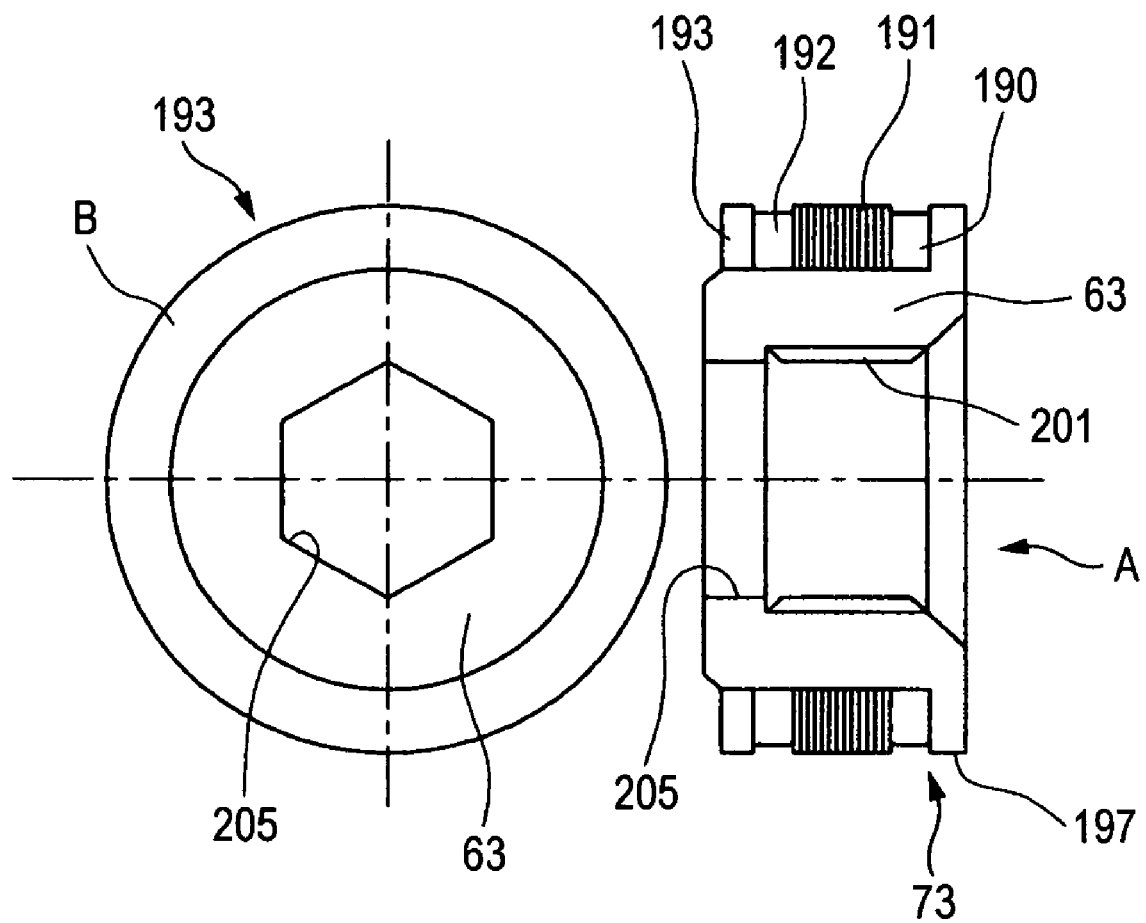
FIG. 2 shows an enlarged view when a target member is seen axially and a front view when the target member is seen axially from a fixing nut in the same scales.

FIG. 2 shows an enlarged view A when the target member 73 is seen axially and a front view B when the target member 73 is seen axially from the fixing nut 193 in the same scales.

As shown in A of FIG. 2, an axial end of an inner peripheral surface of the nut 63 on the side of the flange 197 is formed with a female thread 201 screwed to a male thread formed in the small-diameter shaft portion 19 of the inner shaft 1. Meanwhile, as shown in B and of FIG. 2, an axial end of the inner peripheral surface of the nut 63 opposite the flange 197 becomes an inner surface of a hexagonal wrench insertion hole 205 as an example of an engaging hole through that a hexagonal wrench is to be inserted.

The nut 63 is adapted to move on the small-diameter shaft portion 19 axially toward the middle-diameter shaft portion 20 as it is fastened using a hexagonal wrench that is a fastening tool.

Referring back to FIG. 1, the sensor unit 10 has a first displacement detector 70, and a second displacement detector 71. The first and second displacement detectors 70 and 71 are fixed to the inner peripheral surface of the tubular member 52. The first displacement detector 70 is located closer to the lid member 53 in the axial direction than the second displacement detector 71. The first displacement detector 70 is located at a distance axially from the second displacement detector 71. The first displacement detector 70 substantially overlaps the second displacement detector 71 axially.

The first displacement detector 70 has a sensor ring 83, and four displacement sensors 84, and the second displacement detector 71 has a sensor ring 93 and four displacement sensors 94. As shown in FIG. 1, the sensor ring 83 and the sensor ring 93 are fixed to a flange 57 of the tubular member 52 by locking screws 59 with an annular spacer 58 interposed therebetween.

Although not shown, the four displacement sensors 84 are arranged at predetermined intervals in the circumferential direction in a radial inner portion of the sensor ring 83 (in the first embodiment, they are arranged at regular intervals in the circumferential direction), while the four displacement sensors 94 are arranged at predetermined intervals in the circumferential direction in a radial inner portion of the sensor ring 93 (in the first embodiment, they are arranged at regular intervals in the circumferential direction).

Figure 3:
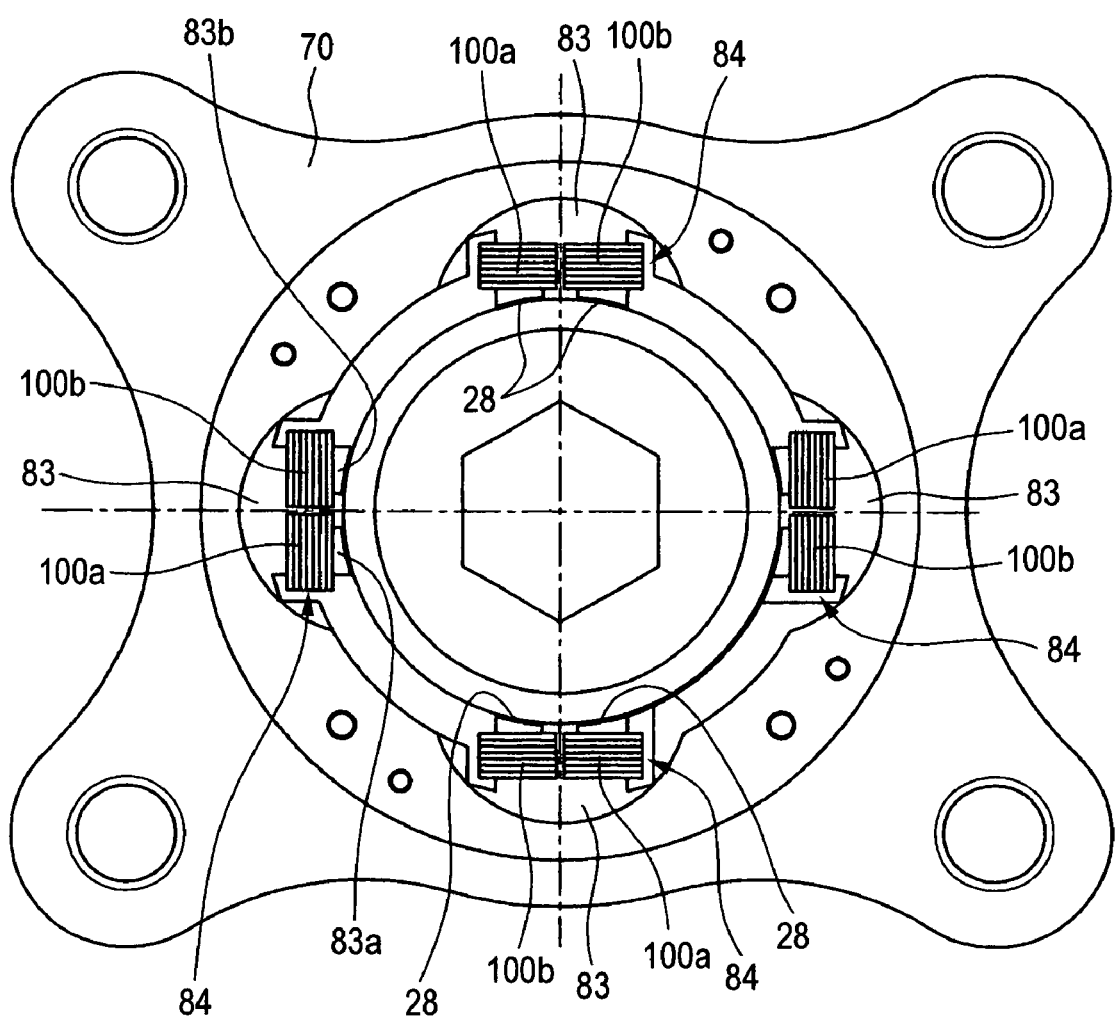
FIG. 3 is a view illustrating a circumferential arrangement configuration of four displacement sensors that constitute a first displacement detector.

FIG. 3 is a view illustrating a circumferential arrangement configuration of the four displacement sensors 84. In addition, although not described, the four displacement sensors 94 also have the same circumferential arrangement structure as the four displacement sensors 84. Further, reference number 75 in FIG. 3 denotes a flange of the outer ring 3 denoted by 75 in FIG. 1.

As shown in FIG. 3, each of the displacement sensors 84 is composed of a coil element 100a and a coil element 100b that are arranged in proximity to each other in the circumferential direction, to make a pair. The four displacement sensors 84 are installed in a position that substantially radially faces the portion of the target member 73 that is located on the vertical topmost side, a position that substantially radially faces the portion of the target member 73 that is located on the vertical bottommost side, a position that substantially radially faces the foremost position of a vehicle to which a rolling bearing device is attached in the target member 73, and a position that substantially radially faces the rearmost position of the vehicle to which the rolling bearing device is attached in the target member 73, in a state where the rolling bearing device (hub unit in the first embodiment) is installed in a predetermined position. In addition, the four displacement sensors 84 substantially overlap the four displacement sensors 94 axially.

In each set, the coil element 100a and the coil element 100b that makes a pair have independent detection surfaces, and the coil element 100a and the coil element 100b that makes a pair are connected in series. The sensor ring 83 has a pair of magnetic poles 83a and 83b, which protrude radially inward, at its radial inner end. The coil element 100a is configured such that a coil is wound around the magnetic pole 83a, while the coil element 100b is configured such that a coil is wound around the magnetic pole 83b. In each of the magnetic pole 83a and the magnetic pole 83b, a radial inner end surface 28 is a detection surface. The detection surfaces radially face each other at a distance from the outer peripheral surface of the target member 73.

Figure 4:
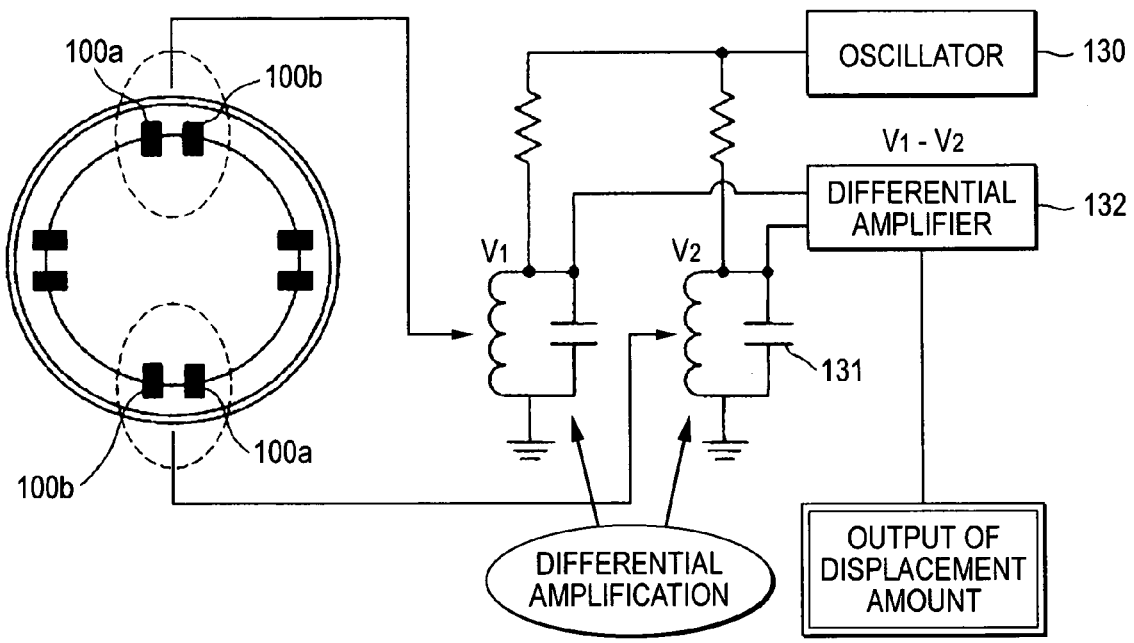
FIG. 4 is a view showing an example of a gap detecting circuit connected to the displacement sensors.

FIG. 4 is a view showing an example of a gap detecting circuit connected to two displacement sensors 84 and 84 of the first displacement detector 70.

In addition, although not described, gap detecting circuits connected to the two remaining displacement sensors 84 and 84 of the first displacement detector 70 and the gap detecting circuits respectively connected to two sets of two displacement sensors of the second displacement detector 71 are the same as the gap detecting circuits shown in FIG. 4.

As shown in FIG. 4, two sets of coil elements 100a and coil elements 100b that are located in the vertical direction are connected to an oscillator 130. An alternating current during a fixed period is supplied to the two sets of coil elements 100a and coil elements 100b from the oscillator 130. A synchronizing capacitor 131 is connected in parallel to the two sets of coil elements 100a and the coil elements 100b.

Output voltages (detection values) of one set of coil element 100a and coil element 100b and the other set of coil element 100a and coil element 100b are input to a differential amplifier 132, and are taken as output voltages (detection values) corresponding to the above same straight direction, so that a temperature drift may be eliminated. In addition, although not shown, in a state the hub unit is installed in a predetermined position, a temperature drift in the other two sets of coil elements 100a and coil elements 100b that are located in a front-back direction is also eliminated by taking a difference by a differential amplifier similarly to the above.

In each of the displacement sensors 84 and 94, if the inductance of the coil element 100a (or coil element 100b) is defined as "L", the area of a detection surface is defined as "A", permeability is defined as "µ", the number of turns of a coil is defined as "N", and the distance (gap) from the detection surface to the target member 73 is defined "d", the following Expression (a) is satisfied.

$$L = A \times \mu \times N^2 / d \qquad (a)$$

If the gap d to the target member 73 changes, the inductance L of each of the displacement sensors 84 and 94 changes, and the output voltages changes. Accordingly, by detecting fluctuation in the output voltage, in each of the displacement sensors 84 and 94, the radial gap from the detection surface of each of the displacement sensors 84 and 94 to a displacement-detected portion of the target member 73 can be detected.

Figure 5:
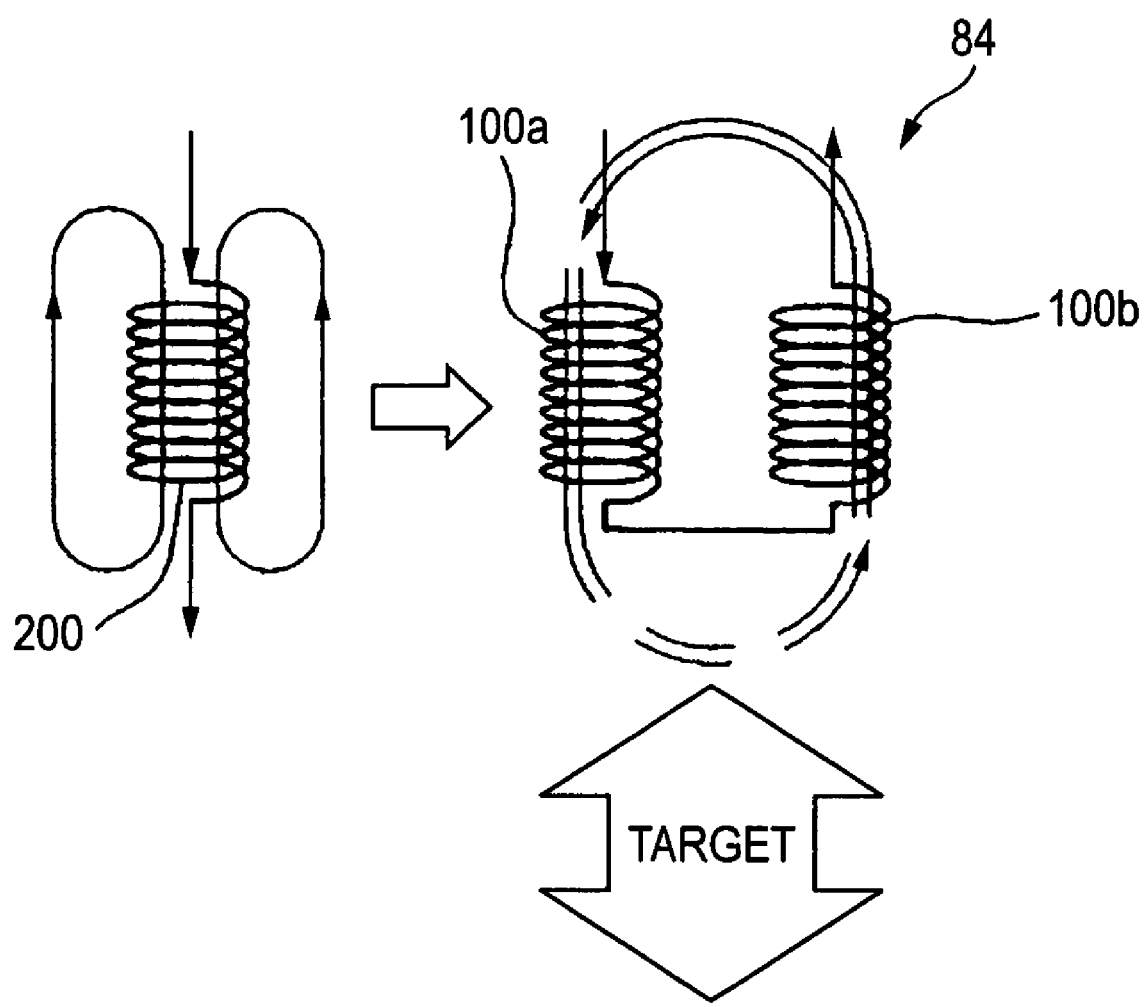
FIG. 5 is a view for explaining that the magnetic flux density to be generated in the displacement sensors used in the first embodiment can be increased as compared with a case where one coil element constitutes one displacement sensor.

Further, each of the displacement sensors 84 and 94 has an independent detection surface with respect to the target member 73, and has a structure in which the coil elements 100a and 100b that make a pair are connected in series to each other. Accordingly, as shown FIG. 5, since the magnetic flux density to be generated can be increased as compared with a case where one coil element 200 constitutes one displacement sensor, the detection sensitivity of a gap from the target member 73 can be made high.

Figure 6:
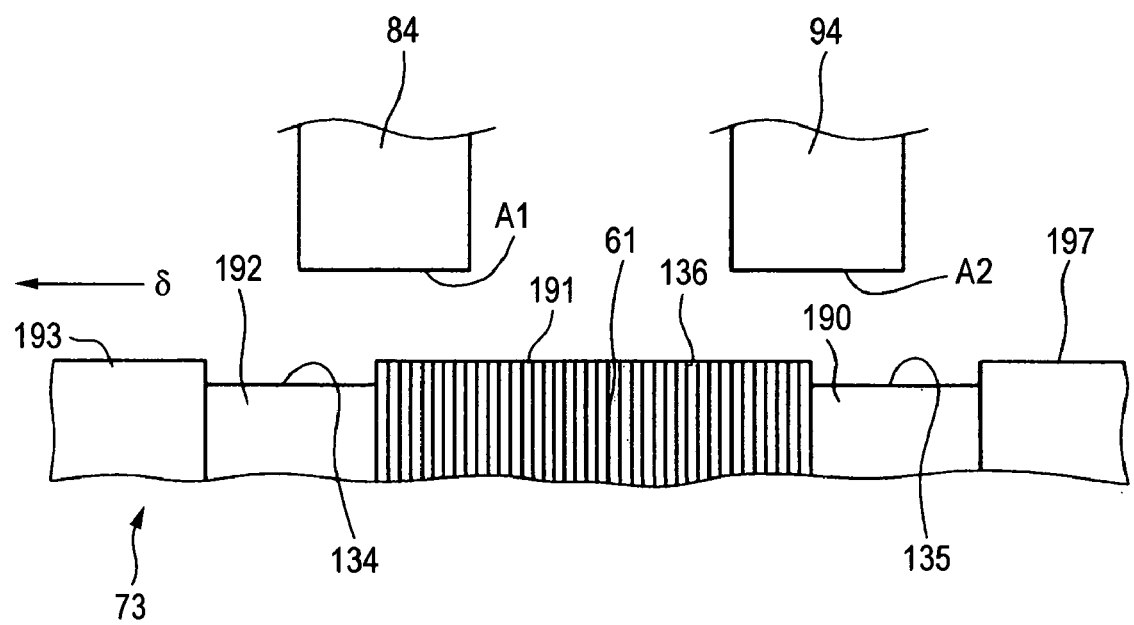
FIG. 6 is a schematic enlarged view showing the positional relationship among a displacement-detected portion of a target member, a displacement sensor of a first: displacement detector, and a displacement sensor of a second displacement detector.

FIG. 6 is a schematic enlarged view showing the positional relationship among a displacement-detected portion of the target member 73, the displacement sensor 84, and the displacement sensor 94.

As shown in FIG. 6, a portion of an outer peripheral surface 134 of the second spacer 192 exists in a position that radially a detection surface of the displacement sensor 84, while a portion of an outer peripheral surface 135 of the first spacer 190 exists in a position that radially faces a detection surface of the displacement sensor 94.

In a state where any load does not act on the hub unit, an axial central portion of the detection surface A1 of the displacement sensor 84 substantially faces a contact portion between the second spacer 192 and the second tubular member 191 radially, while an axial central portion of the detection surface A2 of the displacement sensor 94 substantially faces a contact portion between the first spacer 190 and the second tubular member 191 radially.

Supposing a translational load acts on the hub unit from this state, and as shown in FIG. 6, the target member 73 has been displaced by a distance (toward the lid member 53 axially, the axial lap length (axial overlapping length) between the detection surface A1 and the outer peripheral surface 134 of the second spacer 192 decreases, while the axial lap length (axial overlapping length) between the detection surface A2 and the outer peripheral surface 135 of the first spacer 190 increases. From this, a detection value of a gap of a displacement sensor 84 decreases, while a detection value of a gap of a displacement sensor 94 increases. If the target member 73 is axially displaced in this way, a difference is caused between a detection value to be detected by the displacement sensor 84, and a detection value to be detected by the displacement sensor 94.

In a case where the target member 73 has moved axially, the axial positions of the outer peripheral surface 134 of the second spacer 192 and the outer peripheral surface 135 of the first spacer 190 with respect to the sensor side are set so that the detection values to be detected by the displacement sensor 84 and the displacement sensor 94 may be changed in positive/negative opposite directions. By taking a difference between the displacement detection value of the displacement sensor 84, and the displacement detection value of the displacement sensor 94, the axial translational amount (this is an axial displacement, and has a correlation with a translational load) of the inner ring 2 (inner shaft 1) is detected.

By taking differences between displacement detection values of the displacement sensors 84 on the center side (hereinafter referred to as "inner side") of the vehicle, and displacement detection values of the displacement sensors 94 on the wheel side (hereinafter referred to as "outer side"), the displacement detection value of the second raceway member to an axial unit translational amount is amplified. This can enhance the detection sensitivity of the axial displacement of the sensor unit 10.

In addition, contrary to the device shown in FIG. 6, the outer peripheral surface of the second spacer on the inner side may be shifted to the outer side from the detection surface of the first displacement detector, and the outer peripheral surface of the first spacer on the outer side may be shifted to the inner side from the detection surface of the second displacement detector. Even in this case, the same operational effects as the above ones can be obtained.

Figure 7:
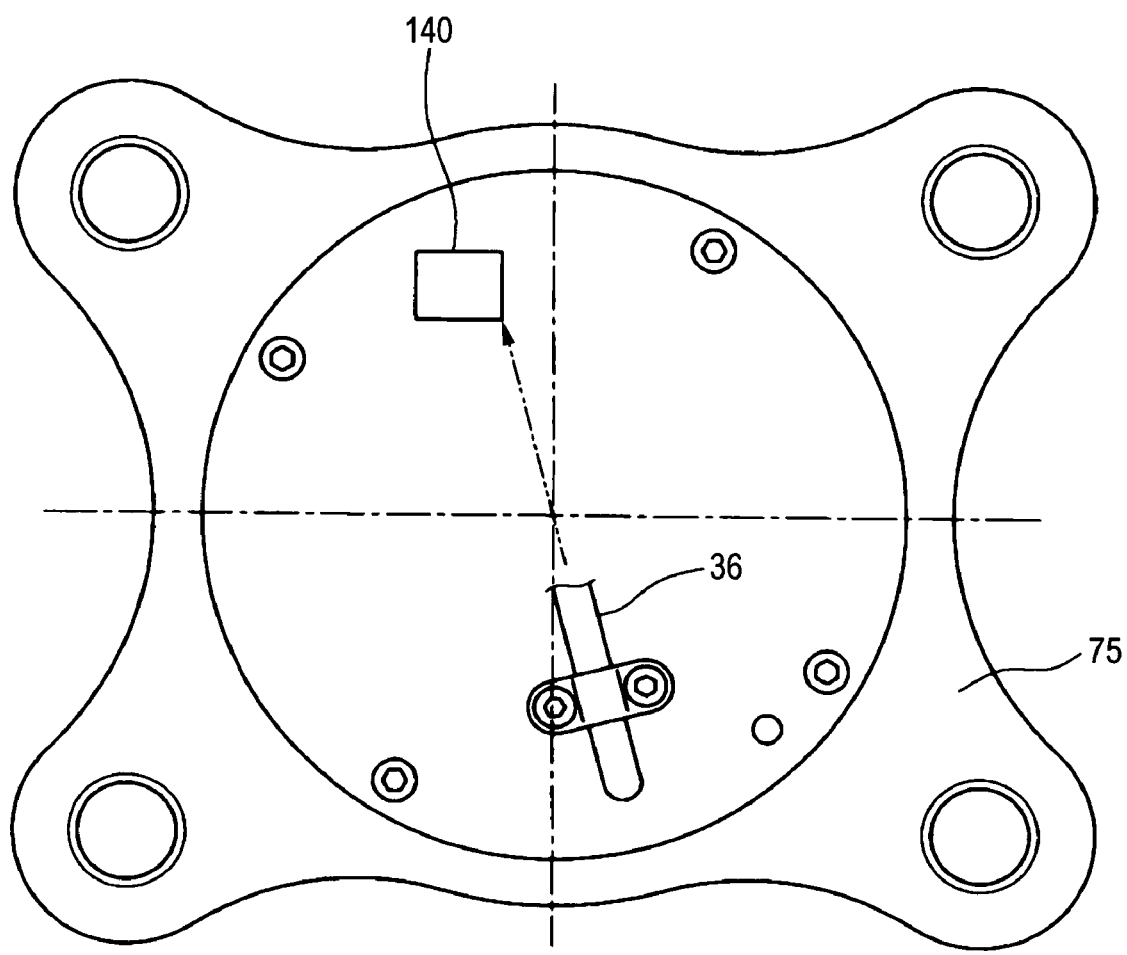
FIG. 7 is a view showing a connection structure between displacement detectors, and a signal processing section that is located opposite the displacement detectors with respect to a lid member.

FIG. 7 is a view showing a connection structure between the displacement detectors 70 and 71, and a signal processing section 140 that is located opposite the displacement detectors 70 and 71 with respect to the lid member 53.

The sensor unit 10 has a signal processing section 140 serving as an arithmetic section, and the respective eight displacement sensors 84 and 94 are connected to the signal processing section 140 via signal lines 36 that pass through the lid member 53 of the case member 6. The signal processing section 140 is composed of an ECU and the like. Output voltages (displacement detection values) obtained from the respective displacement sensors 84 and 94 are calculated by an operation method to be described below in the signal processing section 140, and thereby, moment loads and translational loads in individual directions, which act on the wheel, are calculated.

Figure 8:
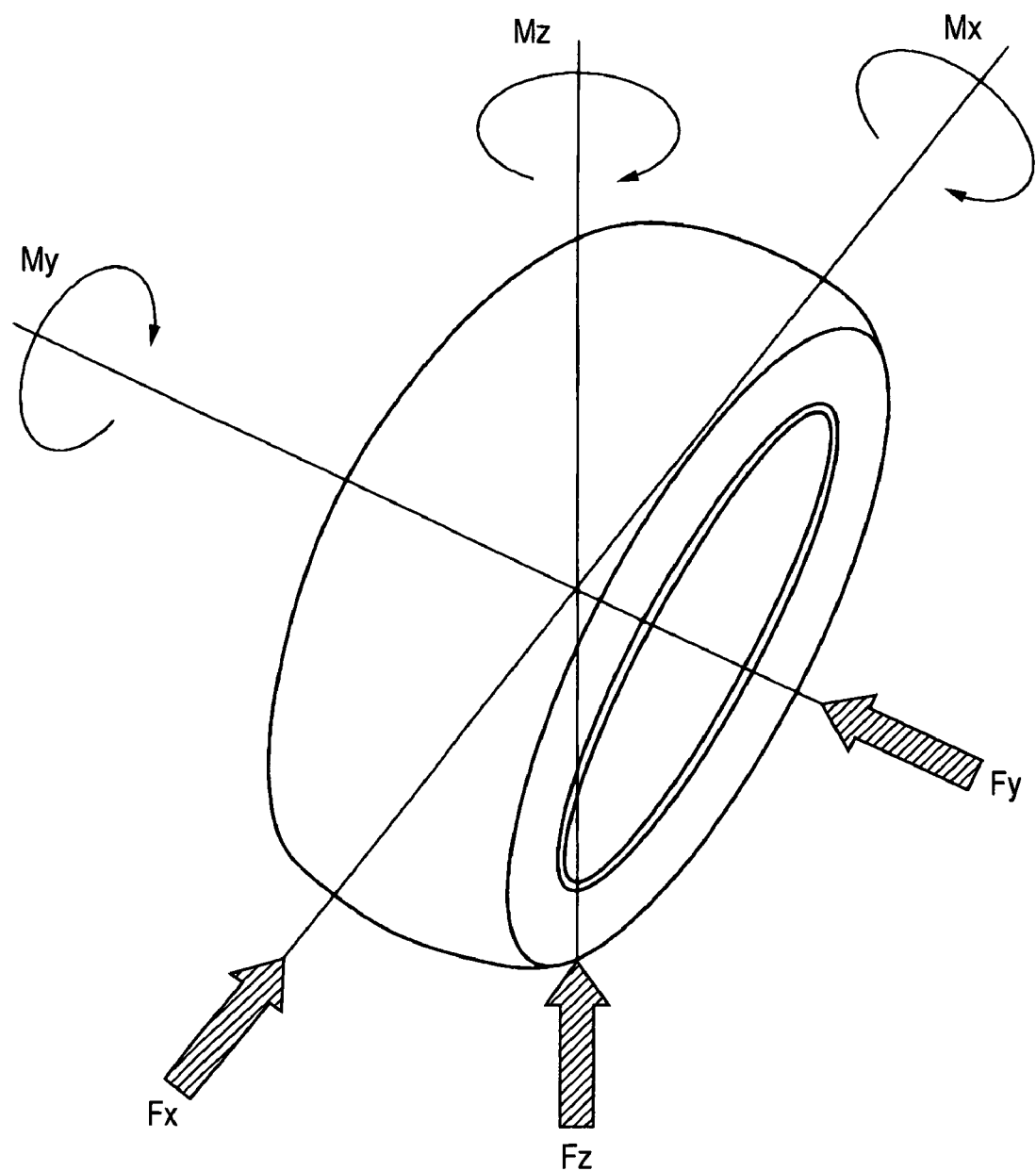
FIG. 8 is a view for explaining directions to be used in the first embodiment.
Figure 9:
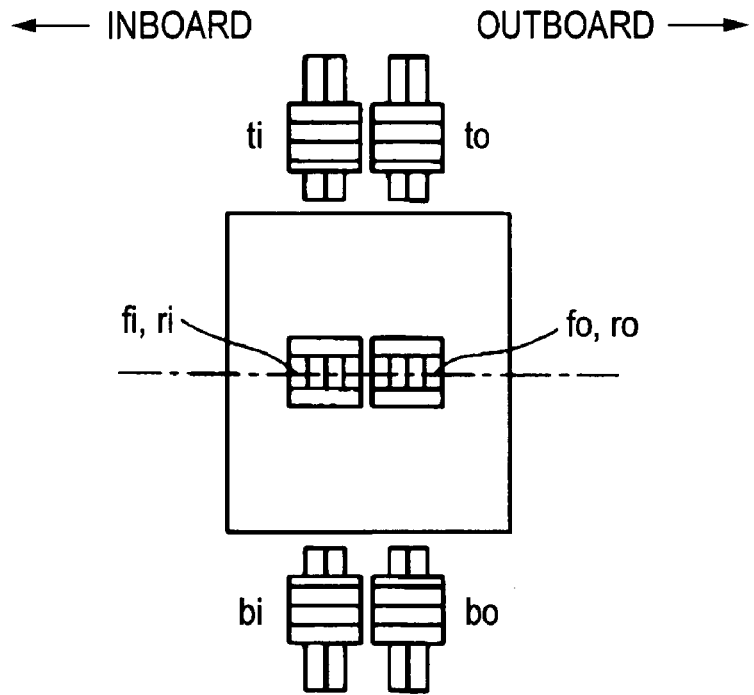
FIG. 9 is a view for explaining definitions of sensor displacement detection values to be used in the first embodiment.
Figure 10:
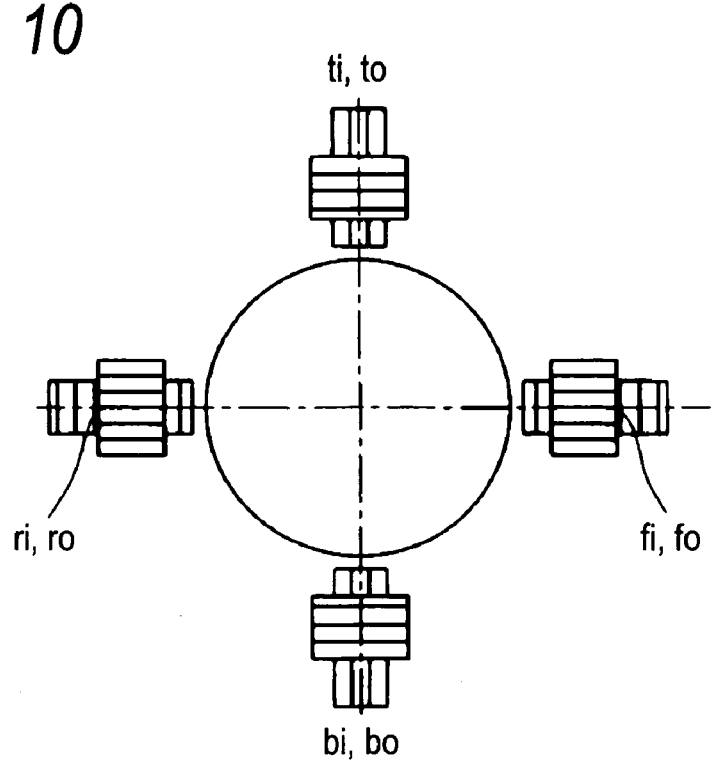
FIG. 10 is a view for explaining definitions of sensor displacement detection values to be used in the first embodiment.

FIG. 8 is a view for explaining directions to be used in the first embodiment, and FIGS. 9 and 10 are views for explaining definitions of displacement detection values of the sensors to be used in the first embodiment. FIG. 9 is a view when the displacement sensors are seen from the radial outside, and FIG. 10 is a view when the displacement sensors are seen from the axial direction. In addition, in FIG. 10, two coil elements 100a and 100b (refer to FIG. 3) that are adjacent to each other in the circumferential direction are expressed as one coil element for the purpose of simplification.

As shown in FIG. 8, in the first embodiment, a front-and-rear horizontal direction of the wheel is defined as an x-axis direction, a right-and-left horizontal direction (axial direction) of the wheel is defined as a y-axis direction, and an up-and-down direction of the wheel is defined as a z-axis direction.

Further, as shown in FIGS. 9 and 10, a suffix "i" is used for displacement detection values of the four displacement sensors 84 on the inner side, and a suffix "o" is used for the four displacement sensors 94 on the outer side.

Further, hereinafter, in a state where the hub unit is installed in a predetermined position, a sensor 84 installed in a position that substantially radially faces the foremost position of a vehicle to which the hub unit is attached in the target member 73 is called sensor 84f ("f" is an abbreviation of "front"), a sensor 84 installed in a position that substantially radially faces the rearmost position of the vehicle to which the hub unit is attached in the target member 73 is called sensor 84r ("r" is an abbreviation of "rear"), a sensor 84 installed in a position that substantially radially faces the portion of the target member 73 that is located on the vertical topmost side is called sensor 84t ("t" is an abbreviation of "top"), and a sensor 84 installed in a position that substantially radially faces the portion of the target member 73 that is located on the vertical bottommost side is called sensor 84b ("b" is an abbreviation of "bottom").

Further, even in the following displacement detection values of sensors, a suffix "f" is used for a displacement detection value of a front sensor, a suffix "r" is used for a displacement detection value of a rear sensor, a suffix "t" is used for a displacement detection value of a top sensor, and a suffix "b" is used for a displacement detection value of a bottom sensor.

The fact shown in FIG. 10, i.e., the fact that the displacement sensors 84t, 84b, 84f, and 84r on the inner side substantially overlap the displacement sensors 94t, 94b, 94f, and 94r on the outer side axially matches the fact that the aforementioned first displacement detector 70 substantially overlaps the second displacement detector 71.

To go back to the original topic, displacement detection values of a total of eight sensors of the sensor unit 10 are defined as follows.

fi: Displacement detection value of displacement sensor 84f ri: Displacement detection value of displacement sensor 84r ti: Displacement detection value of displacement sensor 84t bi: Displacement detection value of displacement sensor 84b fo: Displacement detection value of displacement sensor 94f ro: Displacement detection value of displacement sensor 94r to: Displacement detection value of displacement sensor 94t bo: Displacement detection value of displacement sensor 94b

Figure 11:
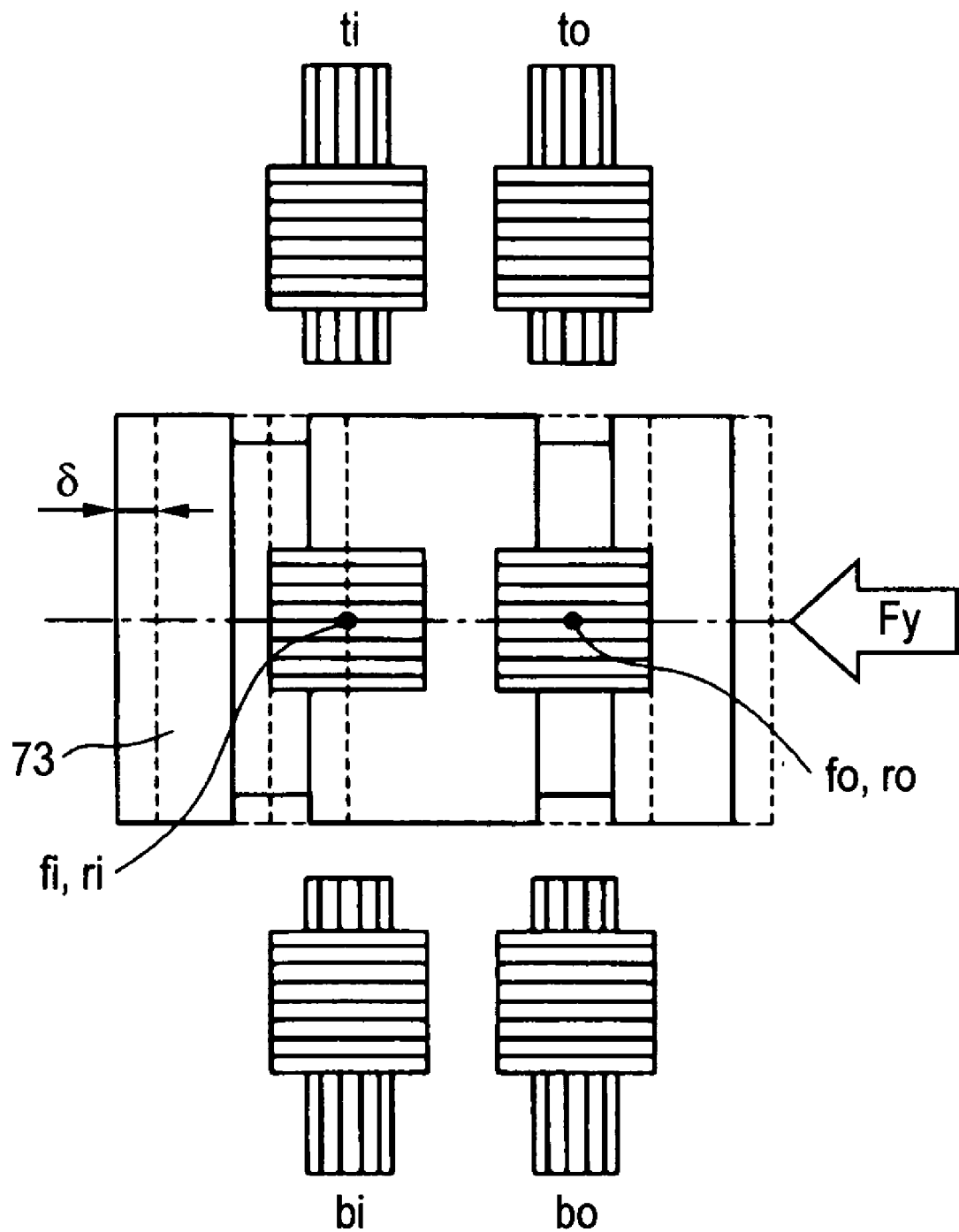
FIG. 11 is a view schematically showing the positional relationship between a target member and some displacement sensors in a case where a translational load Fy in a y-axis direction has acted on a wheel.

FIG. 11 is a view schematically showing the positional relationship between the target member 73 and some displacement sensors in a case where a translational load Fy in the y-axis direction has acted on the wheel. Hereinafter, an independent variable (sFy) corresponding to the translational load Fy in the y-axis direction will be explained with reference to FIG. 11.

As shown in FIG. 11, in a case where the translational load Fy in the y-axis direction has acted on the wheel, the second raceway member (rotating raceway member) is displaced in the direction of the load thereof, and the position of each of the outer peripheral surfaces 134 and 135 of the spacers 190 and 192 is shifted axially. For this reason, as described above, all the displacement detection values (output voltages in the first embodiment) fi, ri, ti, and bi of the displacement sensors on the inner side decrease with an increase in axial travel distance (, and all the displacement detection values (output voltages in the first embodiment) fo, ro, to, and bo of the displacement sensors on the outer side increase with an increase in axial travel distance).

Thus, as shown in FIG. 12, i.e., a matrix diagram showing the correspondence relationship between independent variables calculated from outputs of the respective displacement sensors, and actual loads that act on the wheel, sFy calculated in the following Expression (1) is adopted as an independent variable corresponding to the translational load Fy in the y-axis direction.

$$sFy=(fi+ri+ti+bi)-(fo+ro+to+bo) \quad (1)$$

As such, by taking differences between displacement detection values of the respective displacement sensors on the inner side and displacement detection values of the respective displacement sensors on the outer side, sFy to the axial unit translational amount of the second raceway member that is a rotating raceway ring is amplified. Thus, the detection sensitivity of the axial displacement as the whole sensor unit 10 can be enhanced.

Displacement detection values of displacement in the x-axis direction, and displacement detection values of displacement in the z-axis direction are found as follows.

As for the x-axis direction, a difference between a displacement detection value f of a front sensor and a displacement detection value r of a rear sensor is defined as a displacement detection value of displacement in the x-axis direction, and a difference between a displacement detection value t of a top sensor and a displacement detection value b of a bottom sensor is defined as a displacement detection value of displacement in the z-axis direction. Since temperature affects outputs of the front and rear sensors and outputs of the top and bottom sensors, respectively, by the same amount in the same direction, a temperature drift is eliminated by taking differences as described above.

In the first embodiment, displacement sensors 84t, 84b, 84f, 84r, 94t, 94b, 94f and 94r are arranged on the inner side and on the outer side. Thus, in respective positions on the inner side and on the outer side, displacement detection values of displacement in the x-axis direction and displacement detection values of displacement in the z-axis direction are acquired.

Displacement detection value of displacement in x-axis direction on inner side: $xi=fi-ri$ Displacement detection value of displacement in z-axis direction on inner side: $zi=-ti+bi$ Displacement detection value of displacement in x-axis direction on outer side: $xo=fo-ro$ Displacement detection value of displacement in z-axis direction on outer side: $zo=-to+bo$ An independent variable (sMz) corresponding to a moment load Mz around the z-axis is found as follows.

Figure 13:
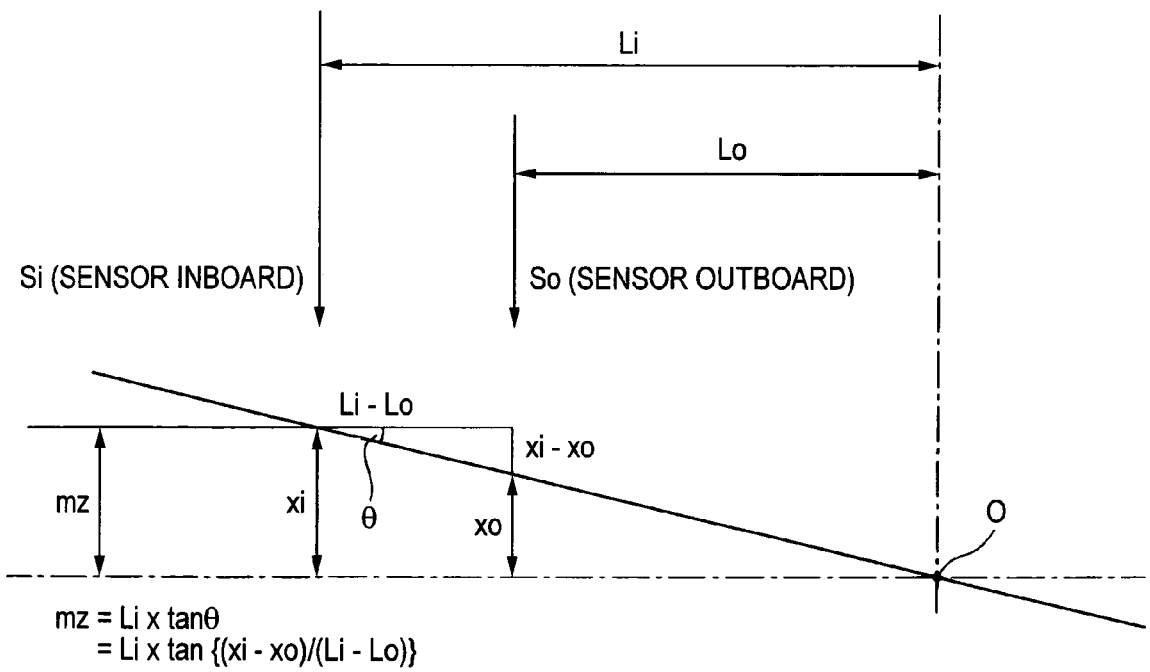
FIG. 13 is a view showing the relationship of various variables in the state of pure moment where only a moment load Mz around a z-axis acts.

FIG. 13 is a view showing the relationship of various variables in the state of pure moment where only the moment load Mz around the z-axis acts.

If the axial distance from the center (refer to FIG. 1) of the bearing device to the detection position of a displacement sensor on the inner side is defined as "Li", and the axial distance from the center O of the bearing device to the detection position of a displacement sensor on the outer side is defined as "Lo", a displacement detection value corresponding to the moment load Mz around the z-axis is theoretically represented by mz calculated in the following Expression (2). As shown in FIG. 13, this "mz" coincides with xi, in a case where "θ" is sufficiently small.

$$Mz=Li \times \tan \theta$$

$$=Li \times \tan((xi-xo)/(Li-Lo)) \quad (2)$$

However, in practice, the outer peripheral surfaces 134 and 135 of the spaces 190 and 192 having a smaller outer diameter than the outer peripheral surface 136 (refer to FIG. 6) of the second tubular member 191 are formed in the target member 73. Therefore, as shown in FIG. 14, i.e., a view showing the relationship between Mz, and displacement detection values of mz and xi in a case where only the moment load Mz around the z-axis is made to act, mz does not coincides with xi, and mz also does not coincide with the inclination of the displacement detection value of xi.

For this reason, a correction coefficient obtained by dividing the inclination of an xi straight line denoted by kz in FIG. 15 by the inclination of an mz straight line is introduced. The independent variable sMz corresponding to the moment load Mz around the z-axis is obtained by multiplying mz by a correction coefficient kz in the following Expression (3).

$$sMz=-mz \times kz \quad (3)$$

In addition, in the Expression (3), a minus (−) sign on the right-hand side is provided to make it coincide with the signs of the other independent variables (the above sFy, the following sMx, etc.).

The independent variable (sMx) corresponding to the moment load Mx around the x-axis direction is found as follows.

The x-axis direction and the z-axis direction have a coordinate transformation relation of 90 degrees. Accordingly, the independent variable sMx corresponding to the moment load Mx around the x-axis can be calculated by the following Expression (4), by according to the way of thinking similar to the case of the sMz.

$$sMx = mx \times kx \quad (4)$$

In addition, kx in the Expression (4) is a value defined in FIG. 15, is a correction coefficient introduced to the same effect as kz, and is a correction coefficient obtained by dividing the inclination of a zi straight line by the inclination of an mx straight line. This kx is calculated from a view showing the relationship between Mx, and displacement detection values of mx and zi in a case where only the moment load Mx around the x-axis is made to act, like 16.

An independent variable (sFz) corresponding to a translational load Fz in the z-axis direction, and an independent variable (sFx) corresponding to a translational load Fx in the x-axis direction are found as follows.

Figure 17:
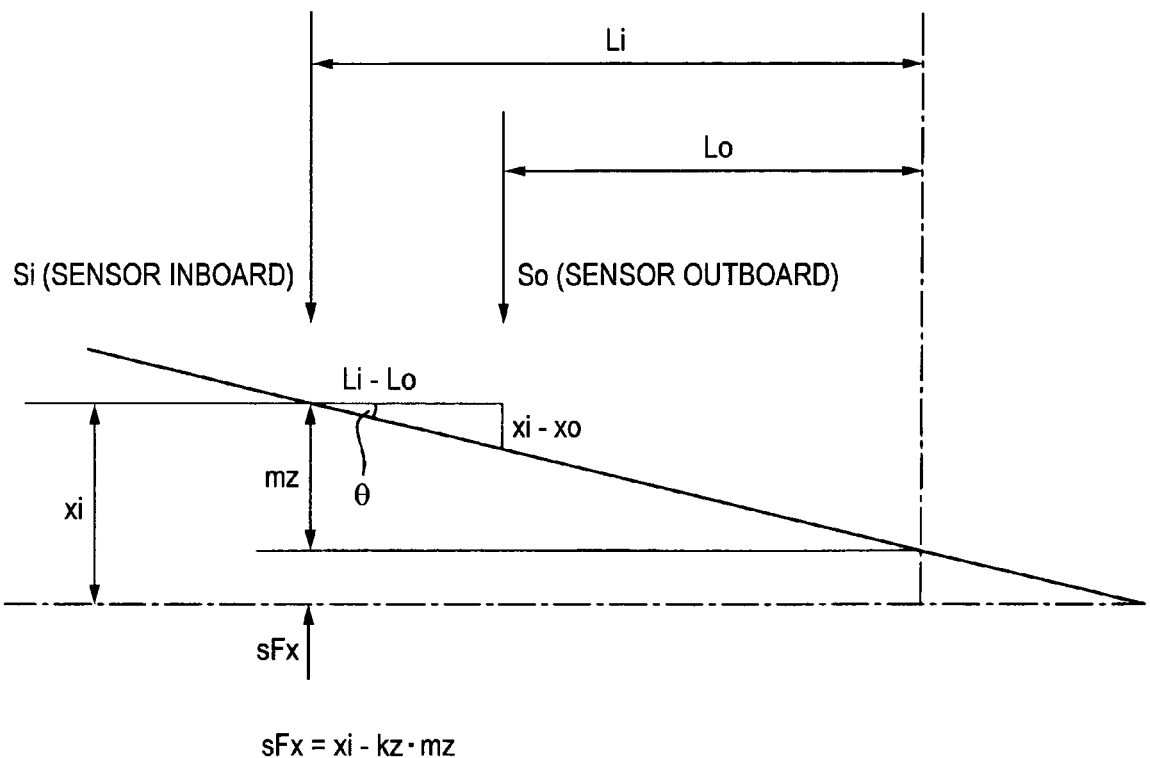
FIG. 17 is a view showing a deformed state of a second raceway member when the state where the translational load Fx in the X-axis direction along with the moment load Mz around the Z-axis acts is assumed.

FIG. 17 is a view showing a deformed state of the second raceway member when the state where the translational load Fx in the x-axis direction along with the moment load Mz around the z-axis acts is assumed, and is a view showing the relationship between various variables.

The component of the independent variable sMz corresponding to the moment load Mz around the z-axis direction, and the component of the independent variable sFx corresponding to the translational load Fx in the x-axis direction are included in included a displacement detection value xi of displacement in the x-axis direction on the inner side. The independent variable sFx corresponding to the translational load Fx in the x-axis direction can be found by subtracting sMz from the above "xi".

This is similarly applied to sFz that is an independent variable corresponding to the translational load Fz in the z-axis direction. Accordingly, the independent variable sFz by the translational load Fz in the z-axis direction and the independent variable sFx by the translational load Fx in the x-axis direction can be calculated by the following Expressions (5) and (6), respectively.

$$sFz = zi - mx \times kx \quad (5)$$

$$sFx = xi - mz \times kz \quad (6)$$

Figure 18:
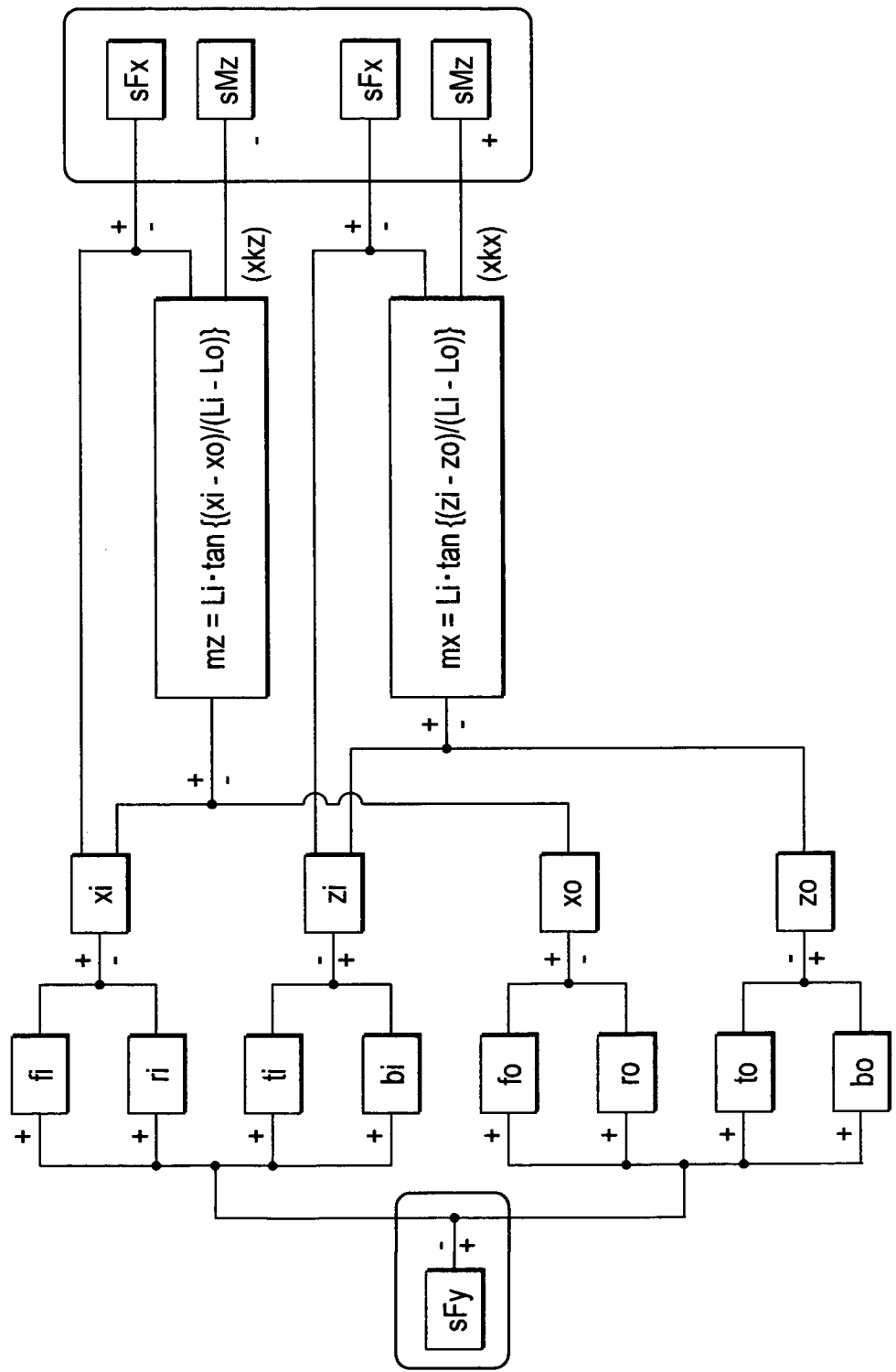
FIG. 18 is a view diagrammatically showing the method of calculating variables sFx, sFy, sFz, sMx, and sMz, which has been explained hitherto.

FIG. 18 is a view diagrammatically showing the method of calculating the variables sFx, sFy, sFz, sMx, and sMz, which has been explained hitherto. As shown in FIG. 18, sFy can first be found, and SFx, sFz, sMx, and sMz can be found on the basis of the value.

Figure 19:
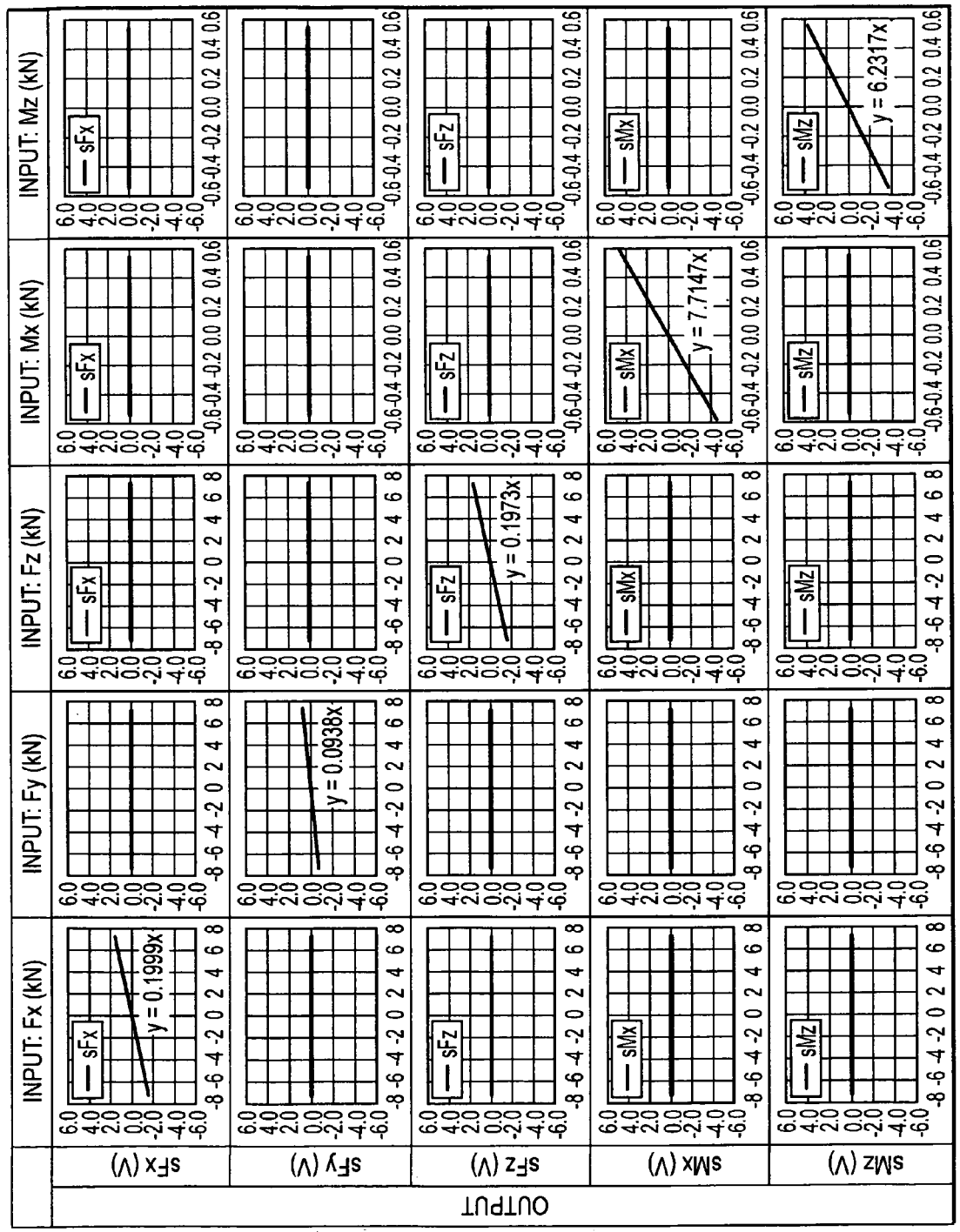
FIG. 19 is a matrix diagram showing the correspondence relationship between independent variables sFx, sFy, sFz, sMx, and sMz, and Fx, Fy, Fz, Mx, and Mz that are actual loads that act on the wheel.

FIG. 19 is a matrix diagram showing the correspondence relationship between the respective independent variables sFx, sFy, sFz, sMx and sMz, obtained by the above Expressions (1), (3) (4), (5), and (6), and Fx, Fy, Fz, Mx, and Mz that are actual loads that act on the wheel.

That is, using Fx, Fy, Fz, Mx and Mz that are actually loaded to the wheel as inputs, and using the respective independent variables sFx, sFy, sFz, sMx, and sMz obtained by the Expressions (1), (3), (4), (5), and (6) as outputs, a straight line graph between those variables is made into a matrix.

As shown in the matrix diagram of FIG. 19, as for Fx, only sFx becomes a straight line graph having inclination, the other Fy, Fz, Mx, and Mz have no response. Similarly to this, a diagonal portion of the matrix diagram becomes a straight line graph. Accordingly, these five independent variables sFx, sFy, sFz, sMx, and sMz are in a linear independent relationship among five components forces Fx, Fy, Fz, Mx, and Mz that are actual loads that act on the wheel.

For this reason, if those independent variables sFx, sFy, sFz, sMx, and sMz are found, the respective loads Fx, Fy, Fz, Mx, and Mz can be calculated by solving simultaneous linear equations with five unknowns that have as unknowns the five loads Fx, Fy, Fz, Mx, and Mz that act on the wheel.

In the first embodiment, an operational circuit (hardware) or a control program (software) that solves the aforementioned respective equations (1), (3), (4), (5), and (6), and simultaneous linear equations with five unknowns are built into the signal processing section 140 composed of an ECU, etc. For this reason, the actual loads Fx, Fy, Fz, Mx, and Mz that act on the wheel can be found on the basis of the eight displacement detection values fi, ri, ti, bi, fo, ro, to, and bo by the respective displacement sensors.

According to the rolling bearing device of the above first embodiment, the first displacement detector 70 and the second displacement detector 71 that are spaced axially from each other are provided. Therefore, not only translational loads based on axial translational displacement can be calculated on the basis of a detection signal of the first displacement detector 70, and a detection signal of the second displacement detection signal 71, but also changes in displacement depending on the axial position of the rolling bearing device can be detected, and moment loads that act on the rolling bearing device can be calculated on the basis of the change in displacement. Further, since the moment loads that act on the wheel in addition to the translational loads that act on the hub unit can be calculated, operation control during traveling of a vehicle can be precisely performed.

Further, according to the rolling bearing device of the above first embodiment, the second tubular member 191 is formed by axially stacking a plurality of silicon steel plates. Thus, in the displacement detectors, an eddy current is not generated in the second tubular member 191 in the middle of detection of displacement of a displacement-detected portion using the law of electromagnetic induction. Accordingly, the energy loss when a displacement signal is acquired can be reduced, and the sensitivity of the displacement detectors can be enhanced.

Since the second tubular portion has a structure in which magnetic properties are good, passage of magnetic fluxes is easy, and an eddy current is hardly generated, i.e., a structure in which silicon steel plates are axially stacked, the loss of an electric signal resulting from the generation of an eddy current can be reduced, and the sensitivity of the sensors can be made high.

Further, according to the rolling bearing with a sensor of the first embodiment, at the time of assembling of the rolling bearing device after the first displacement detector 70 and the second displacement detector 71 are fixed to the case member 6 in advance, the eight displacement sensors 84t, 84b, 84f, 84r, 94t, 94b, 94f, and 94r can be simply fixed to the rolling bearing device only by fixing the case member 6 to the outer peripheral surface of the outer ring 1. Further, by screwing the nut 63 to the outer peripheral surface of the small-diameter shaft portion 19 of the inner shaft 1, externally fitting the first spacer 190, the second tubular member 191, and the second spacer 192 to the outer peripheral surface of the nut 63, and fastening the fixing nut 193 to the outer peripheral surface of the nut 63, the target member 73 in the sensor unit 10 can be simply fixed to the inner shaft 1 and the inner ring 2.

That is, it is not necessary to individually attach the two displacement detectors to the outer ring 3, and it is also not necessary to provide the outer ring with an attachment structure, such as through-holes, for mounting of the sensors, unlike a conventional example. Further, the positions of the first and second displacement detectors 70 and 71 relative to the case member 6 will be determined precisely in advance. Accordingly, positioning of the sensor unit 10 to the target member 73 can be made precisely and easily, and the sensor unit 10 can be easily mounted to the hub unit.

In addition, in the rolling bearing device of the above first embodiment, the inner ring 2 that is separate from the inner shaft 1 is fitted to the inner shaft 1. In this invention, however, both two raceway grooves may be formed not in the inner ring but in the inner shaft.

Further, in the rolling bearing device of the first embodiment, the displacement detectors 70 and 71 are fixed to the case member 6. However in the invention, the displacement detectors may be directly attached to the outer ring. Moreover, in the rolling bearing device of the first embodiment, the outer ring 1 constitutes a fixed raceway member, and the inner shaft 2 and the like on the inner circumferential side constitutes a rotating raceway member. However, the inner shaft and the like on the inner circumferential side may constitute the fixed raceway member, and the outer ring may constitute the rotating raceway member.

Further, in the above first embodiment, the rolling bearing device is a hub unit. However, the rolling bearing devices with a sensor of this invention is not limited the hub unit, and may be any kinds of bearing devices, such as a magnetic bearing device (turbo molecular pump), other than the hub unit. This is because it is needless to say that the configuration of the invention described in the first embodiment can be applied to various bearing devices with the needs for measuring a plurality of moment loads or translational loads.

Further, in the rolling bearing with a sensor of the above first embodiment, the rolling elements of a rolling bearing with a sensor to be manufactured are balls. However, in the invention, the rolling elements of the rolling bearing with a sensor to be manufactured may be rollers or may include rollers and balls.

Further, in the rolling bearing with a sensor of the above first embodiment, the hexagonal wrench insertion hole 205 opened to one axial end surface of the nut 63 is formed in the nut 63. In this invention, however, an engaging hole, such as a torque wrench insertion hole opened to one axial end surface of the nut, other than the hexagonal wrench insertion hole opened to one axial end surface of the nut, is formed in the nut.

In addition, if a sealing unit (not shown) that extends radially is installed between a raceway surface axially closest to a target member, and the target member and the displacement-detected portion of the target member 73 is cut and polished in a state where the target member 73 is fixed to the inner shaft 1 when the displacement-detected portion is processed, any variation in the precision of respective members at the time of processing can be canceled, and processing precision can be made high.

This is because, if the target member 73 is fixed to the inner shaft 1 after the target member 73 is processed, any variation in the precision of respective members that constitute the inner shaft 1 or the target member 73, any dimensional change when the first and second spacers 190 and 192, or the second tubular member 191 are press-fitted to the nut 63, or any dimensional change when the inner shaft 1 is press-fitted to the nut 63 becomes a problem, and it is consequently difficult to make the processing precision high.

Further, if a sealing unit (not shown) that extends radially is installed between a raceway surface axially closest to a target member, and the target member, and the displacement-detected portion of the target member 73 is cut and polished in a state where the target member 73 is fixed to the inner shaft 1 and the inner shaft 1 is rotated when the displacement-detected portion is processed, the runout (decentering) of the rolling bearing device can be suppressed, which is more preferable.

Second Embodiment

Next, a second embodiment of the present invention will be described with reference to FIGS. 20 to 33. The portions which are the same as those portions in the first embodiment (FIGS. 1 to 19) will be denoted with the same reference numerals, and a portion of the description will be omitted.

Figure 20:
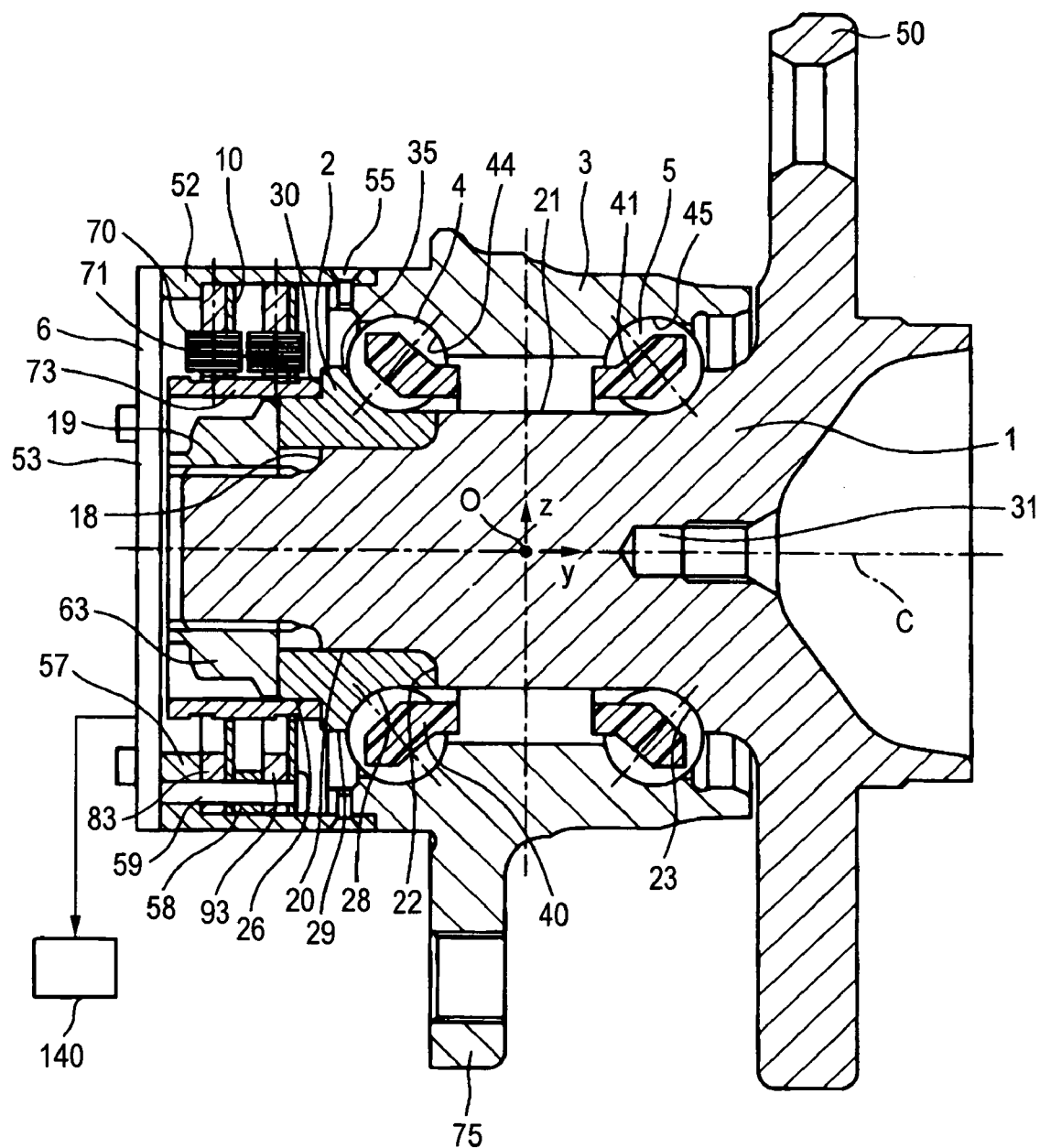
FIG. 20 is an axial sectional view of a hub unit a rolling bearing device with a sensor according to a second embodiment of the invention.

FIG. 20 is an axial sectional view of a hub unit of a rolling bearing device according to the second embodiment of the invention.

An outer peripheral surface of the inner ring 2 has a cylindrical outer peripheral surface 26 at the opposite side of large-diameter shaft portion 21 in the axial direction. The cylindrical outer peripheral surface 26 communicates through a step portion 30 to a raceway shoulder portion 29 located at the opposite side of the large-diameter shaft portion 21 of the raceway groove 28. The raceway shoulder portion 29 has a cylindrical outer peripheral surface 35. An outer diameter of the cylindrical outer surface 26 located at the axial end of the outer peripheral surface of the inner ring 2 is smaller than an outer diameter of the cylindrical outer surface 35 of the raceway shoulder portion 29.

The sensor unit 10 has a first displacement detector 70, a second displacement detector 71, and a target member 73. The first and second displacement detectors 70 and 71 are fixed to an inner peripheral surface of the tubular member 52. Meanwhile, the target member 73 has a tubular shape. One axial end of the target member 73 is pressed into the cylindrical outer peripheral surface 26 of the inner ring 2 by press fitting. In other words, the one end of the target member 73 is externally fitted and fixed to the cylindrical outer peripheral surface 26 serving as one end of the outer peripheral surface of the inner ring 2. The inner shaft 1, the inner ring 2, and the target member 73 constitute the second raceway member, while an outer peripheral surface of the target member 73 becomes a displacement-detected portion.

Figure 21:
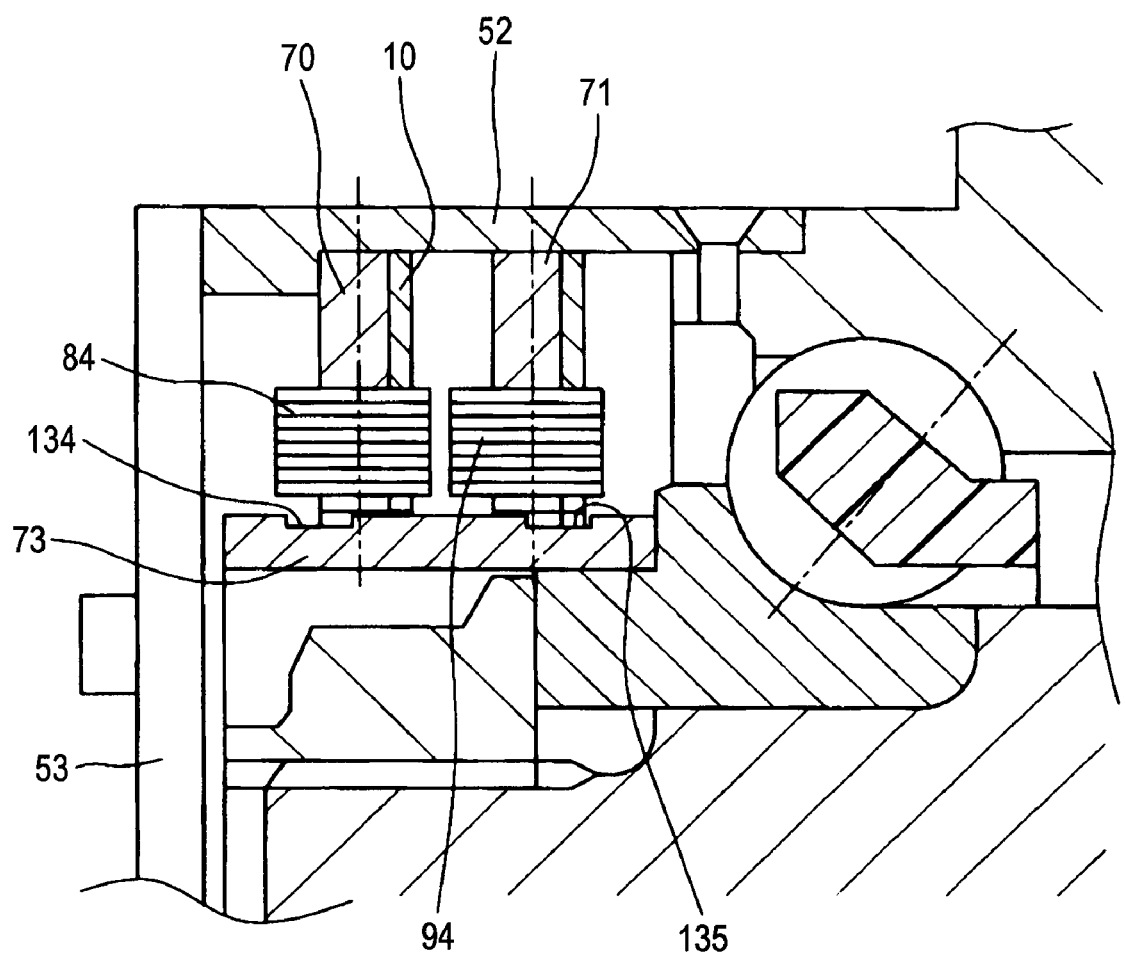
FIG. 21 is an enlarged sectional view around a displacement detector in FIG. 20.

FIG. 21 is an enlarged sectional view around the first displacement detector 70 in FIG. 20.

As shown in FIG. 21, the second displacement detector 71 is located closer to a wheel (the rotor-attaching flange 50) than the first displacement detector 70. The first and second displacement detectors 70 and 71 are fixed to the inner peripheral surface of the tubular member 52. The first displacement detector 70 is the same as the second displacement detector 71, and the first displacement detector 70 is arranged at a distance axially from the second displacement detector 71. The whole first displacement detector 70 overlaps the second displacement detector 71 substantially axially.

The first displacement detector 70 has a sensor ring 83 (refer to FIG. 20), and four displacement sensors 84, and the second displacement detector 71 has a sensor ring 93 (refer to FIG. 20) and four displacement sensors 94. As shown in FIG. 20, the sensor ring 83 and the sensor ring 93 are fixed to a flange 57 of the tubular member 52 by locking screws 59 with an annular spacer 58 interposed therebetween. Each of the displacement sensors 84 extends radially inward from an inner peripheral surface of the sensor ring 83, while each of the displacement sensors 94 extends radially inward from an inner peripheral surface of the sensor ring 93.

The first displacement detector 70 and the second displacement detector 71 can be fixed to the case member 6. Accordingly, only by fixing the case member 6 to the outer peripheral surface of the outer ring 3 as described above after the first displacement detector 70 and the second displacement detector 71 are fixed to the case member 6, the first and second displacement detectors 70 and 71 can be simply fixed to the hub unit. That is, it is not necessary to individually attach the displacement detectors 70 and 71 to the outer ring 3, and it is also not necessary to provide the outer ring 3 with an attachment structure, such as through-holes, for mounting the displacement detectors 70 and 71. Further, since the positions of the displacement detectors 70 and 71 relative to the case member 6 are determined in advance, the displacement detectors 70 and 71 with respect to the target member 73 can be exactly and easily positioned.

Figure 22:
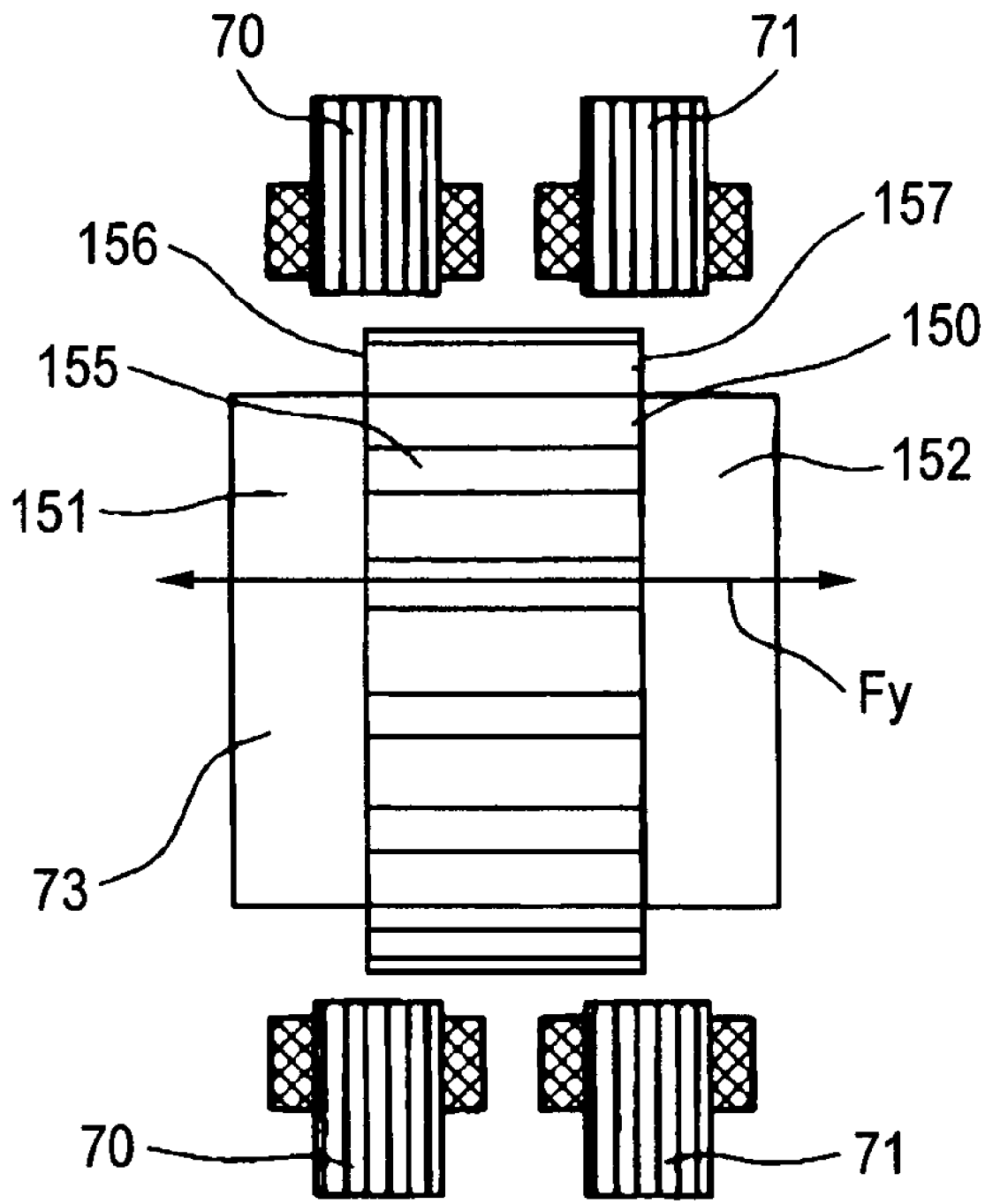
FIG. 22 is a view showing the relationship of a relative position between a first displacement detector and a second displacement detector, and a target member, and showing the structure of an outer peripheral surface of the target member.

FIG. 22 is a view showing the relationship of a relative position between the first displacement detector 70 and the second displacement detector 71, and the target member 73, and showing the structure of the outer peripheral surface of the target member 73.

The outer peripheral surface of the target member 73 has an annular portion 150, a first cylindrical surface portion 151, and a second cylindrical surface portion 152. The annular portion 150, the first cylindrical surface portion 151, and the second cylindrical surface portion 152 have the same central axis. The first cylindrical surface portion 151 is located on one axial side of the annular portion 150, while the second cylindrical surface portion 152 is located on the other axial side of the annular portion 150. The first cylindrical surface portion 151 is connected to the annular portion 150 via a stepped portion 156, while a second cylindrical surface portion 152 is connected to the annular portion 150 via a stepped portion 157. The first cylindrical surface portion 151 and the second cylindrical surface portion 152 are located on almost the same cylindrical surface.

The annular portion 150 has a plurality of same grooves 155. The number of the grooves 155 may be arbitrary if it is a plural number. For example, 96 can be used as the number of the grooves 155. Each of the plurality of grooves 155 axially extends from one axial end of the annular portion 150 to the other axial end of the annular portion 150. The plurality of grooves 155 are arranged at equal intervals in the circumferential direction of the annular portion 150. The bottoms of the grooves 155 of the annular portion 150 are cylinder surfaces, and the outer diameter of the bottoms of the grooves 155 of the annular portion 150 are larger than the outer diameter of the first and second cylindrical surface portions 151 and 152.

In a state where the target member 73 is not displaced, a radial inner end surface of the first displacement detector 70 radially overlaps the end of the first cylindrical surface portion 151 on the side of the annular portion 150, and the end of the annular portion 150 on the side of the first cylindrical surface portion 151, while a radial inner end surface of the second displacement detector 71 radially overlaps the end of the second cylindrical surface portion 152 on the side of the annular portion 150, and the end of the annular portion 150 on the side of the second cylindrical surface portion 152. Referring back to FIG. 21, the outer peripheral surface of the target member 73 has a first annular groove 134 and a second annular groove 135. The first cylindrical surface portion 151 corresponds to a bottom surface of the first annular groove 134, while the second cylindrical surface portion 152 corresponds to a bottom surface of the second annular groove 135.

Figure 23:
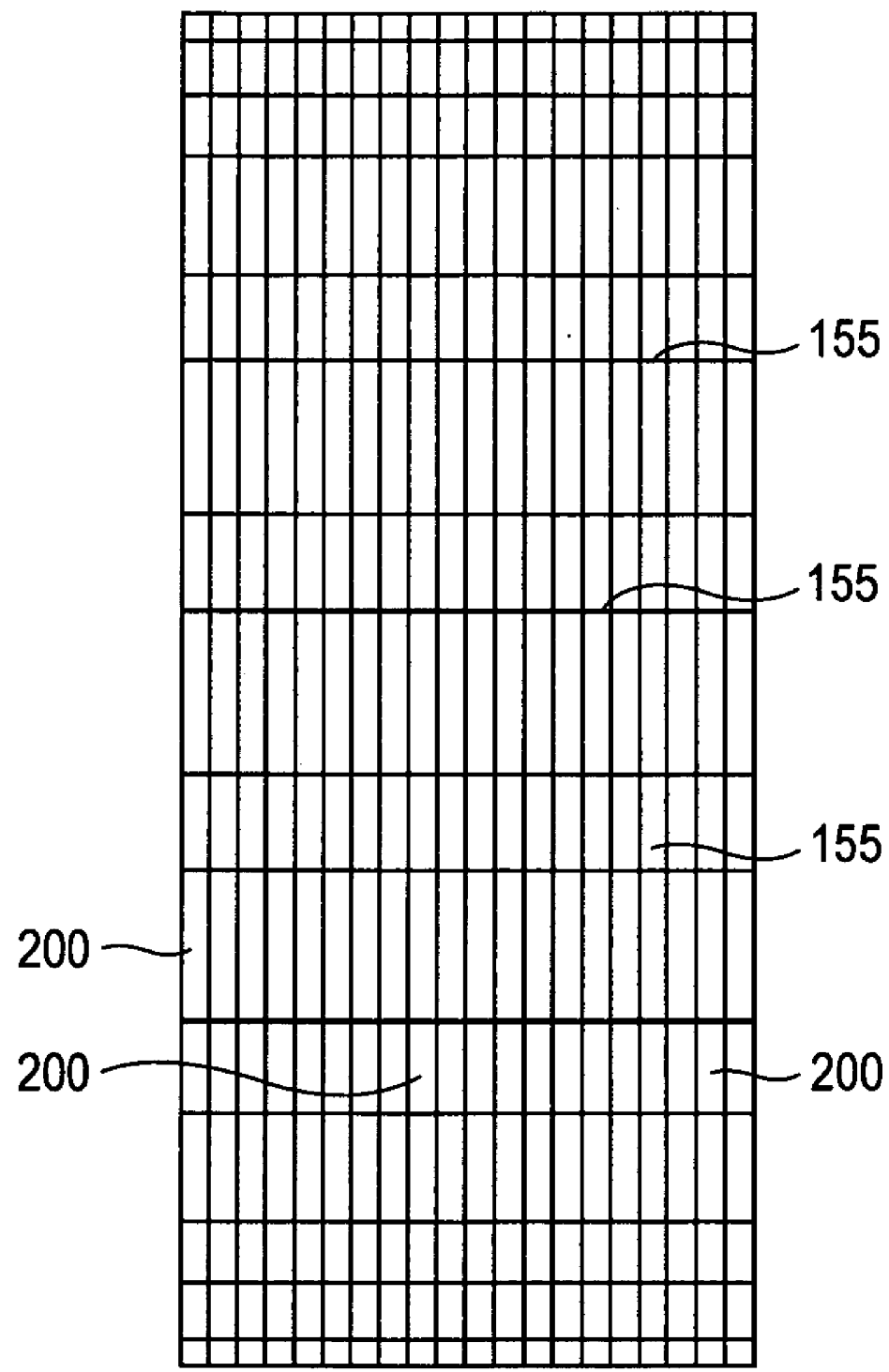
FIG. 23 is a view showing the surface of an annular portion in detail.

FIG. 23 is a view showing the surface of the annular portion 150 in detail.

As shown in FIG. 23, the surface of the annular portion 150 is formed from a silicon steel plate 200 as an example of a steel plate. Specifically, the annular portion 150 is formed by axially stacking a plurality of silicon steel plates 200.

Figure 24:
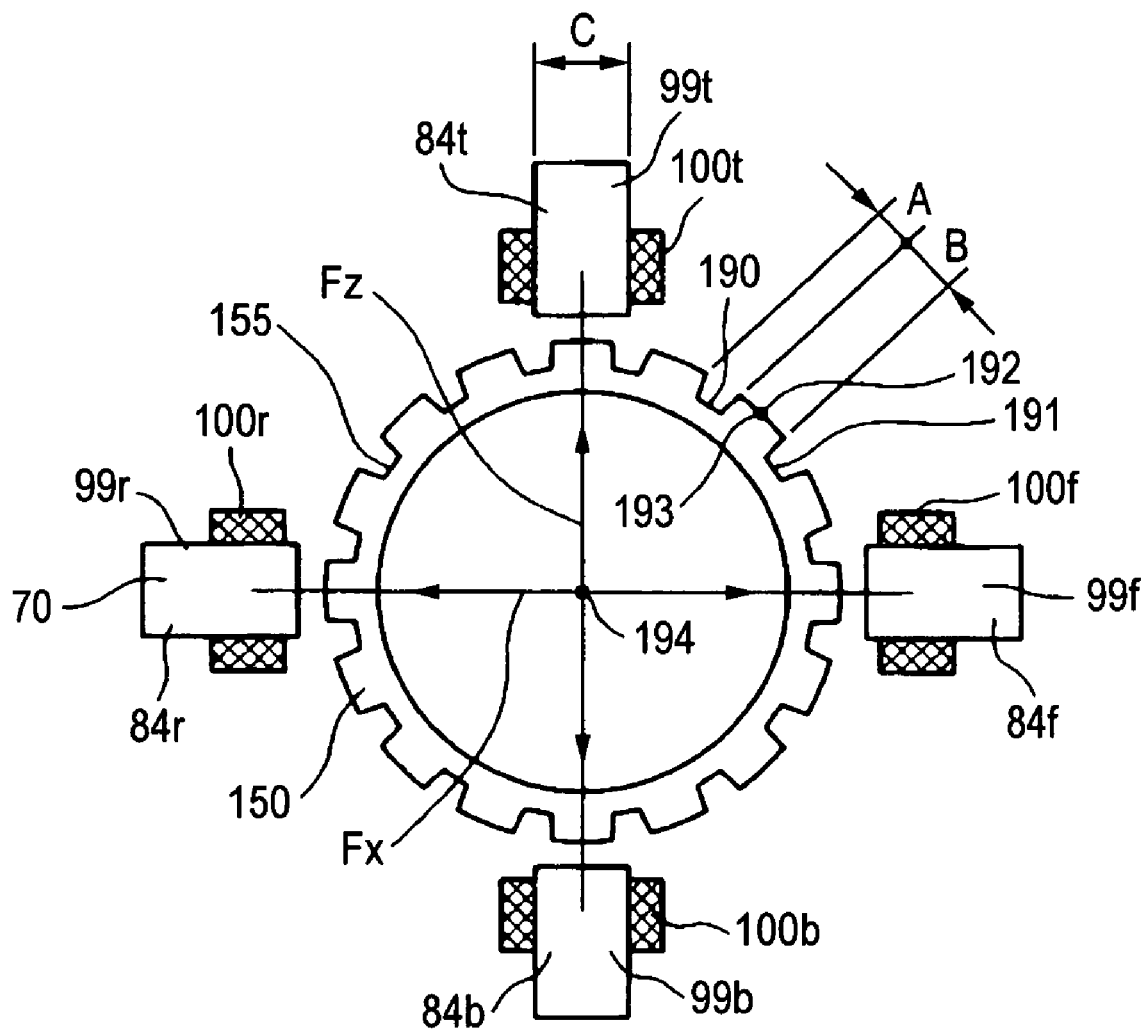
FIG. 24 is an axial sectional view passing through the annular portion and the first displacement detector, illustrating a circumferential arrangement configuration of displacement sensors.

FIG. 24 is an axial sectional view passing through the annular portion 150 and the first displacement detector 70, illustrating a circumferential arrangement configuration of the displacement sensors 84. In addition, although not described, the displacement sensors 94 also have the same circumferential arrangement structure as the displacement sensors 84. The description of the structure and suffixes of the displacement sensors 94 is omitted by the description of the structure and suffixes of the displacement sensors 84 to be made below.

The four displacement sensors 84 are arranged at equal intervals in the circumferential direction of the inner shaft 1. Specifically, the displacement sensors 84 are installed in a position that radially faces the portion of the target member 73 that is located on the vertical topmost side, a position that radially faces the portion of the magnet 73 that is located on the vertical bottommost side, a position that radially faces the foremost position of a vehicle to which the hub unit is attached in the target member 73, and a position that radially faces the rearmost position of the vehicle to which the hub unit is attached in the target member 73, in a state where the hub unit is installed in a predetermined position.

Hereinafter, in a state where the hub unit is installed in a predetermined position, a sensor 84 installed in a position that radially faces the portion of the target member 73 that is located on the vertical topmost side is defined as a sensor $84t$, a sensor 84 installed in a position that radially faces the portion of the target member 73 that is located on the vertical bottommost side is defined as a sensor $84b$, a sensor 84 installed in a position that radially faces the foremost position of a vehicle to which the hub unit is attached in the target member 73 is defined as a sensor $84f$, and a sensor 84 installed in a position that substantially radially faces the rearmost position of the vehicle to which the hub unit is attached in the target member 73 is defined as a sensor $84r$.

As shown in FIG. 24, the displacement sensor $84t$ has a magnetic pole $99t$ and a coil $100t$, the displacement sensor $84b$ has a magnetic pole $99b$ and a coil $100b$, a displacement sensor $84f$ has a magnetic pole $99f$ and a coil $100f$, and the displacement sensor $84r$ has a magnetic pole $99r$ and a coil $100r$.

Each of the magnetic poles $99t$, $99b$, $99f$, and $99r$ is connected to the inner peripheral surface of the sensor ring 83, and extends radially. Further, the coil $100t$ is wound around the magnetic pole $99t$, the coil $100b$ is wound around the magnetic pole $99b$, the coil $100f$ is wound around the magnetic pole $99f$, and the coil $100r$ is wound around the magnetic pole $99r$.

A radial inner end surface of each of the magnetic poles $99t$, $99b$, $99f$, and $99r$ radially faces the outer peripheral surface of the target member 71 via a gap. The radial inner end surface of each of the magnetic poles $99t$, $99b$, $99f$, and $99r$ is a detection surface in each of the displacement sensors $84t$, $84b$, $84f$, and $84r$. The detection surface of the first displacement detector 70 is constituted by the radial inner end surface of the magnetic pole $99t$, the radial inner end surface of the magnetic pole $99b$, the radial inner end surface of the magnetic pole $99f$, and the radial inner end surface of the magnetic pole $99r$. The first displacement detector 70 and the second displacement detector 71 have eight displacement sensors $84t$, $84b$, $84f$, $84r$, $94t$, $94b$, $94f$, and $94r$ in total. The eight displacement sensors $84t$, $84b$, $84f$, $84r$, $94t$, $94b$, $94f$, and $94r$ are the same.

In the sectional view of FIG. 24, when the two grooves 155 that are adjacent to each other in the circumferential direction among the plurality of grooves 155 are defined as a first groove 190 and a second groove 191, a convex located between the first groove 190 and the second groove 191 is defined as an intermediate convex 192, a straight line passing through a circumferential midpoint 193 of the intermediate convex 192 and a center 194 of the annular portion 150 is defined as a convex center passing line, the distance between a straight line parallel to the convex center passing line and passing through one circumferential end of the first groove 190, and a straight line parallel to the convex center passing line and passing through the other circumferential end of the first groove 190 is defined as A [mm], the distance between a straight line parallel to the convex center passing line and passing through one circumferential end of the intermediate convex 192, and a straight line parallel to the convex center passing line and passing through the other circumferential end of the intermediate convex 192 is defined as B [mm], and a quarter of the length of the detection surface of the first displacement detector 70, i.e., the radial inner end surface of the magnetic pole 99*t*, 99*b*, 99*f*, or 99*r* of each of the displacement sensor 84*t*, 84*b*, 84*f*, and 84*r* is defined as C [mm], A<B, C<A+B, and B<C are satisfied.

Figure 25:
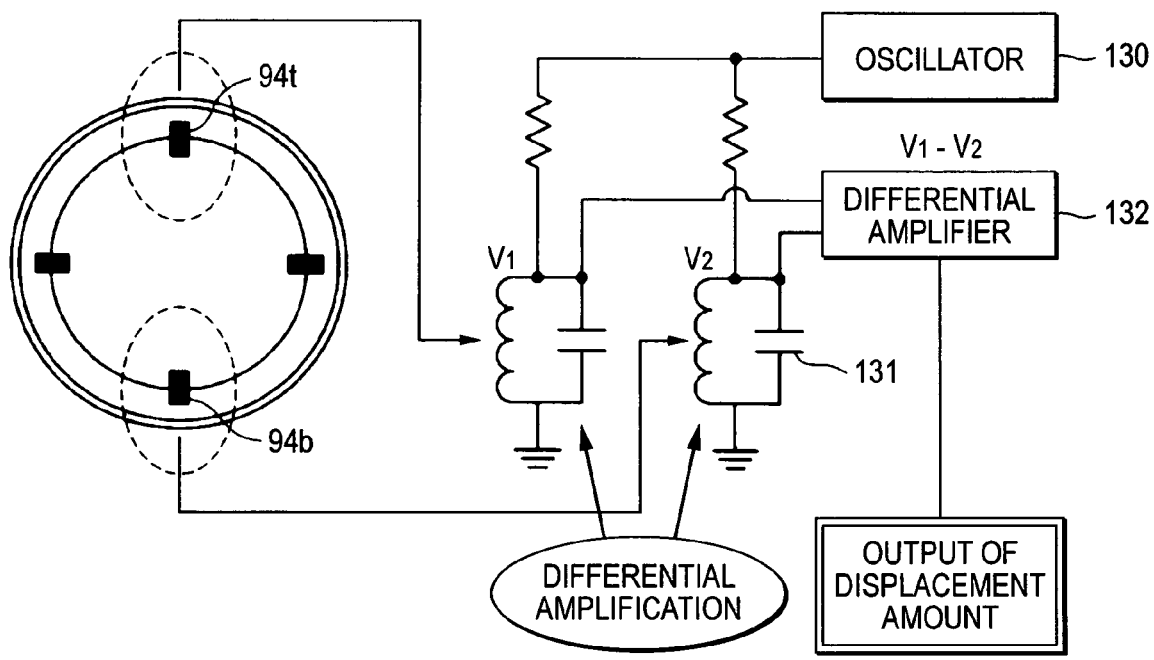
FIG. 25 is a view showing an example of a gap detecting circuit connected to a first displacement detector.

FIG. 25 is a view showing an example of a gap detecting circuit connected to the second displacement detector 71. In addition, although description is omitted, the same gap detecting circuit as one connected to the second displacement detector 71 is also connected to the first displacement detector 70.

As shown in FIG. 25, the two displacement sensors 94*t* and 94*b* that are located in the vertical direction are connected to an oscillator 130. An alternating current during a fixed period is supplied to the displacement sensors 94*t* and 94*b* from the oscillator 130. A synchronizing capacitor 131 is connected in parallel to the displacement sensors 94*t* and 94*b*.

Also, by inputting to a differential amplifier 132 the values of envelopes of output voltages of the displacement sensor 94*t* and the displacement sensor 94*b* (hereinafter, in each displacement sensor, the values of an envelope of output voltages of the displacement sensor, which will be explained below in detail, are called displacement detection values), and taking them as output voltages (displacement detection values) corresponding to the vertical direction, noises of a temperature drift are eliminated, and the sensitivity of a displacement signal in the vertical direction is improved about twice by differential amplification. In addition, although description is omitted, the noise of a temperature drift in the two displacement sensors 94*f* and 94*r* that are located in a front-back direction is also eliminated, and the sensitivity of a displacement signal in the vertical direction is improved about twice by differential amplification, by taking a difference by a differential amplifier similarly to the above.

In each of the displacement sensors 84*t*, 84*b*, 84*f*, 84*r*, 94*t*, 94*b*, 94*f*, and 94*r*, if the inductance is defined as "L", the area of a detection surface of the displacement sensor is defined as "A", permeability is defined as "p", the number of turns of a coil is defined as "N", and the distance (gap) from the detection surface of the displacement sensor to the target member 73 is defined "d", the following Expression (a) is satisfied.

$$L = A \times \mu \times N^2 / d \qquad (a)$$

If the gap d to the target member 73 changes, the inductance L of each of the displacement sensors 84*t*, 84*b*, 84*f*, 84*r*, 94*t*, 94*b*, 94*f* and 94*r* changes, and the output voltages changes. Accordingly, by detecting changes in the output voltages, the radial gap from the detection surface of each of the displacement sensors 84 and 94 to the target member 73 is detected.

Figure 26:
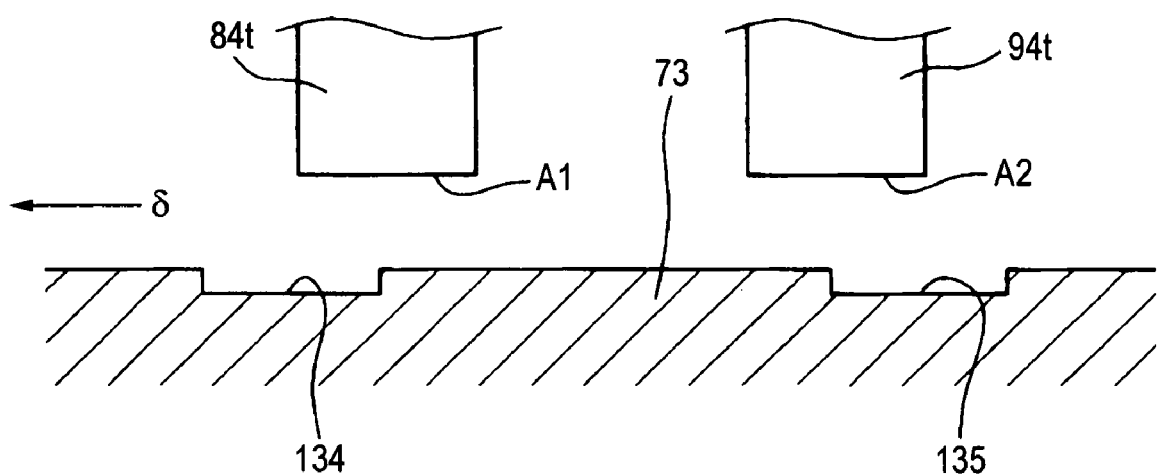
FIG. 26 is a view showing the positional relationship among detection surfaces of the displacement sensors, a first annular groove, and a second annular groove.

FIG. 26 is a view showing the positional relationship among a detection surface A1 of the displacement sensor 84*t*, a detection surface A2 of the displacement sensor 94*t*, the first annular groove 134, and the second annular groove 135.

In addition, although not described, the positional relationship among a detection surface of a displacement sensor 84*b*, a detection surface of a displacement sensor 94*b*, the first annular groove 134, and the second annular groove 135 is the same as the positional relationship among the detection surface A1 of the displacement sensor 84*t*, the detection surface A2 of the displacement sensor 94*t*, the first annular groove 134, and the second annular groove 135. In addition, the positional relationship among a detection surface of a displacement sensor 84*f*, a detection surface of a displacement sensor 94*f*, the first annular groove 134, and the second annular groove 135 is the same as the positional relationship among the detection surface A1 of the displacement sensor 84*t*, the detection surface A2 of the displacement sensor 94*t*, the first annular groove 134, and the second annular groove 135. In addition, the positional relationship among a detection surface of a displacement sensor 84*r*, a detection surface of a displacement sensor 94*r*, the first annular groove 134, and the second annular groove 135 is the same as the positional relationship among the detection surface A1 of the displacement sensor 84*t*, the detection surface A2 of the displacement sensor 94*t*, the first annular groove 1, and the second annular groove 135.

As shown in FIG. 26, in the axial direction, a central portion of the detection surface A1 substantially coincides with the edge of the first annular groove 134 on the side of the second annular groove 135, and a central portion of the detection surface A2 substantially coincides with the edge of the second annular groove 135 on the side of the first annular groove 134.

Supposing the target member 73 has been displaced by a distance δ toward the lid member 53 axially from this state, the axial lap length (axial overlapping length) between the detection surface A1 and the first annular groove 134 decreases, while the axial lap length (axial overlapping length) between the detection surface A2 and the second annular groove 135 increases. From this, a displacement detection value of a gap of a displacement sensor 84 decreases, while a displacement detection value of a gap of a displacement sensor 94 increases. If the target member 73 is axially displaced in this way, a difference is caused between a displacement detection value to be detected by the displacement sensor 84*t*, and a displacement detection value to be detected by the displacement sensor 94*t*.

In a case where the target member 73 has moved axially, the axial positions of the first annular groove 134 and the second annular groove 135 with respect to the displacement sensors 84*t* and 94*t* are set so that the displacement detection values to be detected by the displacement sensor 84*t* and the displacement sensor 94*t* may be changed in positive/negative opposite directions. By taking a difference between the displacement detection value of the displacement sensor 84*t*, and the displacement detection value of the displacement sensor 94*t*, the axial translational amount (this is an axial displacement, and has a correlation with a translational load) of the inner ring 2 (inner shaft 1) is detected.

By taking differences (difference between displacement detection values of displacement sensors having the same suffix) between displacement detection values of the displacement sensors 84*t*, 84*b*, 84*f*, and 84*r* on the center side (hereinafter referred to as "inner side") of the vehicle, and displacement detection values of the displacement sensors 94*t*, 94*b*, 94*f*, and 94*r* on the wheel side (hereinafter referred to as "outer side"), the displacement detection value of the second raceway member to an axial unit translational amount is amplified. This can enhance the detection sensitivity of the axial displacement of the sensor unit 10.

In addition, contrary to the device shown in FIG. 26, the first annular groove on the inner side may be shifted to the outer side from the detection surface of the first displacement detector, and the second annular groove on the outer side may be shifted to the inner side from the detection surface of the second displacement detector. Even in this case, the same operational effects as the above ones can be obtained.

In the same manner as the first embodiment with reference to FIG. 7, the sensor unit 10 has a signal processing section 140, and the respective displacement sensors 84*t*, 84*b*, 84*f*, 84*r*, 94*t*, 94*b*, 94*f*, and 94*r* are connected to the signal processing section 140 via signal lines 36 that pass through the lid member 53 of the case member 6. Output voltages (displacement detection values) obtained from the respective displacement sensors 84*t*, 84*b*, 84*f*, 84*r*, 94*t*, 94*b*, 94*f*, and 94*r* are calculated by an operation method in the signal processing section 140, and thereby, moment loads and translational loads in individual directions, which act on the wheel, are calculated.

The operation method for calculating the displacement detection values is substantially identical to the operation method according to the first embodiment. Therefore, the description thereof is omitted.

Figure 27:
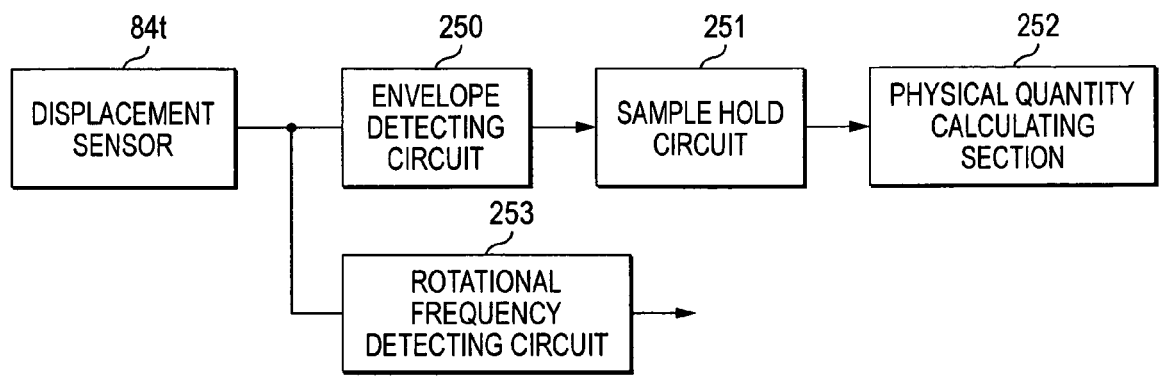
FIG. 27 is a view showing, in each displacement sensor, a method of extracting displacement detection values from detection values of each displacement sensor, and a method of calculating the rotational speed of an inner shaft from the detection values of each displacement sensor.

FIG. 27 is a view showing, in the respective displacement sensors 84*t*, 84*b*, 84*f*, 84*r*, 94*t*, 94*b*, 94*f* and 94*r*, a method of extracting the displacement detection values from detection values of the respective displacement sensors, and a method of calculating the rotational speed of the inner shaft 1 from the detection values of the respective displacement sensors 84*t*, 84*b*, 84*f*, 84*r*, 94*t*, 94*b*, 94*f* and 94*r*.

Hereinafter, a method of finding pulse signals indicating displacement detection values and rotational speed in the displacement sensor 84*t* will be explained as an example. In addition, the displacement sensors 84*b*, 84*f*, 84*r*, 94*t*, 94*b*, 94*f*, and 94*r* also perform the same processing as the displacement sensor 84*t*. The description of the signal processing of the displacement sensors 84*b*, 84*f*, 84*r*, 94*t*, 94*b*, 94*f* and 94*r* is omitted by the description of the signal processing of the displacement sensor 84*t*.

Figure 28:
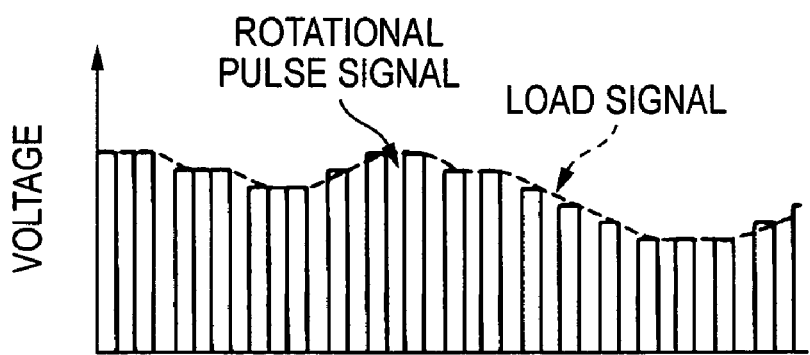
FIG. 28 is a view showing an example of detection values of a displacement sensor.

FIG. 28 is a view showing an example of detection values of the displacement sensor 84*t*. As shown in FIG. 28, the detection values of displacement sensor 84*t* includes a rotation pulse signal resulting from irregularities that appear in the outer peripheral surface of the annular portion 150 due to the grooves 155 formed in the annular portion 150, and load signals related to the position of the first cylindrical surface portion 151, the position of the second cylindrical surface portion 152, and the positions of convexes of the outer peripheral surface of the annular portion 150, relative to the detection surface of the displacement sensor 84*t*.

Figure 29:
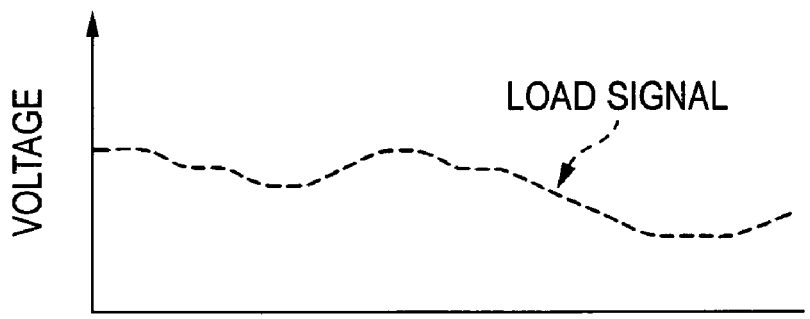
FIG. 29 is a view showing output signals of an envelope detecting circuit.
Figure 30:
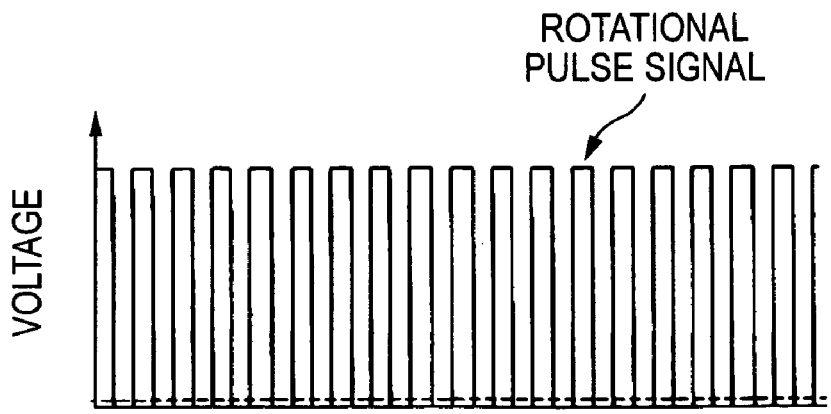
FIG. 30 is a view showing an example of output signals of a rotational frequency detecting circuit.

As shown in FIG. 27, detection values from the displacement sensor 84*t* are input to a well-known envelope detecting circuit 250 as an example of a displacement signal detector. FIG. 29 is a view showing output signals of the envelope detecting circuit 250. As shown in FIG. 29, an envelope of detection values of the displacement sensor 84*t* is extracted by the envelope detecting circuit 250, and the information on the positions of the grooves 155 of the outer peripheral surface of the annular portion 150 in the information on the positions of the outer peripheral surface of the annular portion 150 are removed, while only the information on the positions of the convexes of the outer peripheral surface of the annular portion 150 is picked up.

The load signals shown in FIG. 29 are displacement detection values used for calculation of the plurality of loads that are described above. In this way, displacement detection values are found by the respective displacement sensors 84*t*, 84*b*, 84*f*, 84*r*, 94*t*, 94*b*, 94*f* and 94*r*, and the values are processed in the gap detecting circuit shown in FIG. 25. Thereafter, the signals processed in the gap detecting circuit are processed in a well-known sample hold circuit 251 (refer to FIG. 27). Then, analog signals are properly converted into digital signals by a physical quantity calculating section 252 (refer to FIG. 27), and the respective loads Fx, Fy, Fz, Mx, and Mz are calculated in the process shown in FIG. 17.

As shown in FIG. 27, the detection values from displacement sensor 84*t* are input to the rotational frequency detecting circuit 253 serving as a rotation signal detection section. The rotational frequency detecting circuit 253 compares, the detection values from the displacement sensor 84*t* with a predetermined value as a threshold value, and then converts the detection values from the displacement sensor 84*t* into pulse signals in which a high signal and a low signal are repeated.

FIG. 29 is a view showing an example of output signals of the rotational frequency detecting circuit 253. High signals in the pulse signals are generated on the basis of detection of the grooves 155 of the annular portion 150, while low signals in the pulse signals are generated on the basis of detection of the convexes of the annular portion 150. On the basis of the period of the above pulse signals, the rotational speed of the annular portion 150, i.e., the inner shaft 1 is calculated.

In addition, the gap detecting circuit, the sample hold circuit 251, and the physical quantity calculating section 252 constitute a moment load calculating section. Further, the gap detecting circuit, the envelope detecting circuit 250, the sample hold circuit 251, and the physical quantity calculating section 252 are included in the signal processing section 140.

According to the rolling bearing device of the above embodiment, the first displacement detector 70 and the second displacement detector 71 that are spaced axially from each other are provided. Therefore, not only translational loads based on axial translational displacement can be calculated on the basis of a detection signal of the first displacement detector 70, and a detection signal of the second displacement detection signal 71, but also changes in displacement depending on the axial position of the rolling bearing device can be detected, and moment loads that act on the rolling bearing device can be calculated on the basis of the change in displacement.

Further, while according to the rolling bearing device of the above embodiment, the displacement-detected portion that is an outer peripheral surface of the target member 73 has an annular portion 150 having a plurality of grooves 155 that are arranged at intervals from each other in a circumferential direction of the displacement-detected portion and extend axially, and the sensor unit 10 has a rotational frequency detector 253 that detects a signal associated with the relative rotation of the annular portion 150 on the basis of an output of at least one of the first displacement detector 70 and the second displacement detector 71, and an envelope detecting circuit 250 that detects a signal associated with the displacement of the displacement-detected portion from an output of the first displacement detector 70, and detects a signal associated with the displacement of the displacement-detected portion from an output of the second displacement detector 71. Therefore, by the detection of the positions of the grooves 155 of the annular portion 150 and the convexes connected to the grooves 155 in the circumferential direction, pulse signals associated with the rotational speed of the annular portion 150 can be acquired, and accordingly, the rotational speed of the annular portion 150 can be detected. That is, since the displacement-detected portion whose displacement is to be detected is formed with the annular portion 150 serving as a pulse signal generated portion, the displacement detectors 70 and 71 can also be made to exhibit a rotational speed detection function. Therefore, the rolling bearing device can be made compact, and the manufacturing cost of the rolling bearing device can be suppressed.

Further, according to the rolling bearing device of the above embodiment, the axial translational displacement of the rolling bearing device can be easily and simply detected, and the axial translational loads thereof can be easily detected, by detecting the axial position of the stepped portion 156 between the annular portion 150 and the first cylindrical surface portion 151, and the axial position of the stepped portion 157 between the annular portion 150 and the second cylindrical surface portion 152.

Further, according to the rolling bearing device of the above embodiment, since the surface of the annular portion 150 has a structure in which magnetic properties are good, passage of magnetic fluxes is easy, and an eddy current is hardly generated, i.e., a structure in which a plurality of silicon steel plates 200 (although silicon steel plates are used in the above embodiment, any kind of steel places may be used) are axially stacked, the loss of an electric signal resulting from the generation of an eddy current can be reduced, and the sensitivity of the sensors can be made high.

Further, according to the rolling bearing device of the embodiment, since A<B is satisfied, the annular portion 150 can be easily grooved. Further, since C<A+B is satisfied, the resolution of pulse signals can be made high. Further, since B<C is satisfied, the rotational speed for short time can be calculated.

Further, according to the rolling bearing device of the above embodiment, moment loads that act on a wheel can be calculated in the moment load calculating section. Accordingly, the rotational speed of the wheel, and the moment loads that act on the wheel can be calculated, and operation control during traveling of a vehicle can be precisely performed on the basis of such information.

In addition, in the rolling bearing device of the embodiment, the displacement-detected portion is the outer peripheral surface of the target member 73 that is separate from the inner shaft 1. In the invention, however, the displacement-detected portion may be a portion of an outer peripheral surface of the inner shaft, not the target member. Further, in the rolling bearing device of the embodiment, the inner ring 2 that is separate from the inner shaft 1 is adapted to fit to the inner shaft 1. However, in the invention, the second raceway member may be constituted by only the inner shaft, not the inner ring, or may be constituted by the inner shaft and the target member, and the inner shaft may have two raceway surfaces on the outer peripheral surface of the inner shaft.

Further, in the rolling bearing device of the embodiment, A<B, C<A+B, and B<C are satisfied. In the invention, however, A≧B may be satisfied, C≧A+B may be satisfied, and B≧C may be satisfied.

Further, the sensor unit that can be used in the invention is not limited to the sensor unit 10 used in the above embodiment, and may be sensor units whose portions are shown in FIGS. 31, 32, and 33.

Specifically, like a sensor unit 400 shown in FIG. 31, the annular grooves 134 and 135 may not be formed in the target member 473, but annular striped portion 434 and 435 that have larger (or smaller) permeability than its surrounding constituent material may be formed in positions where the annular grooves 134 and 135 existed. The annular striped portion 434 and 435 can be formed by changing carbon content in the case of, for example, steel.

Further, like a sensor unit 500 shown in FIG. 32, convex portions 541 and 542 whose outer peripheral surfaces are cylinder surfaces may be formed in the positions of the target member 573 where the annular grooves 134 and 135 were formed in the above embodiment, and an annular portion 550 the outer diameter of a convex portion of which is smaller than the convex portions 541 and 542 may be formed in the position where the annular portion 150 was formed.

Further, like a sensor unit 600 shown in FIG. 33, inclined portions 643 and 644 the directions of inclination of which are opposite to each other in an axial section may be formed on an outer peripheral surface of a target member 673, and an annular portion having a groove may be formed in a portion of each of the inclined portions 643 and 644. In addition, although FIG. 33 shows that joined portions of both the inclined portions 643 and 644 are formed in the shape of a valley, the joined portions may be formed as both inclined portions that are formed in the shape of a chevron.

Further, in the rolling bearing device of the embodiment, the displacement detectors 70 and 71 are fixed to the case member 6. However in the invention, the displacement detectors may be directly attached to the outer ring. Moreover, in the rolling bearing device of the embodiment, the outer ring 1 constitutes a fixed raceway member, and the inner shaft 2 and the like on the inner circumferential side constitutes a rotating raceway member. However, the inner shaft and the like on the inner circumferential side may constitute the fixed raceway member, and the outer ring may constitute the rotating raceway member.

Further, the sensor unit that can be used in the invention is not limited to the inductance-type displacement sensor that has been described in the embodiment. That is, the sensor unit that can be used in the invention may be any kinds of displacement sensors as long as they are non-contact-type sensor units that can detect a gap.

Further, in the above embodiment, the rolling bearing device is a hub unit. However, the rolling bearing devices with a sensor of this invention is not limited the hub unit, and may be any kinds of bearing devices, such as a magnetic bearing device, other than the hub unit. This is because it is needless to say that the configuration of the invention described in the embodiment can be applied to various bearing devices with the needs for measuring a plurality of moment loads or translational loads.

Further, in the rolling bearing with a sensor of the above embodiment, the rolling elements of a rolling bearing with a sensor to be manufactured are balls. However, in the invention, the rolling elements of the rolling bearing with a sensor to be manufactured may be rollers or may include rollers and balls.

Third Embodiment

Next, a third embodiment of the present invention will be described with reference to FIGS. 34 to 40. The portions which are the same as those portions in the first embodiment (FIGS. 1 to 19) will be denoted with the same reference numerals, and a portion of the description will be omitted.

Figure 34:
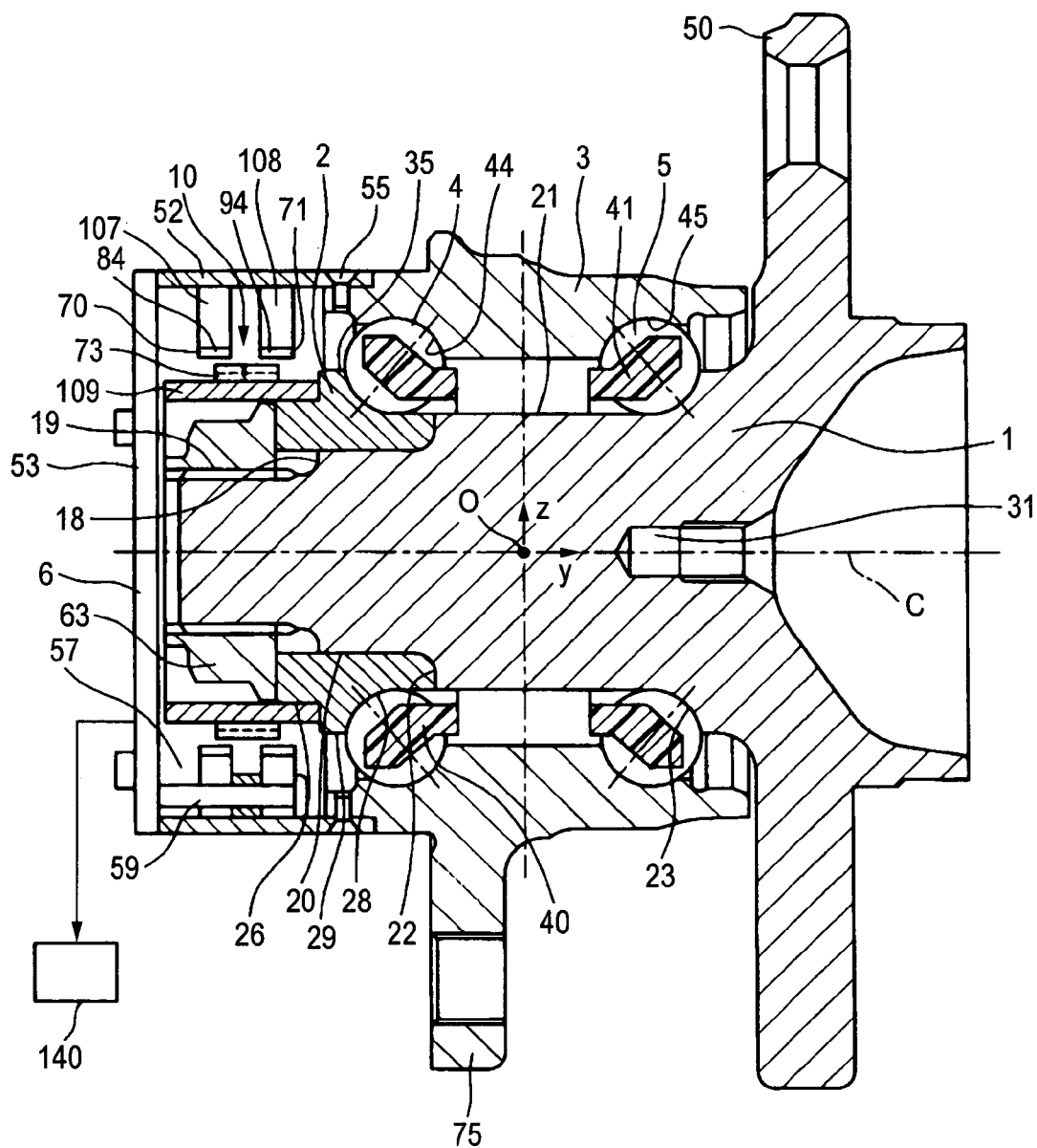
FIG. 34 is an axial sectional view of a hub unit of a rolling bearing device with a sensor according to a third embodiment the invention.

FIG. 34 is an axial sectional view of a hub unit of a rolling bearing device according to a third embodiment the invention.

An outer peripheral surface of the inner ring 2 has a cylindrical outer peripheral surface 26 at the opposite side of large-diameter shaft portion 21 in the axial direction. The cylindrical outer peripheral surface 26 communicates through a step portion 30 to a raceway shoulder portion 29 located at the opposite side of the large-diameter shaft portion 21 of the raceway groove 28. The raceway shoulder portion 29 has a cylindrical outer peripheral surface 35. An outer diameter of the cylindrical outer surface 26 located at the axial end of the outer peripheral surface of the inner ring 2 is smaller than an outer diameter of the cylindrical outer surface 35 of the raceway shoulder portion 29.

The sensor unit 10 has a first displacement detector 70, a second displacement detector 71, and a tubular magnet 73. This rolling bearing device has a first columnar fixing portion 107, a second columnar fixing portion 108, and a magnet fixing member 109. Each of the first fixing portion 107 of a the and the second fixing portion 108 is fixed to an inner peripheral surface of a tubular member 52, and extends radially, and the first fixing portion 107 is arranged at a distance axially from the first fixing portion 107. The first displacement detector 70 is fixed to a radial inner end surface of the first fixing portion 107, while the second displacement detector 71 is fixed to a radial inner end surface of the second fixing portion 108.

The magnet fixing member 109 is a tubular member. One axial end of the magnet fixing member 109 is pressed into a cylindrical outer peripheral surface 26 of the inner ring 2 by press fitting. In other words, the one end of the magnet fixing member 109 is externally fitted and fixed to the cylindrical outer peripheral surface 26 serving as one end of the outer peripheral surface of the inner ring 2.

The inner shaft 1, the inner ring 2, and the magnet fixing member 109 constitute a second raceway member. The tubular magnet 73 is externally fitted and fixed to an outer peripheral surface of the magnet fixing member 109.

Figure 35:
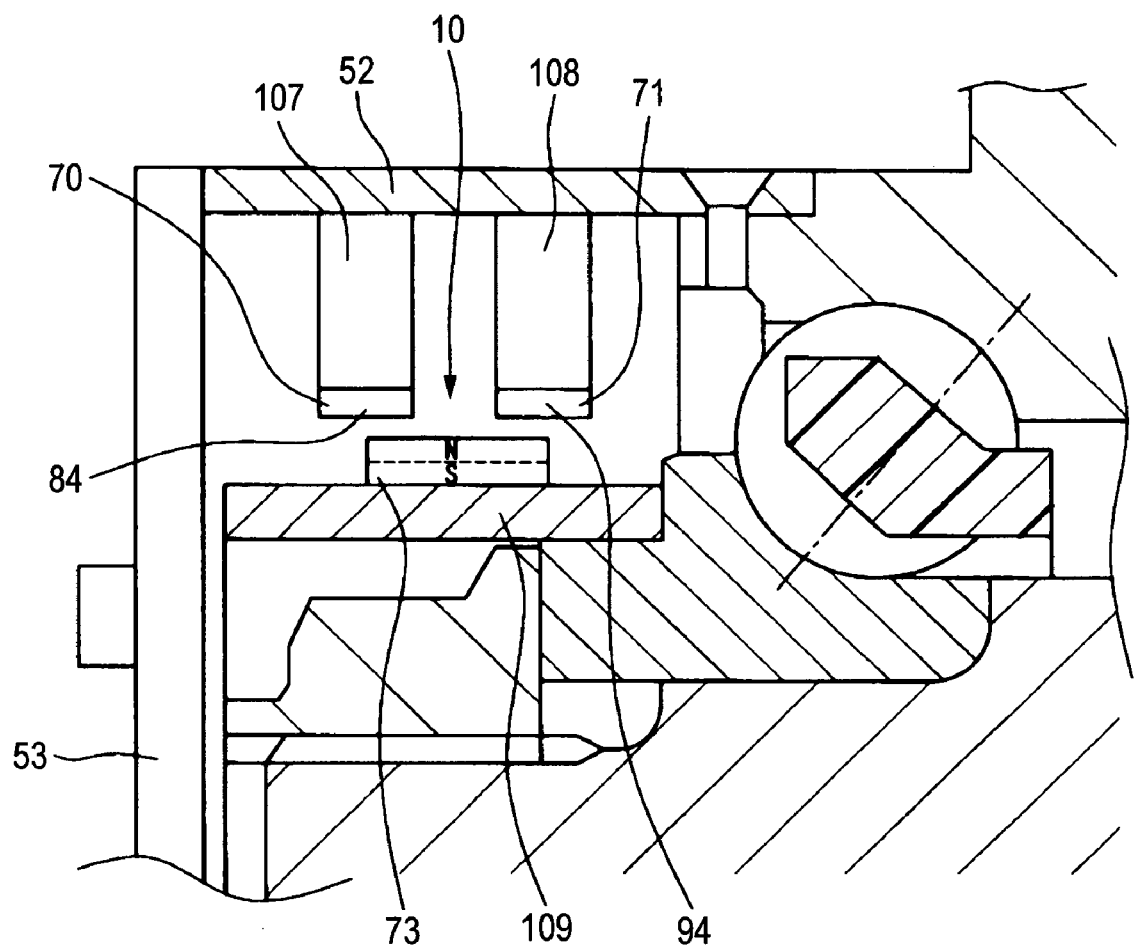
FIG. 35 is an enlarged sectional view around a displacement detector in FIG. 34.

FIG. 35 is an enlarged sectional view around the displacement detectors 70 and 71 in FIG. 34.

As shown in FIG. 35, the second displacement detector 71 is located closer to a wheel (a wheel-attaching flange 50) than the first displacement detector 70. The first displacement detector 70 is the same as the second displacement detector 71, and the first displacement detector 70 is arranged at a distance axially from the second displacement detector 71. The whole first displacement detector 70 overlaps the second displacement detector 71 substantially axially.

The first displacement detector 70 is composed of four hall elements (hereinafter referred to as "first hall elements") 84, while the second displacement detector 71 has four hall elements (hereinafter referred to as "second hall elements") 94.

As described above, the first displacement detector 70 and second displacement detector 71 can be fixed to the case member 6 via the columnar first fixing portion 107 and the second columnar fixing portion 108. Accordingly, only by fixing the case member 6 to the outer peripheral surface of the outer ring 3 as described above after the first displacement detector 70 and the second displacement detector 71 are fixed to the case member 6, the first and second displacement detectors 70 and 71 can be simply fixed to the hub unit. That is, it is not necessary to individually attach the displacement detectors 70 and 71 to the outer ring 3, and it is also not necessary to provide the outer ring 3 with an attachment structure, such as through-holes, for mounting the displacement detectors 70 and 71. Further, since the positions of the displacement detectors 70 and 71 relative to the case member 6 are determined in advance, the displacement detectors 70 and 71 with respect to the magnet 73 can be exactly and easily positioned.

Figure 36:
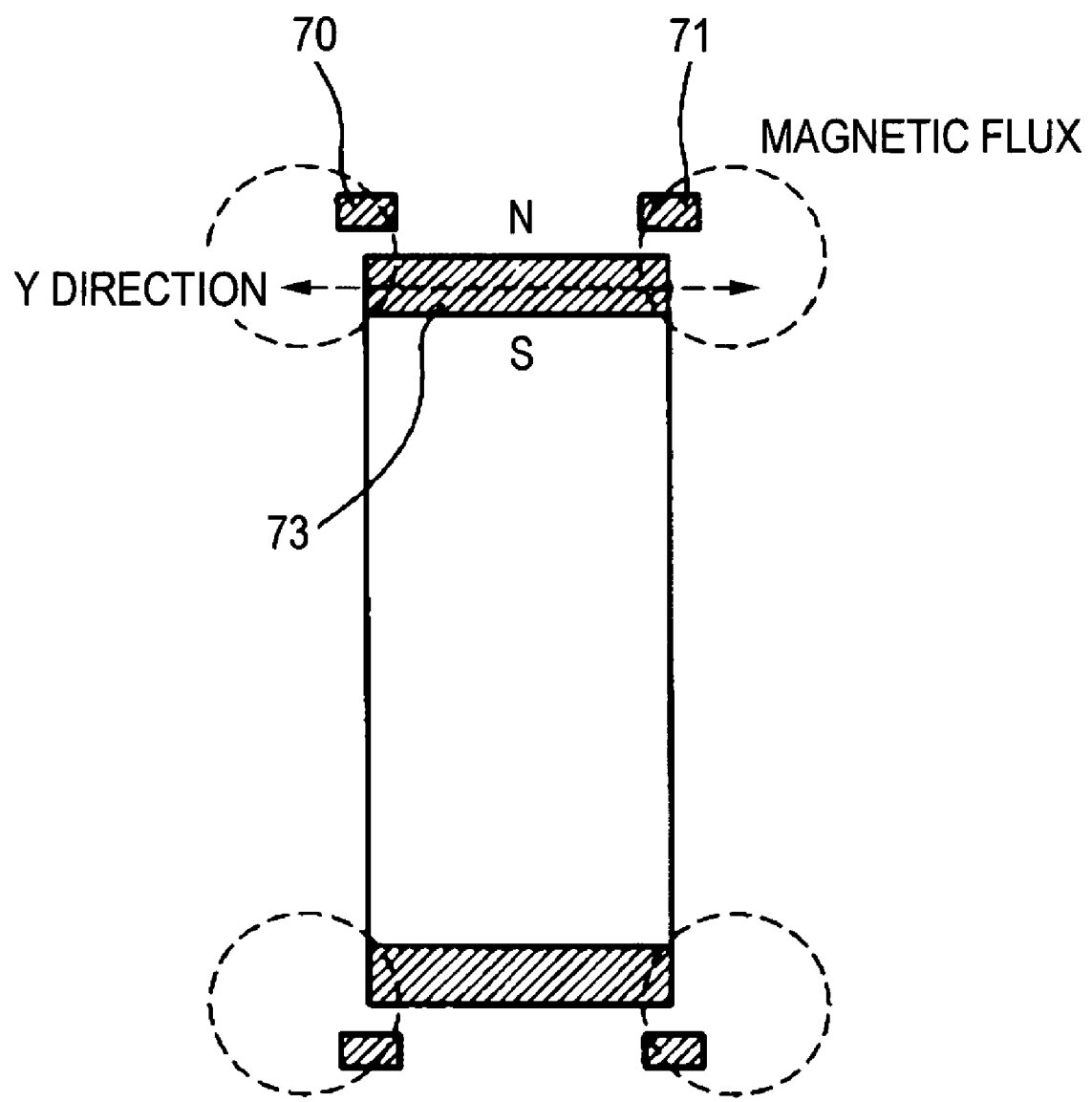
FIG. 36 is a view showing the relationship of a relative position between a first displacement detector and a second displacement detector, and a magnet.

FIG. 36 is a view showing the relationship of a relative position between the first displacement detector 70 and the second displacement detector 71, and the magnet 73.

The magnet 73 is a so-called a pulser ring. N poles and S poles are alternately located in a circumferential direction on the outer peripheral surface of the magnet 73, while S poles and N poles are alternately located in the circumferential direction on the inner peripheral surface of the magnet 73. As shown in FIG. 36, an N-pole portion of the outer peripheral surface of the magnet 73 radially faces an S-pole portion of the inner peripheral surface of the magnet 73, and an S-pole portion of the outer peripheral surface of the magnet 73 radially faces an N-pole portion of the inner peripheral surface of the magnet 73.

As shown in FIG. 36, in the axial section, an axial inner end surface of each of the first hall elements 84, an axial inner end surface of each of the second hall elements 94, and the outer peripheral surface of the magnet 73 are substantially parallel to each other.

An axial central portion in the radial inner end surface of each of the first hall elements 84 radially faces one axial end surface of the magnet 73 at a distance therefrom, while an axial central portion in the radial inner end surface of each of the second hall elements 94 radially faces the other axial end surface of the magnet 73 at a distance therefrom.

Figure 37:
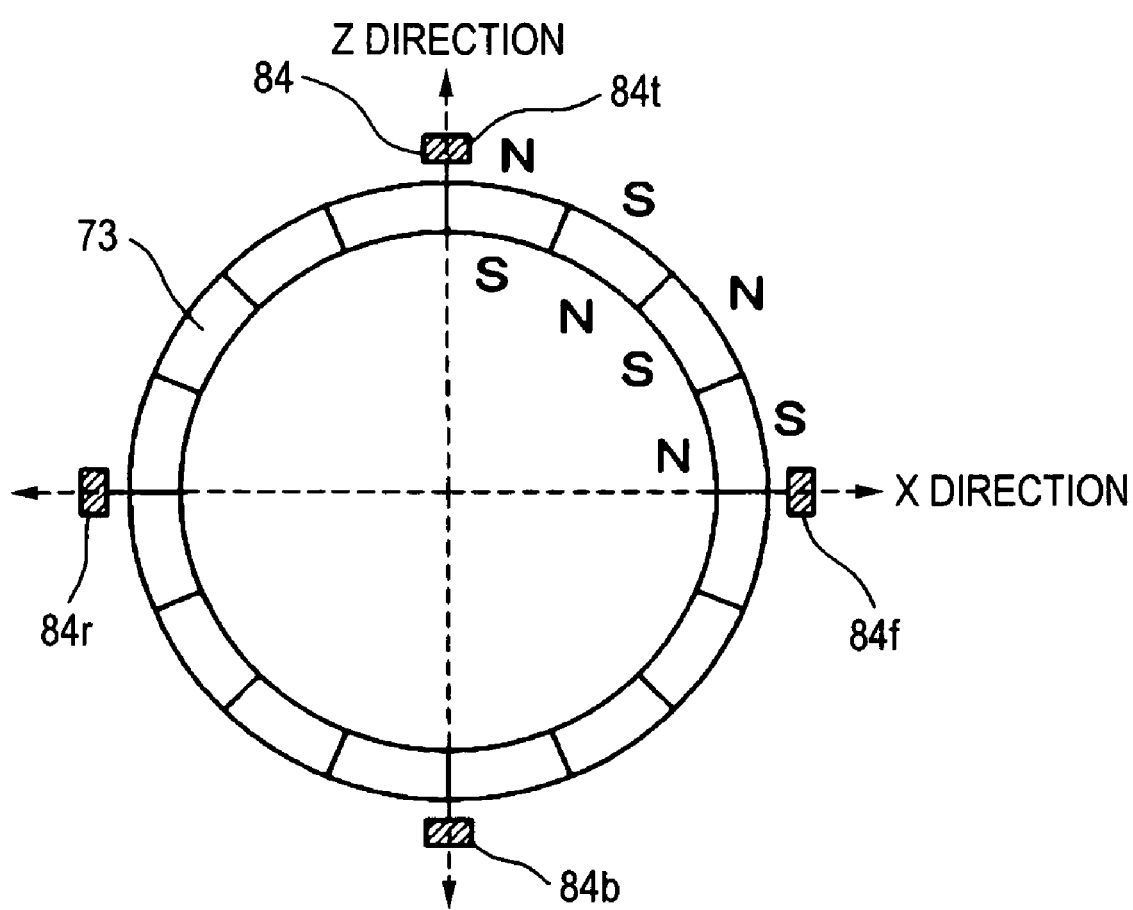
FIG. 37 is a radial sectional view passing through the magnet and the first hall elements.

FIG. 37 is a radial sectional view passing through the magnet 73 and the first hall elements 84, and is a view for explaining a circumferential arrangement configuration of the first hall elements 84. In addition, although not described, the second hall elements 94 also have the same circumferential arrangement structure as the first hall elements 84. The description of the structure and suffixes of the second hall elements 94 is omitted by the description of the structure and suffixes of the first hall elements 84.

The four first hall elements 84 are arranged at equal intervals in the circumferential direction of the inner shaft 1. Specifically, the first hall elements 84 are installed in a position that radially faces the portion of the magnet 73 that is located on the vertical topmost side, a position that radially faces the portion of the magnet 73 that is located on the vertical bottommost side, a position that radially faces the foremost position of a vehicle to which the hub unit is attached in the magnet 73, and a position that radially faces the rearmost position of the vehicle to which the hub unit is attached in the magnet 73, in a state where the hub unit is installed in a predetermined position.

Hereinafter, in a state where the hub unit is installed in a predetermined position, a first hall element 84 installed in a position that radially faces the portion of the magnet 73 that is located on the vertical topmost side is defined as a first hall element 84*t*, a first hall element 84 installed in a position that radially faces the portion of the magnet 73 that is located on the vertical bottommost side is defined as a first hall element 84*b*, a first hall element 84 installed in a position that radially faces the foremost position of a vehicle to which the hub unit is attached in the magnet 73 is defined as a first hall element 84*f*, and a first hall element 84 installed in a position that substantially radially faces the rearmost position of the vehicle to which the hub unit is attached in the magnet 73 is defined as a first hall element 84*r*.

The first displacement detector 70 and the second displacement detector 71 have eight hall elements in total, i.e., the first hall elements 84*t*, 84*b*, 84*f*, and 84*r*, and the second hall elements 94*t*, 94*b*, 94*f*, and 94*r*. The eight hall elements 84*t*, 84*b*, 84*f*, 84*r*, 94*t*, 94*b*, 94*f*, and 94*r* are the same.

Figure 38:
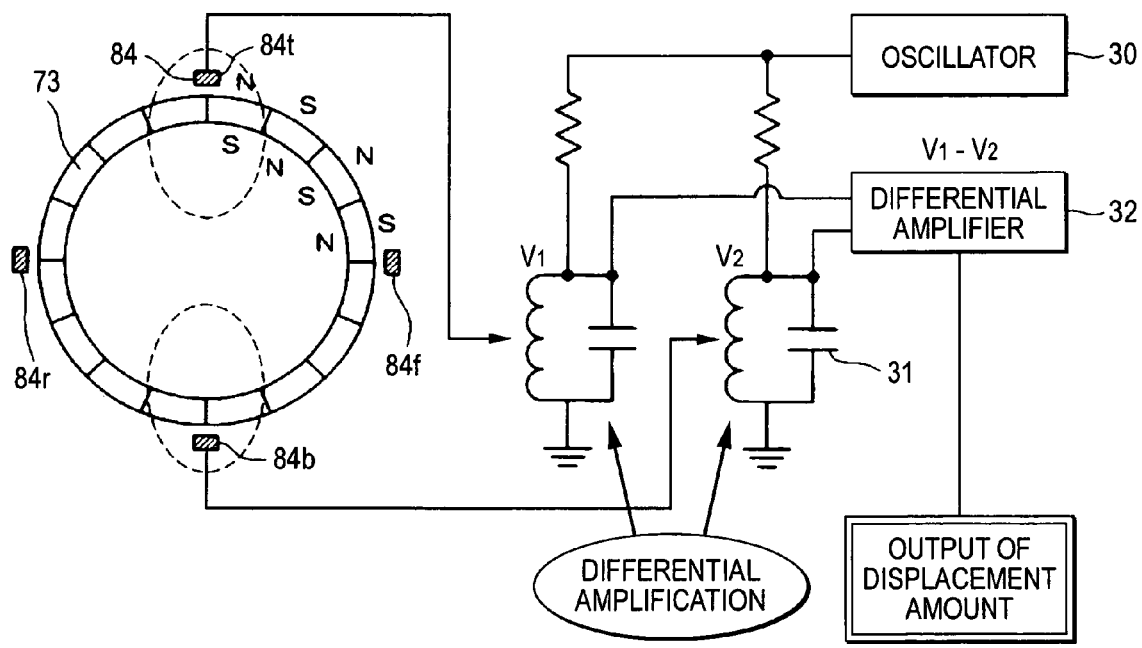
FIG. 38 is a view showing an example of a gap detecting circuit connected to a first displacement detector.

FIG. 38 is a view showing an example of a gap detecting circuit connected to the first displacement detector 70. In addition, although description is omitted, the same gap detecting circuit as one connected to the first displacement detector 70 is also connected to the second displacement detector 71.

As shown in FIG. 38, the two first hall elements 84*t* and 84*b* that are located in the vertical direction are connected to an oscillator 130. An alternating current during a fixed period is supplied to the first hall elements 84*t* and 84*b* from the oscillator 130. A synchronizing capacitor 131 is connected in parallel to the first hall elements 84t and 84b.

Also, by inputting to a differential amplifier 132 the values of envelopes of output voltages of the first hall elements 84t and the first hall elements 84b (hereinafter, in each hall element, the values of an envelope of output voltages of the hall element, which will be explained below in detail, are called displacement detection values), and taking them as output voltages (displacement detection values) corresponding to the vertical direction, noises of a temperature drift are eliminated, and the sensitivity of a displacement signal in the vertical direction is improved about twice by differential amplification. In addition, although description is omitted, the noise of a temperature drift in the two first hall elements 84f and 84r that are located in a front-back direction is also eliminated, and the sensitivity of a displacement signal in the vertical direction is improved about twice by differential amplification, by taking a difference by a differential amplifier similarly to the above.

If the radial gap from the hall elements 84t, 84b, 84f, 84r, 94t, 94b, 94f, and 94r to the magnet 73, and the radial overlap between the hall elements 84t, 84b, 84f, 84r, 94t, 94b, 94f and 94r, and the magnet change, the magnitudes of the magnetic forces detected by the hall elements 84t, 84b, 84f, 84r, 94t, 94b, 94f, and 94r change, and output voltages from the hall elements 84t, 84b, 84f, 84r, 94t, 94b, 94f, and 94r change. Accordingly, by detecting changes in the output voltages, the radial gap from the hall elements 84t, 84b, 84f, 84r, 94t, 94b, 94f, and 94r to the magnet 73 can be detected, and the axial displacement of the magnet 73 are detected.

In a case where the magnet 73 has moved axially, the axial positions of the magnet 73 with respect to the first and second hall elements 84t and 94t are set so that the displacement detection values to be detected by the first hall element 84t and the second hall element 94t may be changed in positive/negative opposite directions. By taking a difference between the displacement detection value of the first hall element 84t, and the displacement detection value of the second hall element 94t, the axial translational amount (this is an axial displacement, and has a correlation with a translational load) of the inner ring 2 (inner shaft 1) is detected.

By taking differences (differences between displacement detection values) of hall elements having the same suffix) between displacement detection values of the first hall elements 84t, 84b, 84f, and 84r on the center side (hereinafter referred to as "inner side") of the vehicle, and displacement detection values of the second hall elements 94t, 94b, 94f, and 94r on the wheel side (hereinafter referred to as "outer side"), the displacement detection value of the second raceway member to an axial unit translational amount is amplified. This can enhance the detection sensitivity of the axial displacement of the sensor unit 10.

In the same manner as the first embodiment with reference to FIG. 7, the sensor unit 10 has a signal processing section 140, and the respective hall elements 84t, 84b, 84f, 84r, 94t, 94b, 94f, and 94r are connected to the signal processing section 140 via signal lines 36 that pass through the lid member 53 of the case member 6. Output voltages (displacement detection values) obtained from the respective hall elements 84t, 84b, 84f, 84r, 94t, 94b, 94f, and 94r are calculated by an operation method in the signal processing section 140, and thereby, moment loads and translational loads in individual directions, which act on the wheel, are calculated.

The operation method for calculating the displacement detection values is substantially identical to the operation method according to the first embodiment. Therefore, the description thereof is omitted. Incidentally, the first hall elements 84t, 84b, 84f, and 84r correspond to the displacement sensor 84t, 84b, 84f, and 84r in the first embodiment, and the second hall element 94t, 94b, 94f, and 94r correspond to the displacement sensor 94t, 94b, 94f, and 94r in the first embodiment.

Figure 39:
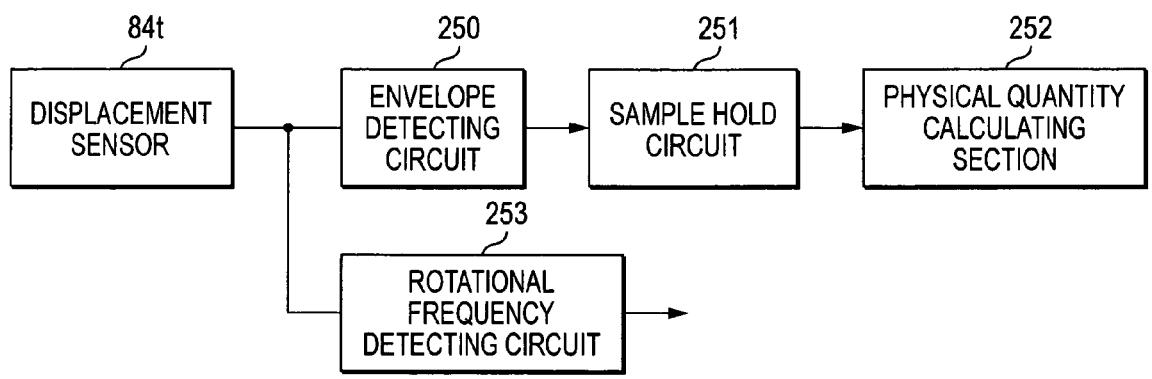
FIG. 39 is a view showing, in each hall element, a method of extracting displacement detection values from detection values of each hall element, and a method of calculating the rotational speed of an inner shaft from the detection values of each hall element.

FIG. 39 is a view showing, in the respective hall elements 84t, 84b, 84f, 84r, 94t, 94b, 94f and 94r, a method of extracting the displacement detection values from detection values of the respective hall elements, and a method of calculating the rotational speed of the inner shaft 1 from the detection values of the respective hall elements 84t, 84b, 84f, 84r, 94t, 94b, 94f and 94r.

Hereinafter, a method of finding pulse signals indicating displacement detection values and rotational speed in the first hall element 84t will be explained as an example. In addition, the hall elements 84b, 84f, 84r, 94t, 94b, 94f, and 94r also perform the same processing as the first hall element 84t. The description of the signal processing of the hall elements 84b, 84f, 84r, 94t, 94b, 94f and 94r is omitted by the description of the signal processing of the hall element 84t.

Figure 40:
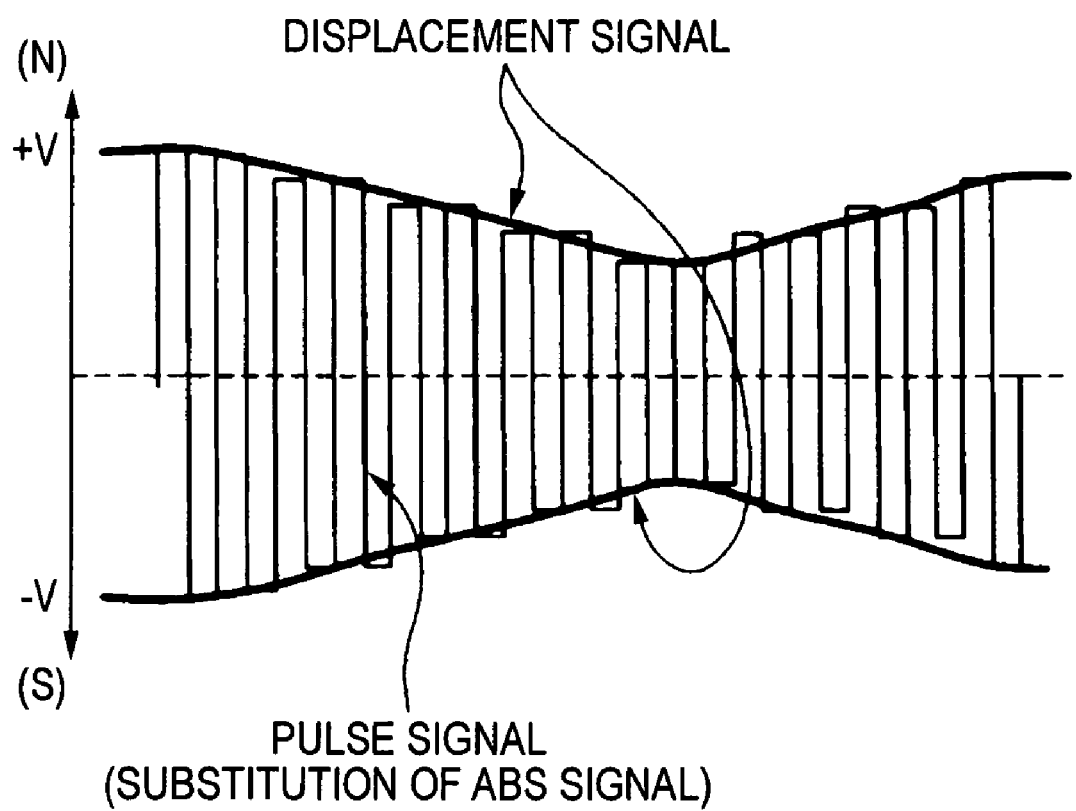
FIG. 40 is a view showing an example of detection values of a first hall element.

FIG. 40 is a view showing an example of detection values of the first hall element 84t. As shown in FIG. 40, the detection values of the first hall element 84t include a rotation pulse signal resulting from N poles and S poles alternately magnetized in the circumferential direction by the magnet 73, and a load signal related to the position of the magnet 73 to the first hall element 84t.

As shown in FIG. 39, detection values from the first hall element 84t are input to a well-known envelope detecting circuit 250 serving as an example of a displacement signal detector. An envelope of detection values of the first hall element 84t is extracted by the envelope detecting circuit 250, and only a load signal related to the position of the magnet 73 to the first hall element 84t is picked up.

This load signals are displacement detection values used for calculation of the plurality of loads that are described above. In this way, displacement detection values are found by the respective hall elements 84t, 84b, 84f, 84r, 94t, 94b, 94f and 94r, and the values are processed in the gap detecting circuit shown in FIG. 38. Thereafter, the signals processed in the gap detecting circuit are processed in a well-known sample hold circuit 251 (refer to FIG. 39). Then, analog signals are properly converted into digital signals by a physical quantity calculating section 252 (refer to FIG. 39), and the respective loads Fx, Fy, Fz, Mx, and Mz are calculated in the process shown in FIG. 18.

As shown in FIG. 39, the detection values from the first hall element 84t are input to a rotational frequency detecting circuit 253 serving as a rotation signal detection section. The rotational frequency detecting circuit 253 compares, the detection values from the first hall element 84t with a predetermined value as a threshold value, and then converts the detection values from the first hall element 84t into pulse signals in which a high signal and a low signal are repeated. On the basis of the period of the above pulse signals, the rotational speed of an annular portion 150, i.e., the inner shaft 1 is calculated.

In addition, the gap detecting circuit, the sample hold circuit 251, and the physical quantity calculating section 252 constitute a moment load calculating section. Further, the gap detecting circuit, the envelope detecting circuit 250, the sample hold circuit 251, and the physical quantity calculating section 252 are included in the signal processing section 140.

According to the rolling bearing device of the third embodiment, the first displacement detector 70 and the second displacement detector 71 that are spaced axially from each other are provided. Therefore, not only translational loads based on axial translational displacement can be calculated on the basis of a detection signal of the first displacement detector 70, and a detection signal of the second displacement detection signal 71, but also changes in displacement depending on the axial position of the rolling bearing device can be detected, and moment loads that act on the rolling bearing device can be calculated on the basis of the change in displacement.

According to the rolling bearing device of the third embodiment, the cylindrical magnet 73 is externally fitted to an outer peripheral surface of the magnet fixing member 109 that forms a portion of the second raceway member, N poles and S poles are alternately located in a circumferential direction on an outer peripheral surface of the magnet 73, while S poles and N poles are alternately located in the circumferential direction on an inner peripheral surface of the magnet 73, and when the magnet 73 is relatively rotated, the first hall elements 84*t*, 84*b*, 84*f*, and 84*r* and the second hall elements 94*t*, 94*b*, 94*f* and 94*r* are arranged in positions where magnetic information generated by the N poles and the S poles can be read. Therefore, at least one of the first hall elements 84*t*, 84*b*, 84*f*, and 84*r* and the second hall elements 94*t*, 94*b*, 94*f* and 94*r*, the information on the rotation of the magnet 73 can be picked up, and accordingly, the information on the rotation can be converted into the rotational speed of the inner shaft 1 by the rotational frequency detecting circuit 253.

That is, according to the rolling bearing device of the third embodiment, the magnet 73 whose displacement is to be detected can also be made to exhibit a rotational speed detection function. Therefore, the rolling bearing device can be made compact, and the manufacturing cost of the rolling bearing device can be suppressed.

Further, according to the rolling bearing device of the third embodiment, the first displacement detector 70 and the second displacement detector 71 are the same, the whole first displacement detector 70 overlaps the second displacement detector 71 substantially axially, and the first displacement detector 70 has four same hall elements 84*t*, 84*b*, 84*f*, and 84*r* that are disposed at equal intervals in the circumferential direction. Therefore, changes in displacement depending on the axial position of the rolling bearing device can be easily and precisely detected. Accordingly, moment loads can be precisely detected.

Further, according to the rolling bearing device of the third embodiment, moment loads that act on a wheel can be calculated in the moment load calculating section. Accordingly, the rotational speed of the wheel, and the moment loads that act on the wheel can be calculated, and operation control during traveling of a vehicle can be precisely performed on the basis of such information.

Further, according to the rolling bearing device of the third embodiment, the moment load calculating section calculates, in each of the first hall elements 84*t*, 84*b*, 84*f*, and 84*r*, differences between signals associated with the displacement of the magnet 73, of the first hall elements 84*t*, 84*b*, 84*f*, and 84*r* and signals associated with the displacement of the magnet 73, of the second hall elements 94*t*, 94*b*, 94*f*, and 94*r* that overlap the first hall elements 84*t*, 84*b*, 84*f*, and 84*r* substantially axially, and then calculates moment loads that act on a wheel on the basis of the differences. Therefore, the sensitivity of detection of displacement in a detection direction can be approximately doubled, and the noise of a temperature drift in the detection direction can be removed.

In addition, in the rolling bearing device of the third embodiment, the tubular magnet 73 is fixed to the outer peripheral surface of the magnet fixing member 109 fixed to the inner ring 2. In the invention, however, the tubular magnet may be fixed to the outer peripheral surface of the inner shaft, and the outer peripheral surface of the inner ring.

Further, in the rolling bearing device of the third embodiment, the inner ring 2 that is separate from the inner shaft 1 is adapted to fit to the inner shaft 1. However, in the invention, the second raceway member may be constituted by only the inner shaft, not the inner ring, or the inner shaft may have two raceway surfaces on the outer peripheral surface of the inner shaft.

Further, in the rolling bearing device of the third embodiment, the displacement detectors 70 and 71 are fixed to the case member 6 via the fixing portions 107 and 108. However in the invention, the displacement detectors may be directly attached to the case member. Further, the displacement detectors may be attached to the outer ring via a member, and the displacement detectors may be attached to directly to the outer ring.

Further, in the rolling bearing device of the third embodiment, the outer ring 3 constitutes a fixed raceway ring, and the inner shaft 2 and the like on the inner circumferential side constitutes a rotating raceway ring. However, the inner shaft and the like on the inner circumferential side may constitute the fixed raceway ring, and the outer ring may constitute the rotating raceway ring.

Further, in the third embodiment, the rolling bearing device is a hub unit. However, the rolling bearing devices with a sensor of this invention is not limited the hub unit, and may be any kinds of bearing devices other than the hub unit. This is because it is needless to say that the configuration of the invention described in the third embodiment can be applied to various bearing devices with the needs for measuring a plurality of moment loads or translational loads.

Further, in the rolling bearing with a sensor of the third embodiment, the rolling elements of a rolling bearing with a sensor to be manufactured are balls. However, in the invention, the rolling elements of the rolling bearing with a sensor to be manufactured may be rollers or may include rollers and balls.

Fourth Embodiment

Next, a third embodiment of the present invention will be described with reference to FIGS. 41 to 44. The portions which are the same as those portions in the first embodiment (FIGS. 20 to 33) will be denoted with the same reference numerals, and a portion of the description will be omitted.

Figure 41:
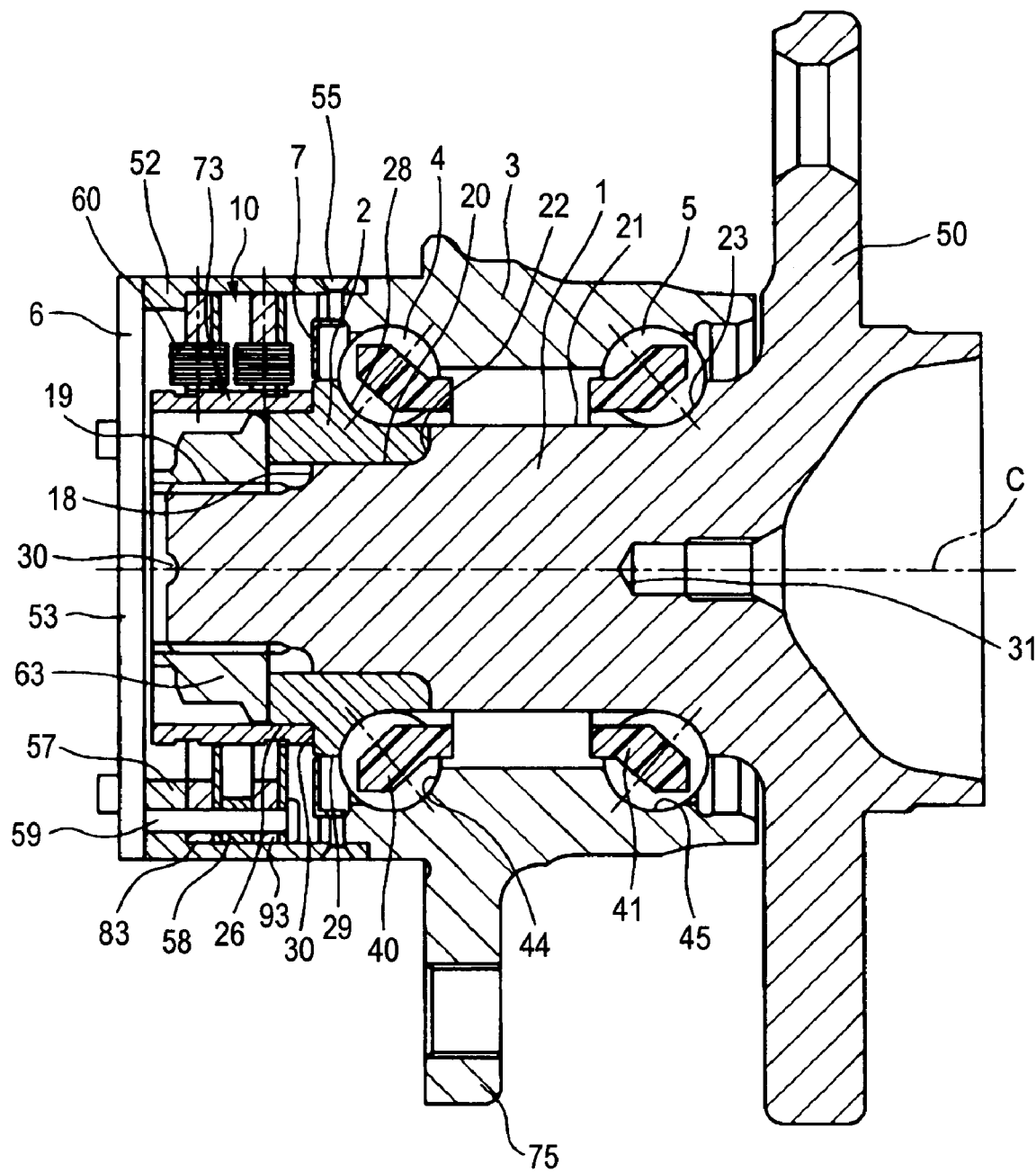
FIG. 41 is an axial sectional view of a rolling bearing device with a sensor manufactured by a manufacturing method of the rolling bearing device according to a fourth embodiment of the invention.

FIG. 41 is an axial sectional view of a rolling bearing device manufactured by a manufacturing method of a rolling bearing device according to a fourth embodiment of the invention.

This rolling bearing device is a hub unit. This rolling bearing device includes an inner shaft 1, an inner ring 2, an outer ring 3, a plurality of first balls 4 serving as first rolling elements, a plurality of second balls 5 serving as second rolling elements, a case member 6, a shielding plate 7 serving as a sealing unit, and a displacement sensor unit 10.

The inner shaft 1 has a first center hole 30 and a second center hole 31. The first center hole 30 is formed in an axial central portion of an axial end surface of the inner shaft 1 on the side of the small-diameter shaft portion 19, while the second center hole 31 is formed in an axial central portion of an axial end surface of the inner shaft 1 on the side of the large-diameter shaft portion 21. The first center hole 30 has a substantially semi-spherical shape, while the second center hole 31 has a cylindrical portion, and extends by a predetermined distance axially. Further, the inner shaft 1 has a wheel-attaching flange 50 for attaching a wheel (not shown) to an axial end thereof on the side of the large-diameter shaft portion 21.

The inner ring 2 is externally fitted and fixed to an outer peripheral surface of the middle-diameter shaft portion 20 of the inner shaft 1. An axial end surface of the inner ring 2 on the side of the large-diameter shaft portion 21 abuts on the stepped portion 22. The inner ring 2 has an angular raceway groove 28 serving as an outer circumferential raceway surface in its outer peripheral surface on the side of the large-diameter shaft portion 21. The outer diameter of the raceway groove 28 becomes large as being separated from the large-diameter shaft portion 22. An axial portion of an outer peripheral surface of the inner ring 2 opposite the large-diameter shaft portion 21 has a cylindrical outer peripheral surface 26, and the cylindrical outer peripheral surface 26 is connected to a raceway shoulder 29 of the raceway groove 28, which is located opposite the large-diameter shaft portion 21, via a stepped portion 30. The raceway shoulder 29 has a cylindrical outer peripheral surface. The outer diameter of the cylindrical outer peripheral surface 26 is smaller than the outer diameter of the cylindrical outer peripheral surface of the raceway shoulder 29.

The shielding plate 7 seals a gap between an axial end of an inner peripheral surface of the outer ring 3 on the side of the first raceway groove 44, and the cylindrical outer peripheral surface of the raceway shoulder 29 of the inner ring 2 by a labyrinth seal. Specifically, the shielding plate 7 has a substantially L-shaped section, and has an axially extending portion and a radially extending portion. The axially extending portion has a tubular shape and extends axially. On the other hand, the radially extending portion extends radially inward from one end of the axially extending portion. A cylindrical outer peripheral surface of the axially extending portion is internally fitted and fixed to an end of an inner peripheral surface of the outer ring 3 on the side of the small-diameter shaft portion 19. Meanwhile, the radially extending portion radially faces the cylindrical outer peripheral surface of the raceway shoulder 29 via a slight gap.

The displacement sensor unit 10 has a sensor body 60, and a target member 73. The sensor body 60 is fixed to an inner peripheral surface of the tubular member 52. Meanwhile, the target member 73 has a tubular shape. One axial end of the target member 73 is pressed into the cylindrical outer peripheral surface 26 of the inner ring 2 by press fitting. In other words, the one end of the target member 73 is externally fitted and fixed to the cylindrical outer peripheral surface 26 serving as one end of the outer peripheral surface of the inner ring 2.

Figure 42:
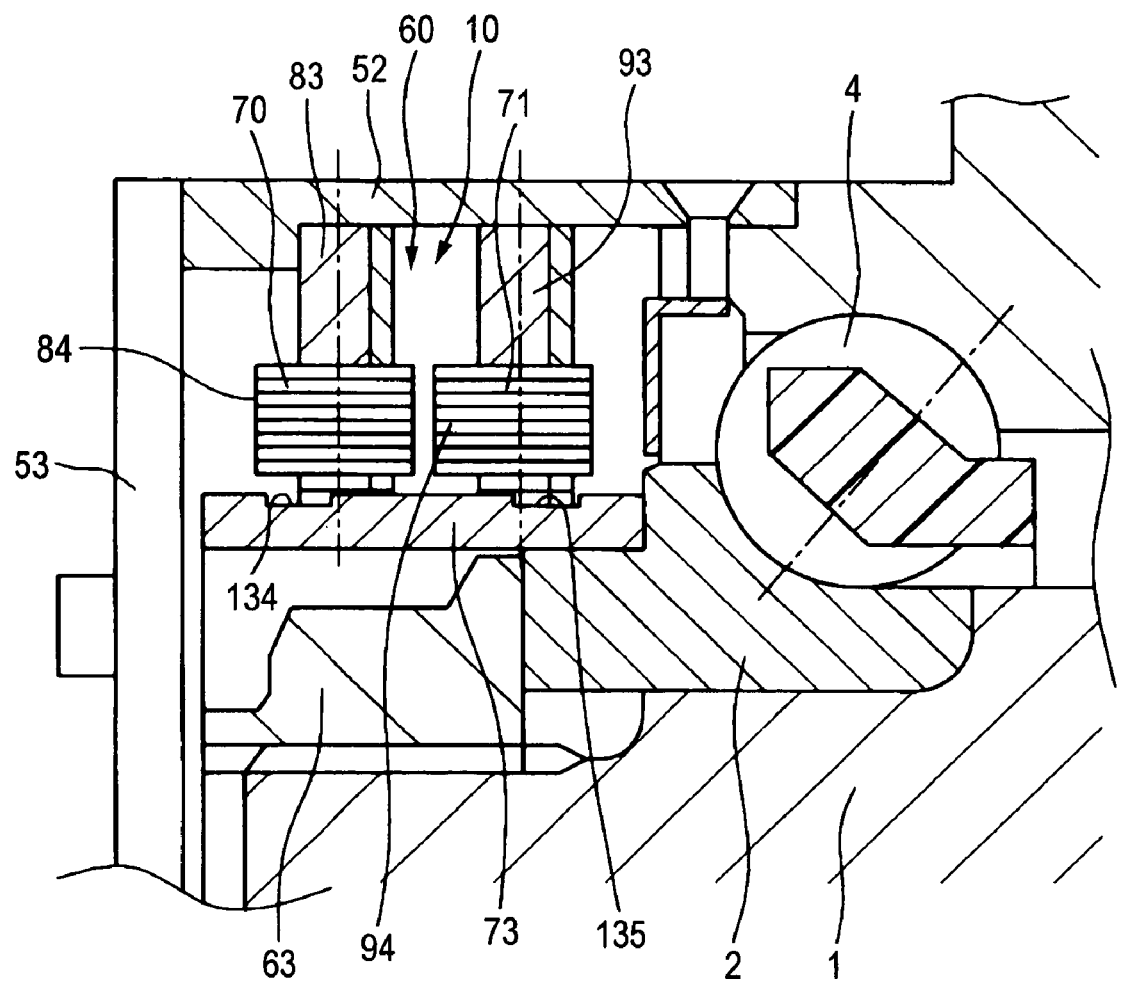
FIG. 42 is an enlarged sectional view around displacement sensors in FIG. 14.

FIG. 42 is an enlarged sectional view around the displacement sensor unit 10 in FIG. 41.

Referring back to FIG. 42, the outer peripheral surface of the target member 73 has a first annular groove 134 and a second annular groove 135. As shown in FIG. 41, a portion of the first annular groove 134 exists in a position that radially a detection surface of the displacement sensor 84, while a portion of the second annular groove 135 exists in a position that radially faces a detection surface of the displacement sensor 94.

Figure 43:
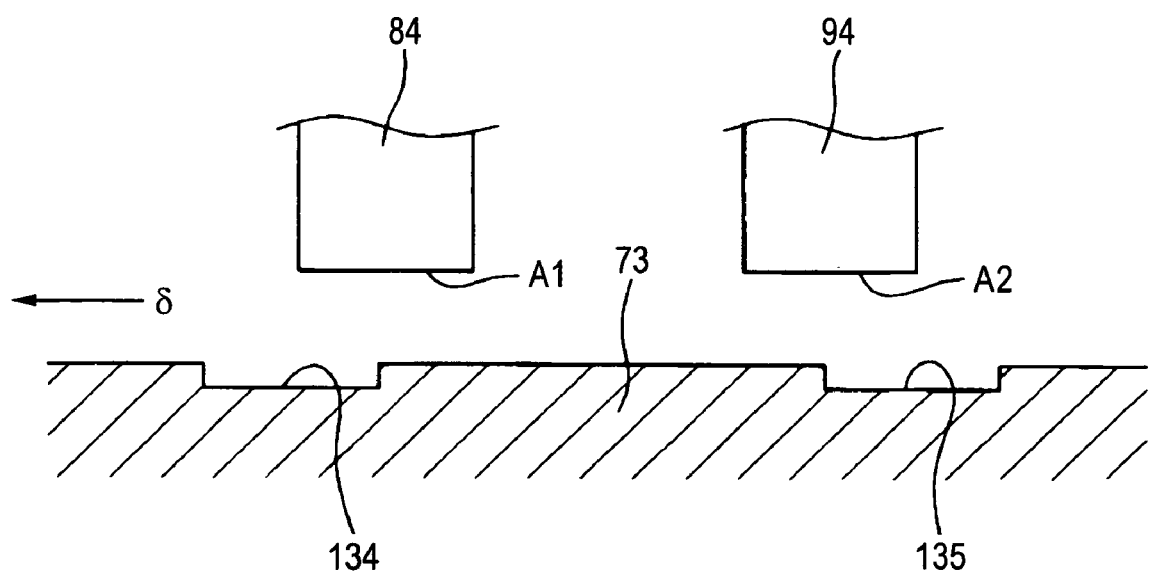
FIG. 43 is a view showing the positional relationship among a detection surface of a displacement sensor of a first displacement detector, a detection surface of a displacement sensor of a second displacement detector, a first annular groove, and a second annular groove.

FIG. 43 is a view showing the positional relationship among a detection surface A1 of the displacement sensor 84, a detection surface A2 of the displacement sensor 94, the first annular groove 134, and the second annular groove 135.

As shown in FIG. 43, in the axial direction, a central portion of the detection surface A1 substantially coincides with the edge of the first annular groove 134 on the side of the second annular groove 135, and a central portion of the detection surface A2 substantially coincides with the edge of the second annular groove 135 on the side of the first annular groove 134.

Since the displacement sensor unit 10 is configured such that the displacement sensor 84 and the displacement sensor 94 are arranged adjacent to each other axially, in an axial section, the inclination of the target member 73 with respect to the detection surfaces A1 and A2 can be detected in 4 sets of two displacement sensors 84 and 94 that substantially axially overlap each other. Although the calculation is not explained in detail, the displacement sensor unit 10 is adapted to calculate a translational load in an up-and-down direction of a wheel, a translational load in an axial direction of the wheel, and a translational load in a front-back direction of the wheel, but also to detect moment loads (specifically, a moment load around the up-and-down direction of the wheel and a moment load around the front-back direction of the wheel) that act on the rolling bearing device on the basis of the inclination.

In addition, in the fourth embodiment, a central portion of the detection surface A1 on the lid member 53 substantially coincides with the edge of the first annular groove 134 on the side of the second annular groove 135, and a central portion of the detection surface A2 substantially coincides with the edge of the second annular groove 135 on the side of the first annular groove 134. However, if only a portion of the detection surface A1 of the displacement sensor on the side of the lid member axially overlaps a portion of the first annular groove on the side of the lid member, and a portion of the detection surface A2 of the displacement sensor on the side of the rolling elements axially overlaps a portion of the second annular groove on the side of the rolling elements, the same operational effects as the fourth embodiment can be obtained.

Figure 44:
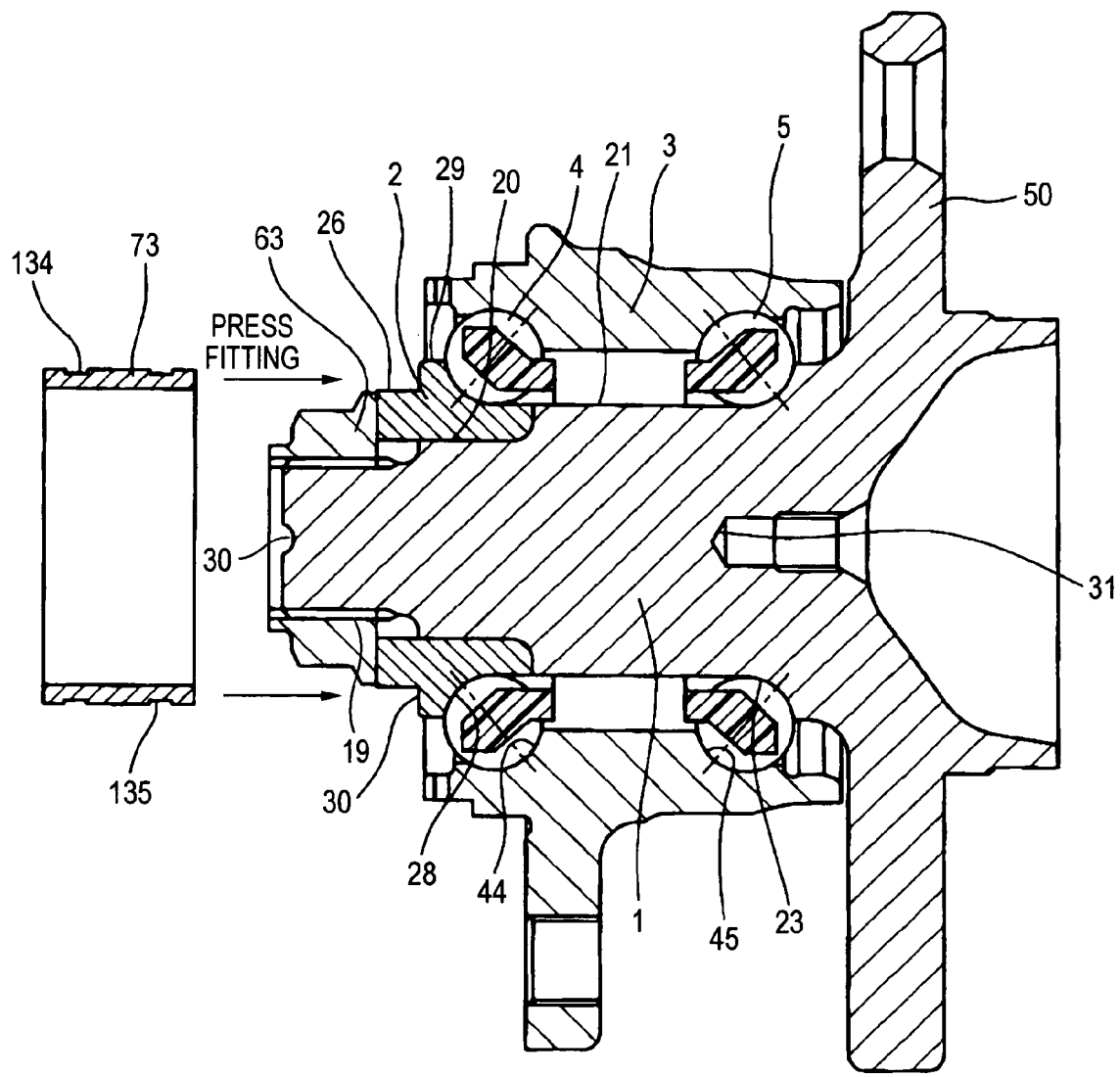
FIG. 44 is a view showing a state where the rolling bearing device shown in FIG. 41 is being assembled.

FIG. 44 is a view showing a state where the rolling bearing device shown in FIG. 41 is being assembled.

Hereinafter, a manufacturing method of a rolling bearing device according to the fourth embodiment of the invention will be explained referring mainly to FIG. 44.

First, the inner ring 2 is externally fitted and fixed to the middle-diameter shaft portion 20 of the inner shaft 1. Next, the first balls 4, the second balls 5, and the outer ring 5 are assembled to an inner shaft assembly in which the inner ring 2 is externally fitted to the inner shaft 1.

Next, the nut 63 is screwed to the thread of the small-diameter shaft portion 19 of the inner shaft 1 whereby the inner ring 2 is screwed to the axial large-diameter shaft portion 21 with the nut 63, thereby setting a preload between the raceway groove 28 of the inner ring 2 and the first raceway groove 44 of the outer ring 3 to a predetermined preload, and setting a preload between the raceway groove 23 of the inner shaft 1 and the second raceway groove 45 of the outer ring to a predetermined preload.

Subsequently, as shown in FIG. 44, the one end of the target member 73 is externally fitted and fixed to the cylindrical outer peripheral surface 26 of the inner ring 2 by pressing fitting. Thereafter, the shielding plate denoted by 7 in FIG. 41 is internally fitted and fixed to the axial end of the inner peripheral surface of the outer ring 3 on the side of the small-diameter shaft portion 19 by press fitting, thereby forming a labyrinth seal between the axial end of the inner peripheral surface of the outer ring 3 on the side of the small-diameter shaft portion 19 and the cylindrical outer peripheral surface of the raceway shoulder 29 of the inner ring 2.

Then, the wheel-attaching flange 50 of the inner shaft 1 is held with a chuck device that is not shown whereby a torque is given to the inner shaft 1 using the chuck device, thereby rotating the inner shaft 1 around the central axis of the second center hole 31 on the basis of the central axis of the second center hole 31. Then, the outer peripheral surface of the target member 73 is cut in the state where the inner shaft 1 is rotating around the central axis, thereby roughly forming the first annular groove 134 and the second annular portion 135 in the outer peripheral surface of the target member 73, and thereafter, the outer peripheral surface of the target member 73 is precisely polished in a predetermined shape.

Finally, after the sensor body 60 is fixed to the case member 6, the tubular member 52 of the case member 6 with which the sensor body 60 becomes integral is fixed to the outer peripheral surface of the outer ring 3 with locking screws 55 (refer to FIG. 41), thereby forming a rolling bearing device.

According to the manufacturing method of the rolling bearing device with the sensor of the fourth embodiment, after axial one end of the inner peripheral surface of the tubular target member 73 is press-fitted to the cylindrical outer peripheral surface 26 that is one end of the outer peripheral surface of the inner ring 2, the outer peripheral surface of the target member 73 is processed. Therefore, the press-fitting of the target member 73 to the inner ring 2 does not affect the dimensions of the target member 73 of the rolling bearing device after manufacture, so that the outer peripheral surface of the target member 73 can be precisely positioned in a predetermined position.

That is, by pressing-fitting one axial end of the target member 73 to the cylindrical outer peripheral surface 26 that is one axial end of the outer peripheral surface of the inner ring 2, even if any large distortion that is not uniform occurs in an axial potion inside the target member 73, the target member 73 is processed in a distorted state. Therefore, any degradation of positioning precision of the outer peripheral surface resulting from the distortion caused by the press fitting, which is conventionally generated in a case where press-fitting is performed after processing, does not occur. Further, in a case where press-fitting is performed after processing the degradation of positioning precision of the outer peripheral surface of the target member degrades due to the precision of the position of the outer peripheral surface of the target member. In the invention, however, the target member is processed after press-fitting of the target member. Therefore, any degradation of positioning precision of the outer peripheral surface of the target member resulting from the precision of the position of the outer peripheral surface of the inner ring does not occur.

Further, according to the manufacturing method of the rolling bearing with the sensor of the fourth embodiment, the outer peripheral surface of the target member 73 that is press-fitted to the cylindrical outer peripheral surface 26 that is one end of the outer peripheral surface of the inner ring 2 is processed in a state where the inner shaft 1 is rotated around about the central axis of the inner shaft 1. Therefore, in comparison with a case where the outer peripheral surface of the target member is processed without rotating the inner shaft, any runout of the rolling bearing device can be efficiently removed during the processing of the outer peripheral surface of the target member 73, and accordingly, the rotation variation of the rolling bearing device after manufacture can be suppressed.

Accordingly, from the above two reasons, axial and radial displacements of the rolling bearing device, or the magnitudes of moment loads applied to the rolling bearing device can be precisely measured.

Further, according to the manufacturing method of the rolling bearing with the sensor of the fourth embodiment, the outer peripheral surface of the target member 73 is processed after a gap between the outer ring 3 and the inner ring 2 is sealed by the shielding plate 7. Therefore, abrasion powder of the target member 73 generated by processing (including polishing) does not reach the first and second balls 3 and 4, or the raceway grooves 23 and 28, 44, and 45, and accordingly, the first and second balls 3 and 4 or the raceway grooves 23, 28, 44, and 45 can be surely protected from the abrasion powder.

Further, according to the manufacturing method of the rolling bearing with the sensor of the fourth embodiment, during the processing of the target member 73, the inner shaft 1 is rotated on the basis of the second center hole 31 that extends axially and has an axial length. Therefore, it becomes easy to make a rotation centerline to be used as the reference of the rotation of the inner shaft 1 more precisely coincide with the central axis of the inner shaft 1. Accordingly, runout (decentering) of the rolling bearing device can be further suppressed.

Further, according to the manufacturing method of the rolling bearing with the sensor of the fourth embodiment, at the time of assembling of the rolling bearing device after the sensor body 60, that is, a first displacement detector 70 and a second displacement detector 71 are fixed to the case member 6 in advance, the sensor body 60 can be fixed to the rolling bearing device only by fixing the case member 6 to the outer peripheral surface of the outer ring 1 as described above. Accordingly, it is not necessary to individually attach the sensor body 60 to the outer ring 3, and it is also not necessary to provide the outer ring 3 with an attachment structure, such as through-holes, for mounting the sensors. Further, since the position of the sensor body 60 relative to the case member 6 is determined in advance, the sensor body 60 with respect to the target member 73 can be exactly and easily positioned.

In addition, in the manufacturing method of the rolling bearing with the sensor according to the fourth embodiment, an axial end on the side of the target member 73 between the inner ring 2 and the outer ring 3 is sealed by the shielding plate 6 after the target member 73 is press-fitted to the inner ring 2. In the invention, however, the target member 73 is press-fitted to the outer peripheral surface of the inner ring 2 after the axial opening on the side of the target member 73 between the inner ring 2 and the outer ring 3 is sealed by a sealing unit.

Further, in the manufacturing method of the rolling bearing with the sensor of the fourth embodiment, centering of the inner shaft 1 when the inner shaft 1 is rotated is made using the second center hole 31 of the inner shaft 2. In the invention, however, the centering of the inner shaft when the inner shaft is rotated may be made on the basis of the portion of the inner shaft, such as an axial end surface of the inner shaft, other than the second center hole of the inner shaft.

Further, in the manufacturing method of the rolling bearing with the sensor according to the fourth embodiment, the rolling elements of a rolling bearing with a sensor to be manufactured are balls. However, in the invention, the rolling elements of the rolling bearing with a sensor to be manufactured may be rollers or may include rollers and balls.

What is claimed is:

1. A rolling bearing device with a sensor comprising:
   a first raceway member including an inner peripheral surface having a raceway surface;
   a second raceway member including an outer peripheral surface having a raceway surface;
   an annular displacement-detected portion provided separately from the second raceway member and disposed on the outer periphery surface of the second raceway member;
   rolling elements arranged between the raceway surfaces of the first and second raceway members; and a sensor unit that detects radial displacement and axial displacement of the displacement-detected portion,
wherein the sensor unit includes:
a first displacement detector including a detection surface that radially faces the displacement-detected portion;
a second displacement detector located at a distance axially from the first displacement detector, and including a detection surface that radially faces the displacement-detected portion;
a rotation signal detector that detects a signal associated with rotation of the annular portion relative to at least one of the first displacement detector and the second displacement detector, based on an output of at least one of the first displacement detector and the second displacement detector; and
a displacement signal detector that detects a signal associated with the displacement of the displacement-detected portion based on an, output of the first displacement detector, and detects a signal associated with the displacement of the displacement-detected portion based on an output of the second displacement detector,
wherein the displacement-detected portion includes an annular portion which includes a plurality of grooves that are arranged at intervals from each other in a circumferential direction of the displacement-detected portion and extend axially,
wherein the displacement-detected portion includes a first cylindrical surface portion connected to the annular portion via a stepped portion, and a second cylindrical surface portion connected to the annular portion to the first cylindrical surface portion via a stepped portion, and located on substantially the same cylindrical surface as the first cylindrical surface portion,
wherein each of the grooves axially extends from one axial end of the annular portion to an other axial end of the annular portion,
wherein the first displacement detector and the second displacement detector substantially axially overlap each other,
wherein the detection surface of the first displacement detector radially overlaps an end of the first cylindrical surface portion on the side of the annular portion, and radially overlaps an end of the annular portion on the side of the first cylindrical surface portion, and
wherein the detection surface of the second displacement detector radially overlaps an end of the second cylindrical surface the side of annular portion, and radially overlaps an end of the annular portion on the side the second cylindrical surface portion.

2. The rolling bearing device according to claim 1, wherein a surface of the annular portion is formed by axially stacking a plurality of steel plates.

3. The rolling bearing device according to claim 1, wherein the second raceway member includes a rotor-attaching flange for attaching a rotor, and the first raceway member includes a body-attaching flange for attaching a vehicle body,
wherein the plurality of grooves are arranged at equal intervals in the circumferential direction,
wherein each of the first displacement detector and the second displacement detector includes four displacement sensors arranged at equal intervals in the circumferential direction,
wherein the displacement signal detector detects, in each of the displacement sensors, signals associated with the displacement of the displacement-detected portion based on signals output from each of the displacement sensors,
wherein the displacement sensors of the second displacement detector substantially axially overlap the displacement sensors of the first displacement detector, and
wherein the sensor unit has a moment load calculating section that receives signals from the displacement signal detector, calculates, in each of the displacement sensors of the first displacement detector, differences between signals associated with the displacement of the displacement-detected portion with respect to the displacement sensors of the first displacement detector and signals associated with the displacement of the displacement-detected portion with respect to the displacement sensors of the second displacement detector, and calculates a plurality of moment loads that act on the rolling bearing device on the basis of the calculated differences.

4. A rolling bearing device with a sensor comprising:
a first raceway including an inner peripheral surface having a raceway surface;
a second raceway member including an outer peripheral surface having a raceway surface;
an annular displacement-detected portion provided separately from the second raceway member and disposed on the outer periphery surface of the second raceway member;
rolling elements arranged between the raceway surfaces of the first and second raceway members; and
a sensor unit that detects radial displacement and axial displacement of the displacement-detected portion,
wherein the sensor unit includes:
a first displacement detector including a detection surface that radially faces the displacement-detected portion;
a second displacement detector located at a distance axially from the first displacement detector, and including a detection surface that radially faces the displacement-detected portion;
a rotation signal detector that detects a signal associated with rotation of, the annular portion relative to at least one of the first displacement detector and the second displacement detector, based on an output of at least one of the first displacement detector and the second displacement detector; and
a displacement signal detector that detects a signal associated with the displacement of the displacement-detected portion based on an output of the first displacement detector, and detects a signal associated with the displacement of the displacement-detected portion based on an output of the second displacement detector,
wherein the displacement-detected portion includes an annular portion which includes a plurality of grooves that are arranged at intervals from each other in a circumferential direction of the displacement-detected portion and extend axially,
wherein the plurality of grooves comprise substantially a same width, and are arranged at equal intervals in the circumferential direction,
wherein the first displacement detector and the second displacement detector substantially axially overlap each other,
wherein each of the first displacement detector and the second displacement detector includes four displacement sensors arranged at equal intervals in the circumferential direction, and $A<B$, $C<A+B$, and $B<C$ are satisfied where in a radial sectional view passing through the annular portion and the first displacement detector, when the two adjacent grooves in the circumferential direction are defined as a first groove and a second groove, a convex located between the first groove and the second groove is defined as an intermediate convex, a straight line passing through a circumferential midpoint of the intermediate convex and a center of the annular portion is defined as a convex center passing line, a distance between a straight line parallel to the convex center passing line and passing through one circumferential end of the first groove, and a straight line parallel to the convex center passing line and passing through the other circumferential end of the first groove is represented by A, a distance between a straight line parallel to the convex center passing line and passing through one circumferential end of the intermediate convex, and a straight line parallel to the convex center passing line and passing through the other circumferential end of the intermediate convex is represented by B, and a quarter of a circumferential length of the detection surface of the first displacement detector is represented by C.

* * * * *